(12) United States Patent  (10) Patent No.: US 9,402,093 B2
Lieu et al.  (45) Date of Patent: Jul. 26, 2016

(54) SYSTEMS AND METHODS FOR TEMPORARY ACCESS TO MEDIA CONTENT

(71) Applicant: Spotify AB, Stockholm (SE)

(72) Inventors: Johnson Lieu, San Francisco, CA (US); Erik Hartwig, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 14/828,405

(22) Filed: Aug. 17, 2015

(65) Prior Publication Data

US 2016/0066004 A1  Mar. 3, 2016

Related U.S. Application Data

(60) Provisional application No. 62/045,472, filed on Sep. 3, 2014.

(51) Int. Cl.
| | |
|---|---|
| H04N 7/173 | (2011.01) |
| H04N 21/254 | (2011.01) |
| H04N 21/258 | (2011.01) |
| H04N 21/414 | (2011.01) |
| H04N 21/426 | (2011.01) |
| H04N 21/472 | (2011.01) |
| H04N 21/422 | (2011.01) |

(52) U.S. Cl.
CPC ..... *H04N 21/2541* (2013.01); *H04N 21/25816* (2013.01); *H04N 21/25841* (2013.01); *H04N 21/25875* (2013.01); *H04N 21/41407* (2013.01); *H04N 21/41422* (2013.01); *H04N 21/42684* (2013.01); *H04N 21/47214* (2013.01); *H04N 21/42202* (2013.01)

(58) Field of Classification Search
None
See application file for complete search history.

(56) References Cited

U.S. PATENT DOCUMENTS

| | | | |
|---|---|---|---|
| 8,655,970 B1* | 2/2014 | Cohen | G06Q 30/00 455/412.2 |
| 2014/0028477 A1* | 1/2014 | Michalske | G08G 1/005 340/990 |
| 2015/0228000 A1* | 8/2015 | Bijor | G06Q 30/0613 705/13 |

* cited by examiner

*Primary Examiner* — Hunter B Lonsberry
*Assistant Examiner* — Michael Telan
(74) *Attorney, Agent, or Firm* — Morgan, Lewis & Bockius LLP

(57) ABSTRACT

Methods, systems, and/or devices for providing temporary access to media content are described herein. In one aspect, a server provides authorization to a transportation service provider for accessing one or more media items associated with an account of a user for a media content provider. The server provides the authorization in response to the user reserving a vehicle through the transportation service provider. Additionally, the server receives a first request (e.g., a request initiated by a mobile device of the user) to present a first media item of the one or more media items at a media presentation system of a reserved vehicle provided by the transportation service provider. In accordance with the authorization, the server sends a portion of the first media item for presentation at the media presentation system.

20 Claims, 32 Drawing Sheets

SYSTEMS AND METHODS FOR TEMPORARY ACCESS TO MEDIA CONTENT

RELATED APPLICATIONS

This application claims priority to U.S. Provisional Application No. 62/045,472, filed Sep. 3, 2014, which is hereby incorporated by reference in its entirety.

TECHNICAL FIELD

The present disclosure relates generally to providing temporary access to media content on shared devices.

BACKGROUND

Due in part to the increase in bandwidth, speed, and coverage of wireless data communications, users are now able to consume wirelessly delivered media content in a multitude of environments and through a multitude of devices. For example, users increasingly consume media content from large, online content libraries. In many cases, users are able to access such content via mobile and/or handheld electronic devices, such as smartphones, tablets, or laptop computers.

Despite the proliferation of online media content providers, and the various types of electronic devices that access them, users frequently find themselves in situations where it is difficult or inconvenient to access online media content. For example, a user who subscribes to a streaming music service and typically accesses content from that service via their smartphone may wish to access the same music through a different device, such as an audio system of a vehicle or a home audio system. In order to enable such a device to receive content from the streaming music service, the user may be required to enter account information, such as a username and password. In circumstances where the user wishes to use the device for only a short period of time, however, authorizing the device to access the user's account may be inconvenient or may present security risks. For example, if the user does not own the device with which the user would like to consume media content, the user might be hesitant to provide login and password information to that device. Moreover, where the user only wishes to use the device for a short time, the user may find that the pairing process takes too long to be worth the effort. Accordingly, users are not able to quickly and efficiently access media content with all of the devices that they may wish to use.

SUMMARY

In light of the foregoing, it would be advantageous to provide systems and methods whereby a user can access and control media content on a device without having to enter account and/or security information to the device directly. Moreover, it would be advantageous to provide systems and methods whereby devices with which a user may want to access media content from a media content provider are configured to receive media content from the media content provider without requiring any additional action by the user at the time he consumes the media.

One specific area where the disclosed systems and methods are implemented is transportation services, including vehicle-for-hire services, air travel, train travel, etc. For example, a user will request to reserve a transportation service. Such a request can be made in many ways, such as via a smartphone, a tablet computer, a laptop computer, a desktop computer, or other mobile communication device. For example, a user can request to reserve a transportation service via an application on a smartphone that communicates with a transportation service provider (or facilitator). Once the transportation service is reserved, a particular vehicle (e.g., from a fleet of vehicles) is selected to provide the transportation service to the user, where the particular vehicle includes a media presentation system that can receive and present streaming media content. For example, in some cases, the driver of the vehicle has a smartphone or other wireless communication device that can receive streaming music or other audio or video content from a media service provider. The driver's smartphone may be coupled to an audio and/or video system of the vehicle, such that music received on the smartphone can be presented via the vehicle's media system(s).

Once a particular vehicle is associated with the user's transportation request, the media presentation system of that particular vehicle is enabled to receive music or other audio or video content from the media service provider using the account of the user. Enabling the media presentation system of the particular vehicle can occur in many different ways. In some cases, a server of the transportation service will send information to a server of the media content provider that identifies the particular vehicle and account information of the user. The media content provider will then allow media content to be delivered to the media system(s) of the vehicle, by virtue of the user's account with the media content provider.

The foregoing example represents one possible way of providing access to media content through a user's account to a device that will be used only temporarily by the user. Other implementations are also contemplated, however. For example, a transportation service may be replaced by another service, such as a hotel, cabana, restaurant, bar, or housing rental, etc. Indeed, as noted above, any service that is associated with or includes a media presentation system will benefit from the disclosed ideas. Various specific implementations and variations thereon for facilitating temporary access to media content by devices of reserved services are discussed herein. Moreover, while the foregoing example describes that music is provided to the media presentation system, other types of media are also contemplated, such as video content, images, etc.

EXAMPLE IMPLEMENTATIONS

In accordance with some implementations, methods for providing temporary access to media content for presentation in a vehicle are disclosed.

In some implementations, a method is performed at a first server (e.g., content server 106, FIGS. 1, 2A-2H and 5) with a processor and memory storing instructions for execution by the processor. The method includes providing authorization to a transportation service provider for accessing one or more media items associated with an account of a user for a media content provider, in response to the user reserving a vehicle through the transportation service provider. The method further includes: receiving a first request to present a first media item of the one or more media items at a media presentation system of a reserved vehicle provided by the transportation service provider, the first request being initiated by a mobile device of the user. In some implementations, the method also includes sending a portion of the first media item for presentation at the media presentation system, in accordance with the authorization.

In some implementations, a method is performed at an electronic device having one or more processors and memory storing one or more programs for execution by the one or more processors (e.g., a server computer). The method includes receiving, from a user, a request to reserve a transportation service, wherein the user is associated with a media account authorizing the user to access media content from a media content provider. In response to receiving the request to reserve the transportation service, the method further includes: (1) identifying a particular vehicle from a plurality of vehicles, wherein the particular vehicle includes a media presentation system capable of presenting media from a media content provider, and (2) sending, to a server associated with the media content provider, information identifying the media account associated with the user, and information identifying the media presentation system of the particular vehicle.

In some implementations, a method is performed at an electronic device with a processor and memory storing instructions for execution by the processor (e.g., a server computer). The method includes receiving, from a server associated with a transportation service provider (1) information identifying a media account associated with a user; and (2) information identifying a media presentation system of a particular vehicle, wherein the particular vehicle corresponds to a vehicle associated with a reserved transportation service. The method further includes receiving a media control request. The method further includes, in response to receiving the media control request, causing the media presentation system of the particular vehicle to perform an action in accordance with the media control request.

In some implementations, a method is performed at an electronic device with a processor and memory storing instructions for execution by the processor (e.g., a client computer). The method includes sending, to a server associated with a transportation service provider, a request to reserve a transportation service. The method further includes receiving information identifying a media presentation system of a particular vehicle associated with the transportation service provider, wherein the particular vehicle corresponds to a vehicle associated with a reserved transportation service. The method further includes sending, to a server associated with the media content provider: (1) information identifying a media account of a user; and (2) the information identifying the media presentation system of the particular vehicle.

In some implementations, a method is performed at an electronic device with a processor and memory storing instructions for execution by the processor (e.g., a server computer). The method includes receiving, from an electronic device associated with a user: (1) information identifying a media account associated with the user; (2) information identifying a media presentation system of a particular vehicle, wherein the particular vehicle corresponds to a vehicle associated with a reserved transportation service; and (3) a media control request. The method further includes, in response to receiving the media control request, causing the media presentation system of the particular vehicle to perform an action in accordance with the media control request.

In some implementations, a method is performed at an electronic device with a processor and memory storing instructions for execution by the processor (e.g., a server computer). The method includes receiving information usable to identify a transportation service account associated with a user, wherein the transportation service account associated with the user authorizes the user to access transportation services provided by a transportation service provider. The method further includes receiving information indicating that the user has reserved a transportation service. The method further includes sending, to a server associated with the transportation service provider, a request for information identifying a media presentation system of a particular vehicle associated with the reserved transportation service. The method further includes receiving, from the server associated with the transportation service provider, the information identifying the media presentation system of the particular vehicle. The method further includes sending media content to the media presentation system of the particular vehicle.

In some implementations, a method is performed at an electronic device associated with a user (e.g., a client device), the electronic device having a processor and memory storing instructions for execution by the processor. The method includes receiving information indicating that a reservation for a transportation service has been made. The method further includes sending, to a server associated with a media content provider: (1) information usable by the media content provider to identify a transportation service account associated with the user; (2) information indicating that the user has reserved a transportation service; and (3) a media control request configured to cause the media content provider to send media content to a particular vehicle associated with the reserved transportation service.

In some implementations, a method is performed at an electronic device with a processor and memory storing instructions for execution by the processor (e.g., a server computer). The method includes receiving information identifying a media presentation system of a particular vehicle associated with a transportation service provider, wherein the particular vehicle corresponds to a vehicle associated with a reserved transportation service. The method further includes receiving information identifying an electronic device associated with the user. The method further includes generating a first security token for the electronic device associated with the user. The method further includes generating a second security token for the media presentation system of the particular vehicle, wherein the first security token and the second security token are useable by the media presentation system of the particular vehicle and the electronic device associated with the user, respectively, to authorize communication between the media presentation system and the electronic device associated with the user. The method further includes sending the first security token to the electronic device associated with the user. The method further includes sending the second security token to the media presentation system of the particular vehicle, and sending media content to the electronic device associated with the user for retransmission to the media presentation system of the particular vehicle.

In some implementations, a method is performed at an electronic device associated with a user (e.g., a client computer), the electronic device having a processor and memory storing instructions for execution by the processor. The method includes requesting reservation of a transportation service, wherein the reservation is associated with a particular vehicle of a plurality of vehicles associated with a transportation service provider that provides the reserved transportation service. The method further includes receiving a first security token, wherein the first security token is useable by the electronic device associated with the user to authorize communication between the electronic device associated with the user and a media presentation system of the particular vehicle. The method further includes establishing a connection, using at least the first security token, with the media presentation system of the particular vehicle. The method further includes receiving media content from a server associated with a media content provider, and sending the media content to the presentation system of the particular vehicle.

In some implementations, a computer system is provided (e.g., a server computer, a client computer, etc.), the computer system comprising: one or more processor cores; and memory storing one or more programs for execution by the one or more processor cores, the one or more programs including instructions for performing any of the methods described herein.

In some implementations, a computer readable storage medium is provided, the computer readable storage medium storing one or more programs, the one or more programs comprising instructions, which, when executed by a system with one or more processor cores, cause the system to perform any of the methods described herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
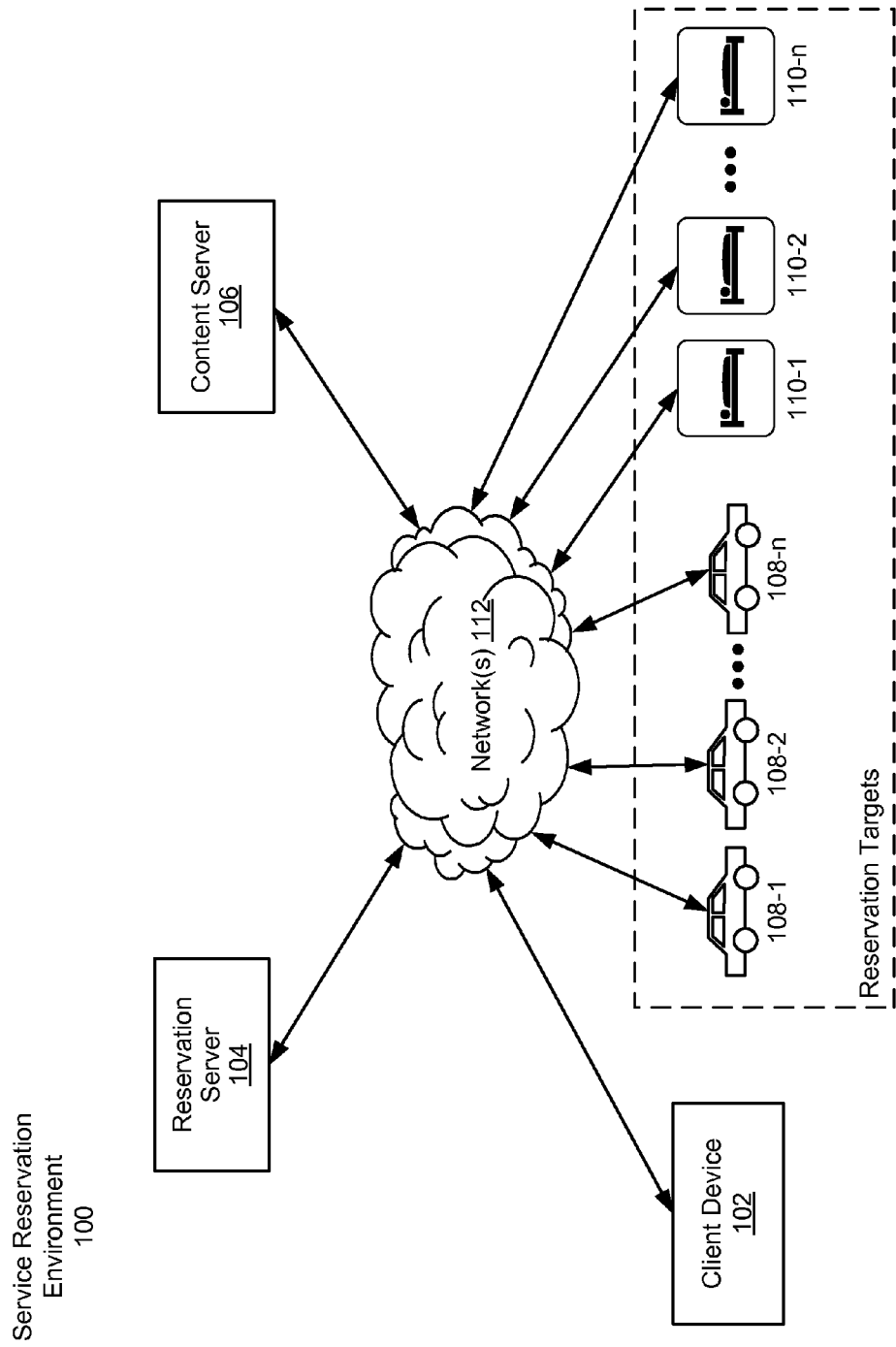
FIG. 1 is a block diagram illustrating a service reservation environment in accordance with some implementations.

FIG. 1 is a block diagram of a service reservation environment 100 in accordance with some implementations. The service reservation environment 100 includes one or more client devices (e.g., client device 102), one or more reservation servers associated with a transportation service provider and/or other service provider (e.g., reservation server 104), one or more content servers associated with a media content provider (e.g., content server 106), and one or more reservation targets (e.g., vehicles 108-n, hotel rooms 110-n) that are connected through one or more networks 112. The one or more networks 112 can be any network (or combination of networks) such as the Internet, other Wide Area Networks, Local Area Networks, Personal Area Networks, metropolitan area networks, VPNs, local peer-to-peer, ad-hoc connections, and so on.

The client device 102 is a representative electronic device associated with a user. (Of course, it will be understood that multiple users may be associated with a single client device, and a single user may be associated with multiple client devices.) In some implementations, the client device 102 is any of: a personal computer, a television, a set-top box, a mobile electronic device, a wearable computing device, a laptop, a tablet computer, a mobile phone, a feature phone, a smartphone, a digital media player, or any other electronic device capable of sending a request to reserve a service, preparing media content for presentation, controlling presentation of media content, and/or presenting media content. The client device 102 communicates with and receives content (e.g., music, movies, etc.) from content sources such the content server 106. The client device 102 also communicates with other devices, such as the reservation server 104. For example, as described herein, the client device 102 sends service reservation requests to the reservation server 104.

In some implementations, the client device 102 includes a media application 204 (FIG. 2A) that controls the presentation of media by an output device associated with the client device 102. (The output device may be part of the client device 102, such as built-in speakers or a screen, or may be separate from the client device 102, such as a wirelessly coupled speaker or headphones.) The media application is any appropriate program, firmware, operating system, or other logical or physical aspect of the client device 102 that enables presentation of media content by the client device 102 (e.g., on an output associated with the client device 102). For example, where the client device 102 is a computer (e.g., laptop computer, tablet computer, mobile phone, etc.), the media presentation application may be a web browser, a video presentation application, a music presentation application, an email application, a media aggregation application, or the like.

In some implementations, the client device 102 includes a service application 202 (FIG. 2A) that facilitates sending requests from the client device 102 to a server associated with a service provider (e.g., the reservation server 104) to reserve a service. The service application is any appropriate program, firmware, operating system, or other logical or physical aspect of the client device 102 that enables a user to request reservation of a service, and facilitates the reservation of the service with a service provider (e.g., by sending service reservation requests, account credentials, etc., as discussed herein).

The content server 106 stores content and provides the content, via the network(s) 112, to the client device 102. In some implementations, the content server 106 is associated with a media content provider that provides access to media content to users via a network (e.g., the Internet).

Content stored and served by the content server 106 includes any appropriate content, including text (e.g., articles, blog posts, emails, etc.), images (e.g., photographs, drawings, renderings, etc.), videos (e.g., short-form videos, music videos, television shows, movies, clips, previews, etc.), audio (e.g., music, spoken word, podcasts, etc.), games (e.g., 2- or 3-dimensional graphics-based computer games, etc.), or any combination of content types (e.g., webpages that include any combination of the foregoing types of content or other content not explicitly listed). The description of the server 106 as a "server" is intended as a functional description of the device, devices, systems, processor cores, and/or other components that provide the functionality attributed to the server 106. It will be understood that the server 106 may be a single server computer, or may be multiple server computers. Moreover, the server 106 may be coupled to other servers and/or server systems, or other devices, such as other client devices, databases, content delivery networks (e.g., peer-to-peer networks), network caches, and the like.

The reservation server 104 is associated with a service provider that offers reservable services to users. Reservable services include any service for which a user can request a reservation, including but not limited to vehicles-for-hire (e.g., taxi cabs, rideshare services, etc.), housing (e.g., hotel rooms, short/long term rental properties, etc.), air travel, and the like. The reservation server 104 receives requests for reservations (e.g., from the client device 102), facilitates the creation of the reservation, including identifying and selecting an appropriate reservation target (e.g., a particular vehicle or particular hotel room), and performs any other appropriate tasks related to creating, maintaining, terminating, or processing a reservation.

Reservation targets 108-n, 110-n represent individually reservable services and/or locations, vehicles, and/or objects that are associated with reservable services. For example, reservation targets 108-n are vehicles, such as taxi cabs, personal vehicles that reservable through a ridesharing program, etc. Reservation targets 110-n are housing/boarding rooms, such as hotel/motel rooms, hostel rooms, cabanas, apartment/house/condominium rentals, etc. In some embodiments, respective reservable services are associated with respective media presentation systems (not shown) that are capable of receiving media content (e.g., from the content server 106) and presenting the received media content. For example, where the reservation target is a vehicle, the media presentation system for that vehicle may be a network-connected audio/video system (e.g., an infotainment system). As another example, a media presentation system for a reservable vehicle may include a smartphone capable of receiving media content from the content server 106, where the mobile phone is coupled to an audio/video system of the vehicle (e.g., via wired or wireless connection). As yet another example, a media presentation system for a hotel room may include a network-connected speaker system (e.g., a radio/alarm clock that is capable of receiving audio content, via wireless or wired network connectivity, and presenting the audio content). Another example of a media presentation system in a boarding room is a network-connected television (e.g., a "smart TV") that is capable of receiving and presenting video content.

Reservation targets, and/or the media presentation systems of reservation targets, are each associated with an identifier (e.g., a unique hardware or application identifier, a network address, etc.) that the reservation server 104 and/or the content server 106 uses to uniquely identify and/or establish communications with the reservation target.

As described herein, in some implementations, the identifier of a particular reservation target is provided to the content server 106 along with an identifier of the user who reserved that particular target. Accordingly, the content server 106 can provide media content to that particular target based on the user's account even though the reservation target is not otherwise associated with the user. In other words, the user can access their account using the media presentation system of the reservation target.

While only one reservation server 104 is shown in FIG. 1, it will be understood that a single reservation server 104 is not necessarily associated with multiple types of reservation targets. For example, reservation targets 108-n (also referred to as vehicles 108-n) may be associated with a reservation server of a transportation service, and reservation targets 110-n (also referred to as boarding rooms 110-n) may be associated with a separate reservation server of a boarding service provider. In some cases, a single reservation server 104 (or group of servers associated with one service provider) facilitates reservations of multiple different services. For example, in some implementations, the reservation server 104 facilitates the reservations of two or more services, such as vehicles-for-hire and hotel rooms. Also, the description of the reservation server 104 as a "server" is intended as a functional description of the device, devices, systems, processors cores, and/or other components that provide the functionality attributed to the server 104. It will be understood that the server 104 may be a single server computer or may be multiple server computers. Moreover, the server 104 may be coupled to multiple servers and/or server systems, or to other devices, such as other client devices, databases, and the like. Indeed, the server 104, as used herein, represents any of the foregoing devices or combinations thereof.

Figure 2A:
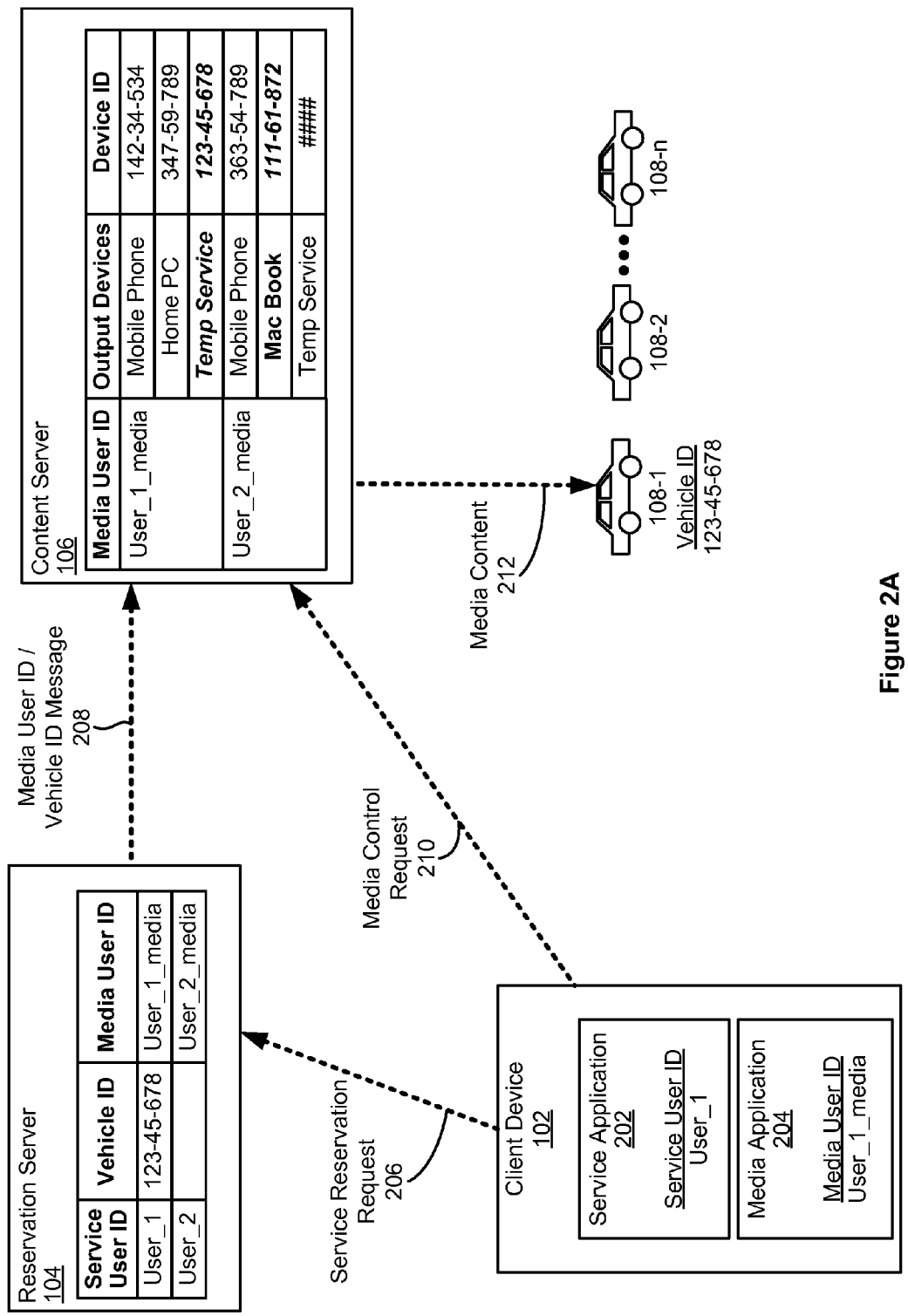
FIGS. 2A-2H are block diagrams illustrating exemplary communications between various components of the service reservation environment, in accordance with some implementations.

FIG. 2A is another block diagram of the service reservation environment 100, illustrating details of the components, data, and messages used by the service reservation environment 100, in accordance with some implementations. While FIG. 2A and the associated discussion relate to a vehicle-for-hire service, it will be understood that the same ideas apply by analogy to other services, such as boarding services, air travel services, and the like. Moreover, the components, data, and messages shown are merely examples. In various implementations, the same components may be used in different ways, some of the data shown may be omitted, replaced, or added to, and the messages shown may be omitted, replaced, or added to, or may be transmitted to and received by other devices.

In some implementations, the client device 102 (which is associated with one or more users) includes a service application 202. The service application 202 facilitates sending requests from the client device 102 to the reservation server 104. In this particular example, the reservable service is a vehicle-for-hire service. Accordingly, the service application 202 includes and/or uses computer code that enables the user to request a vehicle-for-hire, and sends a service reservation request 206 to the reservation server 104.

In some implementations, the service application 202 also performs other user-facing functions, such as receiving a response from the reservation server 104 indicating whether the reservation has been completed, receiving payment information and/or other details from the user, and generally providing a user interface for any functions necessary in order to complete the reservation. (Analogous features and functionalities are provided by service applications for other reservable services, such as boarding rooms, air travel, etc.)

The service application 202 is associated with a service user ID that identifies the user's account with the service provider (or otherwise uniquely identifies the user, for example, if the user does not have an account with the service provider). As shown in FIG. 2A, the service user ID is "User_1." In some implementations, the service application 202 becomes associated with the service user ID as a result of the user logging-in to a transportation service account (e.g., entering a username and password). The service user ID is any identifier that uniquely identifies the user to the reservation server. For example, the service user ID can be a username of the account associated with the user, an email address of the user, or any other appropriate identifier.

In some implementations, the client device 102 includes a media application 204. The media application 204 facilitates access to and control of media content provided by a media content provider (e.g., the media content provider associated with the content server 106). For example, the media application 204 includes and/or uses computer code that enables users to browse and/or search for media content, create/modify/delete playlists or queues of media content, and control the playback of media content on the client device 102 (e.g., via play, stop, and skip controls), and the like. The media application 204 also provides user interface(s) to facilitate user control over these (and other) functions.

In some implementations, the media application 204 also includes and/or uses computer code that enables users to control playback of media content by a device separate from the client device 102. For example, the media application 204 can communicate with another device to control presentation of media content that is delivered to the other device. The media content is delivered from a content server 106 to the other device, or through the client device 102 (e.g., from the content server 106 to the client device 102, and then from the client device 102 to the other device).

As a specific example, the media application 204 includes media playback controls that can be used to control media playback on a media presentation system of a vehicle. In some cases, such functionality is performed without a direct connection between the client device 102 and the controlled device. For example, in some vehicle-for-hire implementations, the client device 102 sends media control requests 210 to the content server 106, and the content server 106 implements the media control requests by communicating with the media presentation system of the vehicle. Thus, a user can control presentation of media content in the vehicle without having a direct local (i.e., peer-to-peer) connection to the vehicle.

The media application 204 is associated with a service user ID that identifies that user's account with the media content provider. As shown in FIG. 2A, the media user ID is "User_1_media." In some implementations, the media application 204 becomes associated with the service user ID as a result of the user logging-in to a media service account (e.g., entering a username and password). The service user ID is any identifier that uniquely identifies the user to the reservation server. For example, the service user ID can be a username of the account associated with the user, an email address of the user, or any other appropriate identifier.

In some implementations, the service application 202 includes media playback controls that can be used to control media playback on a media presentation system separate from the client device, and, in particular, of a media presentation system associated with a reservation target. For example, in FIG. 2A, the service application 202, associated with a vehicle-for-hire service, includes user interfaces and associated software that enables the user to control a media presentation system of a vehicle (e.g., vehicle 108-1). (Such controls may be instead of or in addition to the similar functioning controls included in the media application 204, described above.) As described above, in some cases, control requests are sent from the service application 202 to the content server 106 in order to effectuate the requested media control at the vehicle 108-1.

As shown in FIG. 2A, the reservation server 104 is associated with a vehicle-for-hire service. The reservation server receives service reservation requests (e.g., the service reservation request 206) from client devices (e.g., the client device 102), and facilitates the creation of the reservation, including identifying and selecting an appropriate reservation target (e.g., a particular vehicle), and performs any other appropriate tasks related to creating, maintaining, terminating, or processing the requested reservation.

As described above, reservation targets are associated with a media presentation system that is capable of receiving and presenting media content from a media content provider (e.g., a content server 106 associated with a media content provider), and are associated with unique identifiers. In FIG. 2A, the reservation targets are vehicles 108-n, including vehicle 108-1 that is associated with a vehicle ID of 123-45-678.

Once a user makes a reservation, the reservation server 104 associates the user with a particular reservation target. In some implementations, the reservation server 104 contains one or more tables, databases, or other appropriate data structures that associate respective users with respective reservation targets. For example, as shown in FIG. 2A, the reservation server 104 shows a vehicle ID ("123-45-678") associated with "User_1," indicating that "User_1" has acquired a reservation, and the vehicle identified by that vehicle ID is scheduled to provide the reserved service.

In some implementations, an association between a user and a reservation target is only "active" while the user is actively using the service (e.g., when the user is in the vehicle associated with the reservation, and/or while the vehicle is being driven to the user but is not currently carrying another passenger).

In some implementations, a reservation is associated with one or more time windows representing the time when the association between the particular user and the reservation target is or will be "active." For example, when a user reserves a hotel room for a particular future date range, the reservation server 104 will immediately associate the user with a particular hotel room, even though the reservation is to occur in the future. In such a case, the reservation is linked with the date or time range of the reservation, and, when the date or time of the reservation is reached, the association of the hotel room with the user becomes "active." When the association between the target and the user is "active," any features and/or functionalities that rely on an "active" association are enabled. Thus, a single reservation target can be scheduled for use by multiple different users, even though it will only be "active" for one user (or no user) at any given time.

In some implementations, reservation targets can be "active" for multiple users at a given time. For example, multiple users may be associated with a reservation for a hotel room. In such a circumstance, each of the multiple users may be actively associated with the same reservation target at the same time. Where multiple users are actively associated with the same reservation target, the features and/or functionalities that are enabled as a result of an active association are available to all of those users. For example, multiple users may be sharing a ride, and, by virtue of each user's active association with the vehicle, each user can control the media presentation system of that vehicle.

The content server 106 is described above with respect to FIG. 1, and is associated with a media content provider that stores content and provides the content, via the network(s) 112, to client devices (e.g., the client device 102). In some implementations, the content server 106 includes one or more tables, databases, or other appropriate data structures that associate respective users with respective output devices. Output devices are devices to which the content server 106 can send media content. For example, output devices include smartphones, computers, dedicated media players, network-connected stereo and/or speaker systems, network-connected vehicle media systems, and the like.

Content providers may require that an output device be associated with a particular user account (or user accounts) before it will allow that device to receive content. In some cases, a user must provide login credentials (e.g., a username and password) to an output device so that the output device can, in turn, authenticate itself and/or the user to the content provider. As a result, the user can access his or her account through the output device, including accessing playlists, "favorites," saved media, etc. Moreover, where access to the content of the content provider is based on payment of a fee (e.g., a one-time fee, a monthly subscription, etc.), the content provider is ensured that media content is being accessed only on devices that are associated with a particular user account.

As a specific example, a user may establish a smartphone as an output device by inputting login credentials to a media application on the smartphone. In response to receiving the login credentials, the media content provider associates the smartphone with the user's account as a valid output device. As another example, a user may establish a network-connected speaker system (which may not have a user interface into which a user can input credentials) as an output device by inputting login credentials and an identifier of the speaker system into a different device, such as a computer browser that is displaying a website of the media content provider. The media content provider can then associate the speaker system with the account of the user.

The content server 106 in FIG. 2A includes an example of a table in which various output devices are associated with various different users. For example, a user identified as "User_1_media" is associated with output devices "Mobile Phone," "Home PC," and "Temp Service." A user identified as "User_2_media" is associated with output devices "Mobile phone," "Mac Book," and "Temp Service." As shown, each of the output devices is associated with a unique device ID. Device IDs may be any unique or semi-unique identifier of an output device, including an IMEI number, a network address, a unique media application number, etc. (The Device ID in the figures and present description is intended as a functional description illustrating that the content server 106 can identify output devices by one or more unique identifiers. It will be understood that an output device may be associated with and/or identified by other identifiers in addition to or instead of a device ID. For example, in some implementations, an output device is identified by a unique identification number assigned by the content server as well as a network address of the output device at a particular time.) The output device illustrated in bold and italic font indicates the output device that is the currently "active" output device (regardless of whether it is currently receiving media content).

The "Temp Service" output device is reserved for an output device that is only available to the user on a temporary basis. For example, when a user reserves a hotel room or a vehicle-for-hire, it is desirable to provide access to a media presentation device of the hotel room or vehicle only while the user is using the hotel room or vehicle. Also, a user may be associated with multiple "Temp Service" entries. For example, a user may have one "Temp Service" entry for a hotel room in which they are staying, another for a vehicle-for-hire, etc.

FIG. 2A also illustrates example communications between various devices in a service reservation environment 100. Specifically, a user of the client device 102 uses the service application 202 to reserve a service (e.g., by manipulating the user interface of the service application 202 and/or inputting appropriate information). In response to the user's actions, the service application 202 sends a service reservation request 206 to the reservation server 104. In some implementations, the service reservation request 206 includes the service user ID of the user's account with the reservation service provider (e.g., "User_1").

In some implementations, the service reservation request also includes the media user ID of the user's account with the media content provider (e.g., "User_1_media"). Where a user has previously associated a media account user ID with his or her reservation service account, however, the service reservation request need not include the user ID for the media account. Instead, the reservation service can simply look up the appropriate media account user ID (e.g., in the "Media User ID" column in the table shown in the reservation server 104).

In response to receiving the service reservation request 206, the reservation server identifies a particular vehicle, and associates the vehicle ID of the identified vehicle with the user. Thus, the vehicle ID "123-45-678," corresponding to vehicle 108-1, is associated with "User_1" in reservation server 104.

The reservation server 104 then sends a media user ID/vehicle ID message 208 to the content server 106. The media user ID/vehicle ID message 208 includes information identifying the user and the particular reservation target associated with the user. For example, in some implementations, the message 208 includes the user's "Media User ID" and the associated vehicle's "Vehicle ID."

The media user ID in the message 208 is a user ID that identifies that user's account with the media content provider. In some implementations, the media user ID is or includes a username and/or password (or encrypted versions thereof) associated with the user's account. Alternatively, the media user ID is any identifier that the content server 106 can use to identify a specific user.

In some implementations, the vehicle ID in the message 208 is an address of the vehicle associated with the reservation, or any other identifier that can be used to lookup an address or otherwise establish communication with the vehicle and/or the media presentation system of the vehicle.

In some implementations, the message 208 is sent from the reservation server 104 to the content server 106 when the user is actually consuming the reserved service, such as when the user is in the vehicle 108-1 (as determined by GPS coordinates or other techniques, as described herein). Alternatively or additionally, the message 208 is sent to the content server 106 prior to the time when the user is consuming the reserved service. In such cases, the message 208 may include time window(s) in which the reservation is to be consumed. Accordingly, the content server 106 can allow media content to be accessed by the user through the media presentation device of the reserved service during the time window(s) provided by the reservation server 104.

In response to receiving the message 208, the content server 106 associates the particular vehicle identified in the message 208 with the account of the user identified in the message 208. Thus, in FIG. 2A, the vehicle ID "123-45-678" is listed as a "temp service" under the user's account, indicating that the media presentation system of this vehicle is permitted to receive and output media content by virtue of this particular user's account. By contrast, there is no device ID listed in the "temp service" entry for a user who is not associated with a reserved service (e.g., the user account for "User_2_media").

In response to satisfaction of one or more conditions, described herein, the content server 106 facilitates, allows, and/or initiates access by the vehicle 108-1 to media content from the media content provider. For example, the content server 106 sends media content 212 (e.g., via a streaming media protocol) to the vehicle 108-1. Access to media content is granted based on the association of the vehicle 108-1 with the account of the user ("User_1_media"). That is, if the vehicle 108-1 were not associated with any account with the media content provider, then the vehicle 108-1 and/or the media presentation system of the vehicle 108-1 would not be permitted to access the media content. Similarly, if the vehicle 108-1 is instead associated with a different user (e.g., "User_2_media"), then access to the media content would be based on the permissions associated with the account of that user instead.

By associating a particular reservation target with a particular user account, the media content provider can implement rules and policies relevant to the particular user account, and allow access to account-specific data that is associated with the particular user account. For example, the media content provider can enforce access limits that apply to that particular account as it would with any other media presentation device associated with that user and/or user account. Thus, if a user has already consumed a maximum allotment of media content, the user will be unable to access additional media content through the media presentation device of the reservation target. Also, account-specific data, such as stored playlists, "favorite" content items, currently playing content, and the like, are all available through (or otherwise accessible by) the media presentation system of the reservation target. Furthermore, usage can be monitored by the media content provider and stored in association with the user's account (e.g., to store media access history, track and enforce access limits, and the like).

As noted above, presentation of (or access to) media content by the vehicle 108-1 is initiated in response to satisfaction of one or more conditions. For example, the client device 102 may send a media control request 210 to the content server 106, which causes the content server 106 to initiate a stream of media content to the vehicle 108-1. (Media control requests 210 are configured to cause the content server 106 to perform any appropriate action, and include any appropriate data, messages, etc. Exemplary actions caused by media control requests 210 include initiating or terminating a media content stream, navigating between media content items, seeking within media content items, initiating playback of a playlist, and the like.) In some cases, the media control request 210 is sent in response to a user input on the client device 102. More specifically, the media control request 210 is sent to the content server 106 in response to a user selection of a user interface element (e.g., a play button, an identifier of a media content item, etc.) provided by the media application 204.

In some implementations, the media control request 210 is sent without user input. For example, the client device 102 determines or is informed that the user has or is likely to have entered the vehicle 108-1 (e.g., based on a determination that the client device 102 is within close geographic proximity to the vehicle 108-1), and, in response, sends the media control request 210 to the content server 106. More specifically, when the user gets into the vehicle 108-1, the client device 102 without user input sends a media control request 210 requesting playback of a song on the vehicle's audio system. Alternatively, just before the user enters the vehicle 108-1, the client device 102 sends a media control request without user input, and the vehicle's audio system begins caching a media stream for playback. Accordingly, in some implementations, such media control requests cause immediate playback of content by the vehicle's audio system, whereas in other implementations, they cause the vehicle's audio system to pre-fetch and/or cache media content that will be played back at a later time and/or in response to another media control request (which may be generated without user input or in response to a user input).

While not illustrated in FIG. 2A, a media control requests may come from other devices. For example, in various implementations, media control requests are sent to the content server 106 (or any other appropriate device) from the reservation server 104, the vehicle 108-1 (i.e., the reservation target), or other devices that are not shown. Also, media control requests may be sent to devices other than the content server 106, such as other servers, peer client devices, or the like, that are associated with the media content provider and can respond to a media control request.

In some implementations, media control requests that cause media content to be sent to the reservation target are sent in accordance with a determination that the user is likely to be at or near the reservation target, such as when the user is in a reserved vehicle or hotel room. For example, in the context of a vehicle-for-hire, location information of both the client device 102 and the vehicle 108-1 are analyzed to determine whether they are within a threshold distance of one another. Once it is determined that they are within the threshold distance of one another, playback of media content begins at the reservation target.

Any device or combination of devices can be used to determine whether the client device 102 and the vehicle 108-1 are within the threshold distance of one another. For example, in some implementations, the client device 102 and the vehicle 108-1 each send their respective location information to the content server 106, and the content server 106 determines whether the client device 102 and the vehicle 108-1 are within the threshold distance (e.g., within 5, 10, 25, or 50 feet, or any other appropriate distance). If so, the content server 106 begins sending (or enables the sending of) media content to the media presentation device of the vehicle 108-1.

In another implementation, the client device 102 and the vehicle 108-1 each send their respective location information to the reservation server 104, and the reservation server 104 determines whether the client device 102 and the vehicle 108-1 are within the threshold distance (e.g., within 5 feet, 10 feet, 25 feet, 50 feet, or any other appropriate distance). If so, the reservation server 104 sends a media control request to the content server 106 requesting that media content be sent (or enabled to be sent) to the media presentation device of the vehicle 108-1.

In yet another implementation, the client device 102 and the vehicle 108-1 communicate with one another to determine whether they are within the threshold distance of one another. Once it is determined, by either device, that they are within the threshold distance of one another, one or both device will send a media control request 210 to the content server 106 requesting that media content be sent (or enabled to be sent) to the media presentation system of the vehicle 108-1.

In some implementations, the communication between the client device 102 and the vehicle 108-1 includes one or both devices exchanging location information (e.g., based on GPS coordinates, cell-tower triangulation, or the like). Accordingly, the devices determine their relative proximity (and, thus, whether they are within the threshold distance) based on their detected geographic locations.

In some implementations, the communication between the client device 102 and the vehicle 108-1 includes one or both devices being brought into close enough range to allow them to detect one another (and/or connect to one another) using a short range wireless signal, such as those associated with BLUETOOTH/BTLE communication technologies, radio-frequency-based near field communication technologies, infrared communication technologies, etc.

In some implementations, an operator of a reservation target must explicitly approve of the presentation of media content before media content may be played back by the media presentation system. For example, in some implementations, if a user wants to listen to music on the audio system of the vehicle 108-1, the driver of the vehicle 108-1 must first take an appropriate action to indicate that media presentation via the audio system of the vehicle is permitted. Accordingly, a driver can control when and whether the audio system of the vehicle can be controlled by a passenger.

Approval or consent may be received before or after a media control request 210 requesting presentation of media content is sent. In either case, media content is not able to be presented at the media presentation system of the reservation target until the approval or consent is received. Moreover, in some implementations, the driver of the vehicle (or an operator or controller of any reservation target) can terminate or pause presentation of media content at any time. For example, a device and/or user interface through which the driver communicates with the reservation server 104 and/or the content server 106 provides user interface elements that, when selected, send a media control request to the content server 106 that will cause the presentation of media content to be paused or terminated. In some implementations, such a request from the operator or controller of a reservation target overrides any requests by the user. Thus, a driver of a vehicle-for-hire, for example, can turn off media content in order to avoid distractions or other dangerous conditions.

In some implementations, at some point after a user creates a reservation for a service, and before media content is played by the media presentation system of the reservation target, media content is cached or preloaded on the media presentation system of the reservation target. For example, in some cases, media content is cached or preloaded on the media presentation system of the reservation target in response to the creation of the reservation (e.g., immediately after, after a delay, etc.). In other cases, media content is cached or preloaded on the media presentation system of the reservation target a certain amount of time prior to a scheduled start time of the service. As a specific example, in some implementations, media content is cached or preloaded on the media presentation system of the reservation target 1 minute (or 2, 3, 4, or 5 minutes, or any other appropriate duration) prior to the scheduled start time of the service. In other implementations, media content is cached or preloaded on the media presentation system of the reservation target when the vehicle is a specified distance from the user (e.g., when the vehicle 108-1 is within 100 feet from the user).

The time of provision of the service is determined or estimated in any appropriate way. For example, in some implementations, in the case of a vehicle-for-hire, a scheduled pick-up time is used to determine when to begin caching or preloading content on the media presentation system of the vehicle. In other implementations, an estimated time of arrival is determined for the vehicle (e.g., based on the pick-up location, the vehicle's location, traffic, travel routes between the pick-up location and the vehicle's location, etc.), and content is cached or preloaded at the appropriate time based on the estimated time of arrival (e.g., 1 minute prior to the estimated time of arrival).

The content that is cached or preloaded on the media presentation system of the reservation target is selected in any appropriate manner. For example, if the user associated with the reservation is consuming media content when the caching or preloading is to begin, the content that is cached or preloaded is the content that the user will be listening to at the start time of the service. As a specific example, if a user is listening to a song via the client device 102, and a vehicle is scheduled to pick up the user in 2 minutes, media content corresponding to the portion of the song that will be playing in 2 minutes time will be cached or preloaded on the media presentation system of the reservation target. If the user is playing music from a playlist, album, or other sequence of content items, the media presentation system of the reservation target caches or preloads any upcoming content item in the sequence that is scheduled to be presented at or near the start time of the service.

While FIG. 2A illustrates several example communications between the illustrated components, these communications are not meant as an exhaustive list of possible communications, nor are all (or any) of these communications necessarily required. Indeed, they are intended more to illustrate an example of how data and commands may be passed between various devices to implement features and functionalities described herein, as well to illustrate how data and commands are passed between devices in some implementations. Moreover, systems and methods described with respect to FIG. 2A also apply to FIGS. 2B-2H, including techniques for caching or preloading content, enabling automatic playback of media content, and allowing service providers (e.g., drivers) to override user control.

Figure 2B:
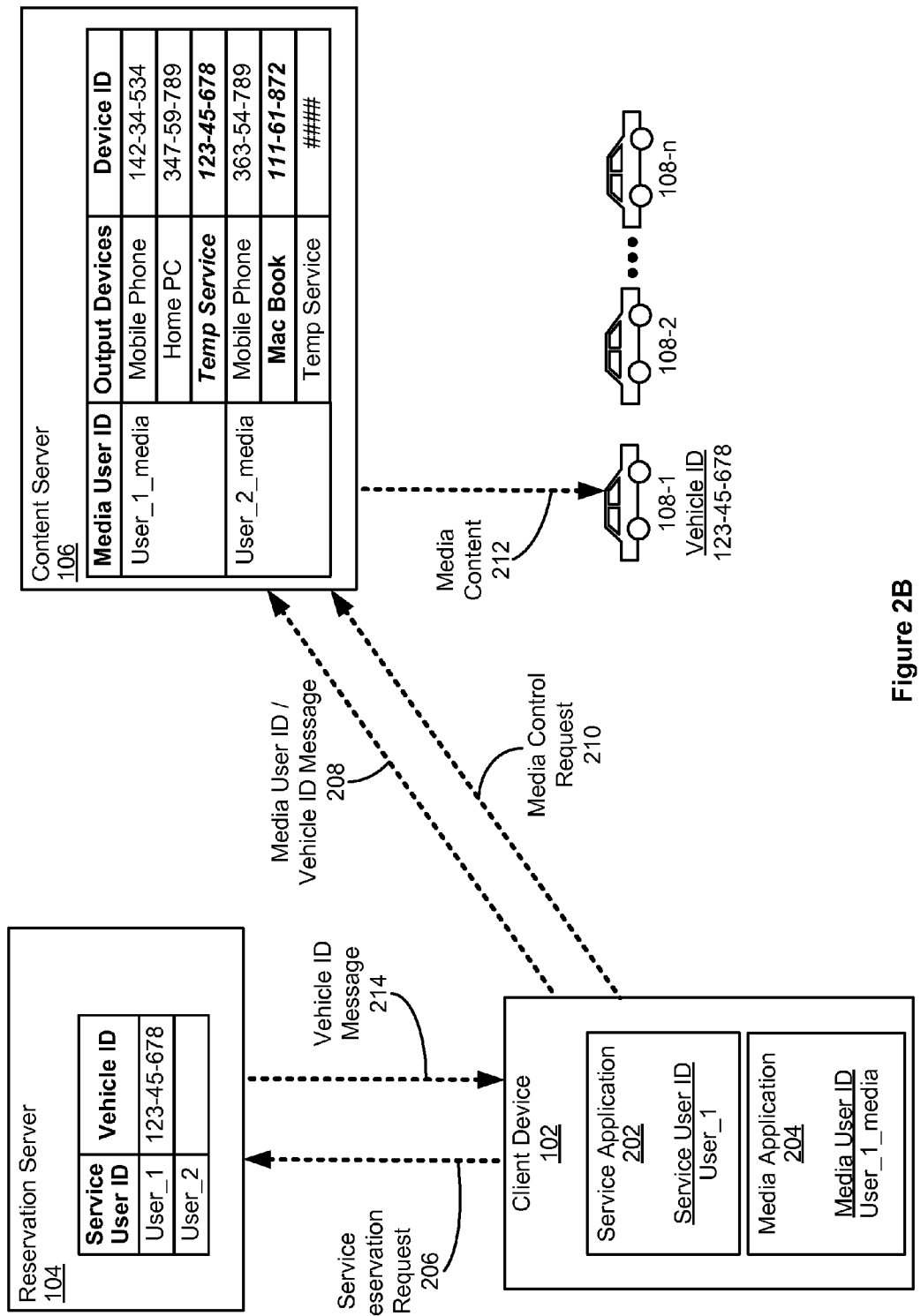

FIG. 2B is yet another block diagram of the service reservation environment 100, illustrating details of the components, data, and messages used by the service reservation environment 100, in accordance with some implementations.

In particular, the client device 102 sends a service reservation request 206 to the reservation server 104, as described above. Once the reservation server 104 identifies a particular reservation target (in this example, like that in FIG. 2A, the reservation target is a vehicle), the reservation server 104 sends a vehicle ID message 214 to the client device 102. The vehicle ID message 214 includes the vehicle identifier.

The client device 102 then sends the media user ID/vehicle ID message 208 to the content server 106. The message 208 includes the vehicle ID received from the reservation server 104 as well as the media user ID associated with the client device 102. The message 208 may be generated and sent by the service application 202 and/or the media application 204. For example, in some implementations, the service application 202 receives the vehicle ID message 214, and passes the vehicle ID contained therein to the media application 204, which, in turn, generates and sends the media user ID/vehicle ID message 208. In some implementations, the service application 202 and the media application 204 communicate and pass information between them using one or more application programming interfaces (API).

The content server 106 responds to receiving the message 208 in the same or similar manner as described above with respect to FIG. 2A. Moreover, the description of the media control request 210 and the media content 212 provided with respect to FIG. 2A applies equally to the instances shown in FIG. 2B, and are not repeated here.

One distinction between the techniques described in FIGS. 2A and 2B is that in FIG. 2A, the message 208 is sent from the reservation server 104, whereas in FIG. 2B, it is sent from the client device 102. Accordingly, a reservation target can be associated with a user account without requiring the reservation server 104 to communicate directly with the content server 106. Rather, the content server 106 need only communicate with the client device 102 in order to receive the information required to authorize the media presentation system of the reservation target (e.g., vehicle 108-1) as an output device for a user.

Figure 2C:
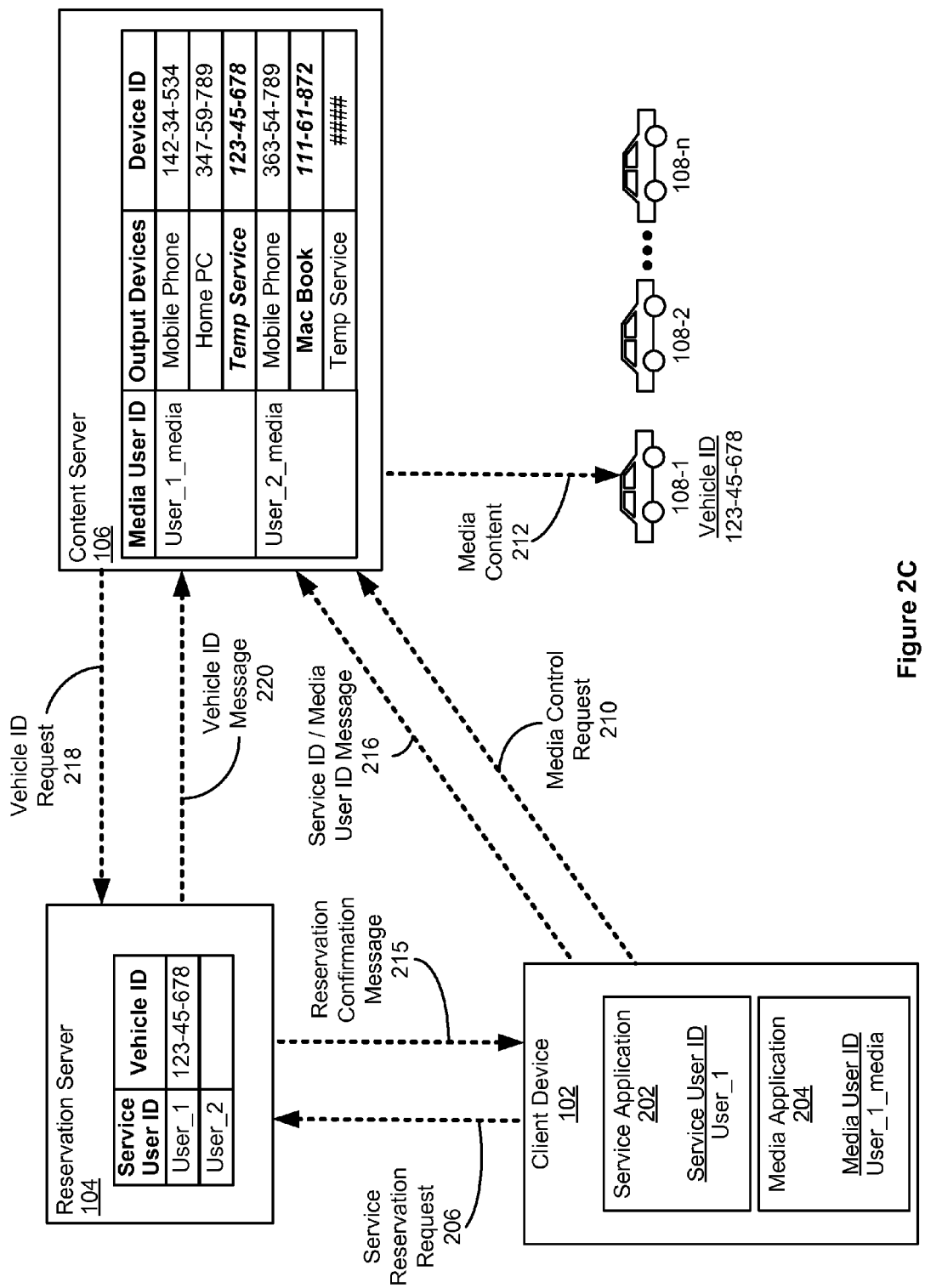

FIG. 2C is yet another block diagram of the service reservation environment 100, illustrating details of the components, data, and messages used by the service reservation environment 100, in accordance with some implementations.

In particular, the client device 102 sends a service reservation request 206 to the reservation server 104, as described above. Once a particular reservation target (e.g., a vehicle) is identified, the reservation server 104 sends a reservation confirmation message 215 to the client device.

In response to receiving the reservation confirmation message 215, the client device 102 sends a service ID/media user ID message 216 to the content server 106. In some implementations, the message 216 includes information that is usable by the reservation server 104 to identify a reservation target associated with a reservation. For example, the message 216 includes the service user ID of the user's account with the provider of the reserved service (e.g., "User_1"). The message 216 also includes information indicating that the user has reserved a transportation service.

In some implementations, instead of including a service ID in the message 216, the content server 106 uses a previously stored service ID of the user. Thus, upon receipt of a message 216 that does not include the service ID, the content server 106 looks up the service ID associated with the user from whom the message 216 was received, and uses the stored information to generate an appropriate vehicle ID request 218.

The message 216, either based on its content or the fact of its delivery to the content server 106, causes the content server 106 to send a vehicle ID request 218 to the reservation server 104. The vehicle ID request 218 includes information that is usable by the reservation server 104 to identify a reservation target associated with a reservation. For example, the vehicle ID request 218 may include the service user ID of the user's account with the service provider (in this example, "User_1").

In response to the vehicle ID request 218, the reservation server 104 looks up the vehicle ID that is associated with the user and sends a vehicle ID message 220 that includes the vehicle ID to the content server 106.

In response to receiving the vehicle ID message 220, the content server 106 associates the vehicle ID "123-45-678" (corresponding to vehicle 108-1) with the media account of the user, and establishes this target as a valid output device for the user.

The description of the media control request 210 and the media content 212 provided with respect to FIG. 2A applies equally to the instances shown in FIG. 2C, and accordingly are not repeated here.

Figure 2D:
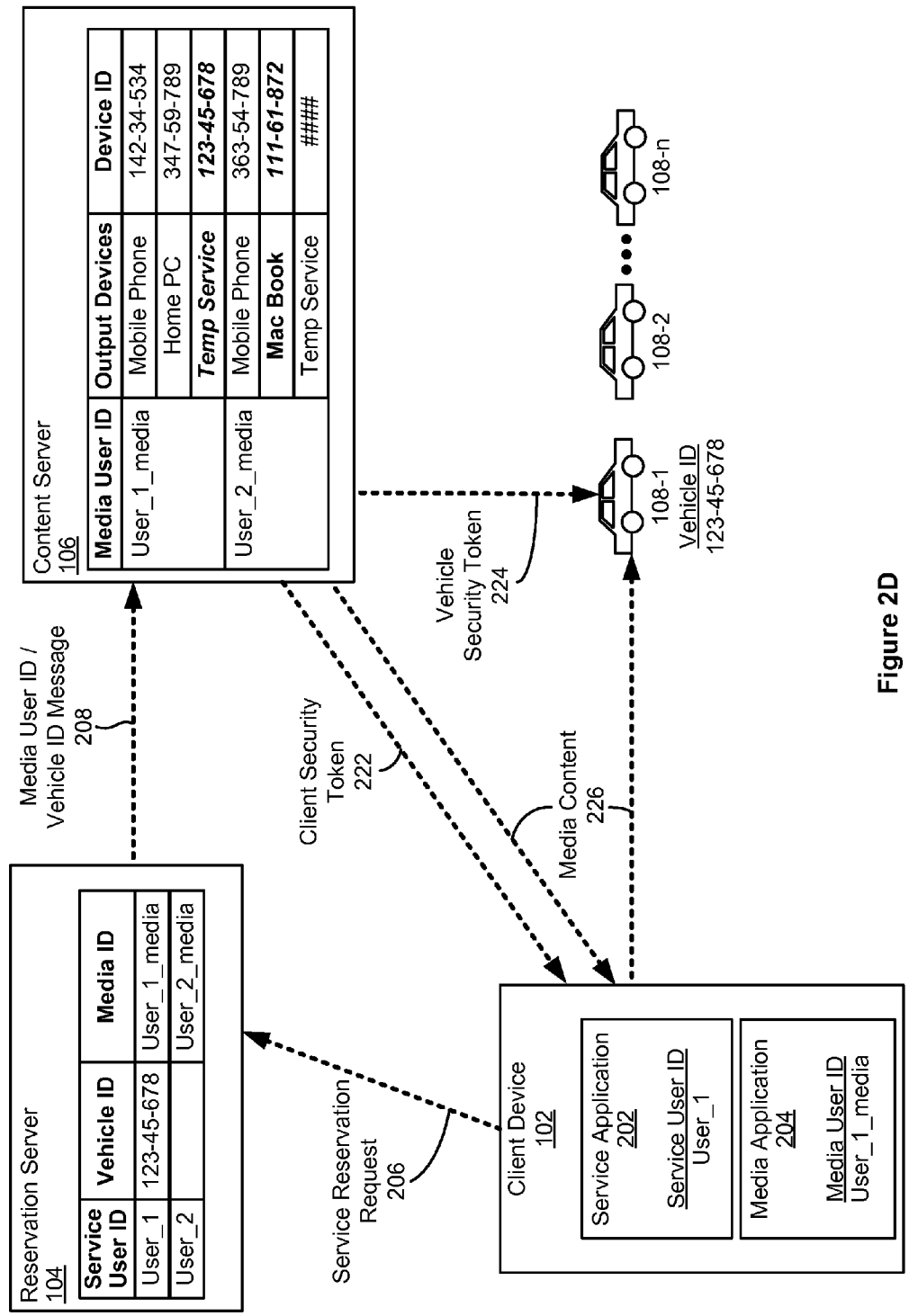

FIG. 2D is yet another block diagram of the service reservation environment 100, illustrating details of the components, data, and messages used by the service reservation environment 100, in accordance with some implementations. Whereas the techniques described with respect to FIGS. 2A-2C ultimately result in media content being delivered to the vehicle directly from the content server 106 (or other devices associated with the media content provider), the technique described with respect to FIG. 2D results in media content being delivered to the client device 102 and then forwarded to the vehicle via a local connection.

In particular, the client device 102 sends a service reservation request 206 to the reservation server 104, as described above. Once a particular reservation target (e.g., a vehicle) is identified, the reservation server 104 sends a media user ID/vehicle ID message 208 to the client device.

In response to receiving the media user ID/vehicle ID message 208, the content server 106 generates respective security tokens for the client device and the vehicle identified in the message 208. The content server 106 then sends a client security token 222 to the client device 102, and a vehicle security token 224 to the vehicle 108-1. The security tokens 222 and 224, which may also be referred to as access tokens, allow the client device 102 and the media presentation system of the vehicle 108-1 to establish a communication connection so that media content received by (or already stored on) the client device 102 can be sent to the media presentation system of the vehicle 108-1. By sending security tokens to the client device 102 as well as the vehicle 108-1, the communication connection between these devices can be established without requiring the user of the client device 102 (or the user of the media presentation system of the vehicle 108-1) to enter security credentials or otherwise manually "pair" the devices to one another.

Both security tokens are not necessarily required to be sent in order for the connection to be established between the client device 108 and the vehicle 108-1. For example, in some implementations, only one of the security tokens needs to be sent. In other implementations, the connection is established without security tokens being sent to the devices.

Once the connection is established between the client device 102 and the vehicle 108-1, media content 226 received by the client device (or media content previously stored on the client device 102) is or can be forwarded to the media presentation system of the vehicle 108-1.

In some implementations, the connection that is established between the client device 102 and the media presentation system of the vehicle 108-1 uses a wireless communication technology, such as BLUETOOTH/BTLE, Wi-Fi (e.g., IEEE 802.11), or the like. The client and vehicle security tokens (222, 244) include any information necessary or helpful to allow the client device 102 and the media presentation system of the vehicle 108-1 to establish communications. Optionally, the client device 102 connects to the media presentation system of the vehicle 108-1 using a wired connection (e.g., 2.5 mm mono, 3.5 mm mono/stereo, 6.35 mm, USB, or other connectors).

Figure 2E:
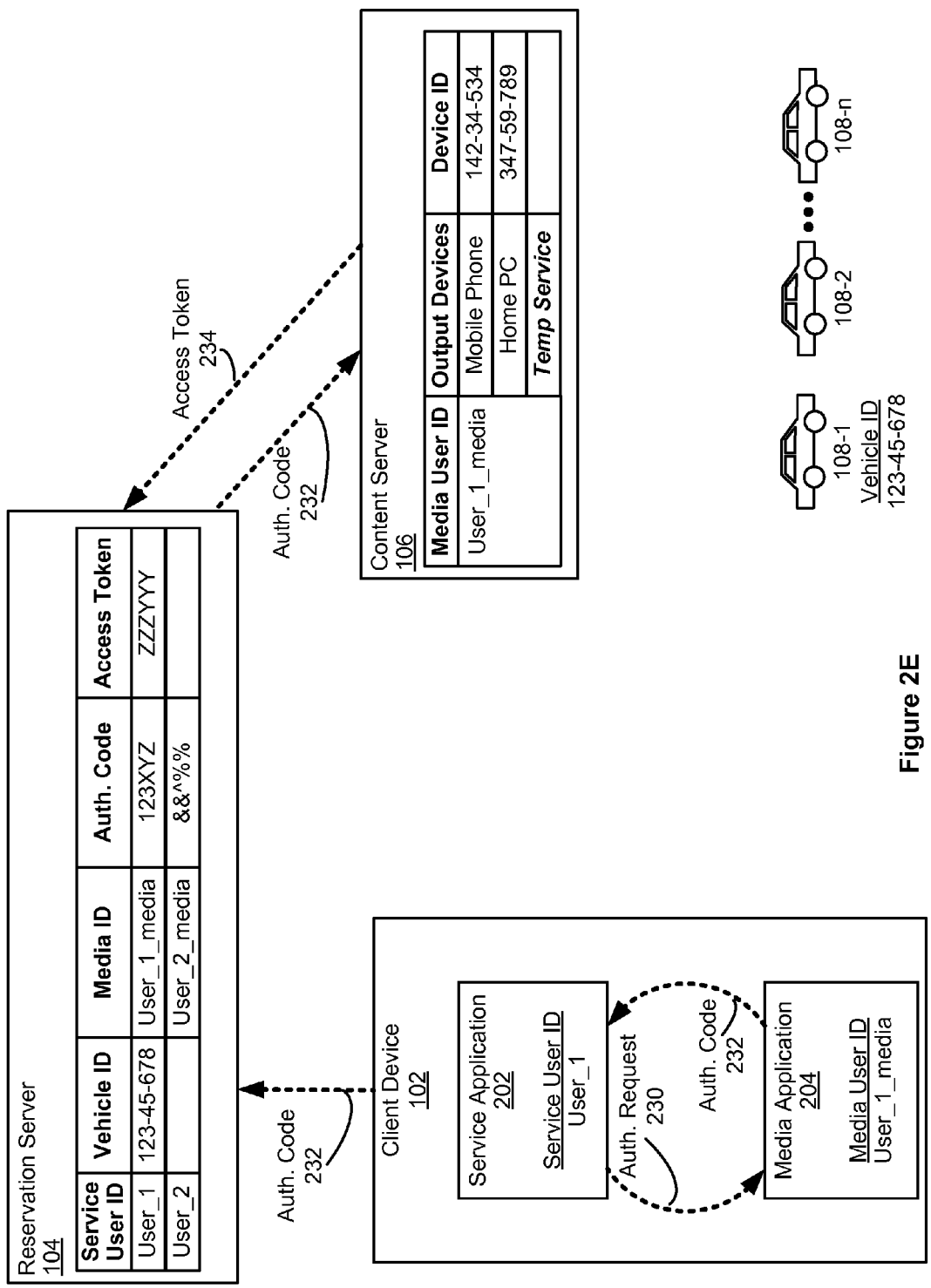

FIG. 2E is yet another block diagram of the service reservation environment 100, illustrating details of the components, data, and messages used by the service reservation environment 100, in accordance with some implementations.

In particular, FIG. 2E illustrates example communications between the illustrated components for authorizing a reservation service provider and/or an associated service application to access and/or control media from the media service provider using the account of the user.

In some implementations, a user interacts with the service application 202 to authorize the service provider (and associated components and applications, such as the reservation server 104) to interact with the media content provider to allow media presentation in a reservation target. For example, the user is presented with an option in a user interface of the service application 202 to link the user's reservation service account with the user's media account. In some embodiments, once the user selects the option to link the user's reservation service account with the user's media account, the service application 202 presents information to the user about what information related to the user's media service account (and/or other personal information) the reservation service provider will receive as a result of the account linking (also known as the privacy terms), and the user is able to continue or terminate the account linking at this point.

In response to receiving the request from the user (and, optionally, receiving an input accepting the privacy terms), the service application 202 sends an authentication request 230 to the media application 204.

The media application 204 generates and returns an authentication code 232 to the service application 202. The service application 202 then sends the authentication code 232 to the reservation server 104, which, in turn, sends the authentication code 232 to the content server 106. Example authentication code "123XYZ" is shown in the reservation server 104 in FIG. 2E. In some implementations, reservation server 104 stores the authentication code in association with the service ID (and/or other information) that is associated with the user of the client device 102.

In some implementations, the reservation server 104 sends to the content server 106 a shared secret in addition to the authentication code 232. The content server 106 then determines whether the shared secret and the authentication code 232 are valid. Checking the validity of the shared secret allows the content server 106 to ignore authentication requests from devices or entities that are not authorized to make such requests (e.g., other reservation services or malicious entities attempting to access the media service provider). Similarly, checking the validity of the authentication code 232 allows the content server 106 to ignore authentication requests from malicious devices that are attempting to access the media content provider.

If the authentication code 232 and the optional shared secret are valid, the content server 106 returns an access token 234 to the reservation server. The reservation server 104 stores the access token in association with the service ID that is associated with the user of the client device 102. As described herein, the access token is used by a reservation target to initialize a session between the reservation target (e.g., the media presentation system of a vehicle) and the content server 106. An example access token "ZZZYYY" is shown stored in the reservation server 104 in FIG. 2E.

Figure 2F:
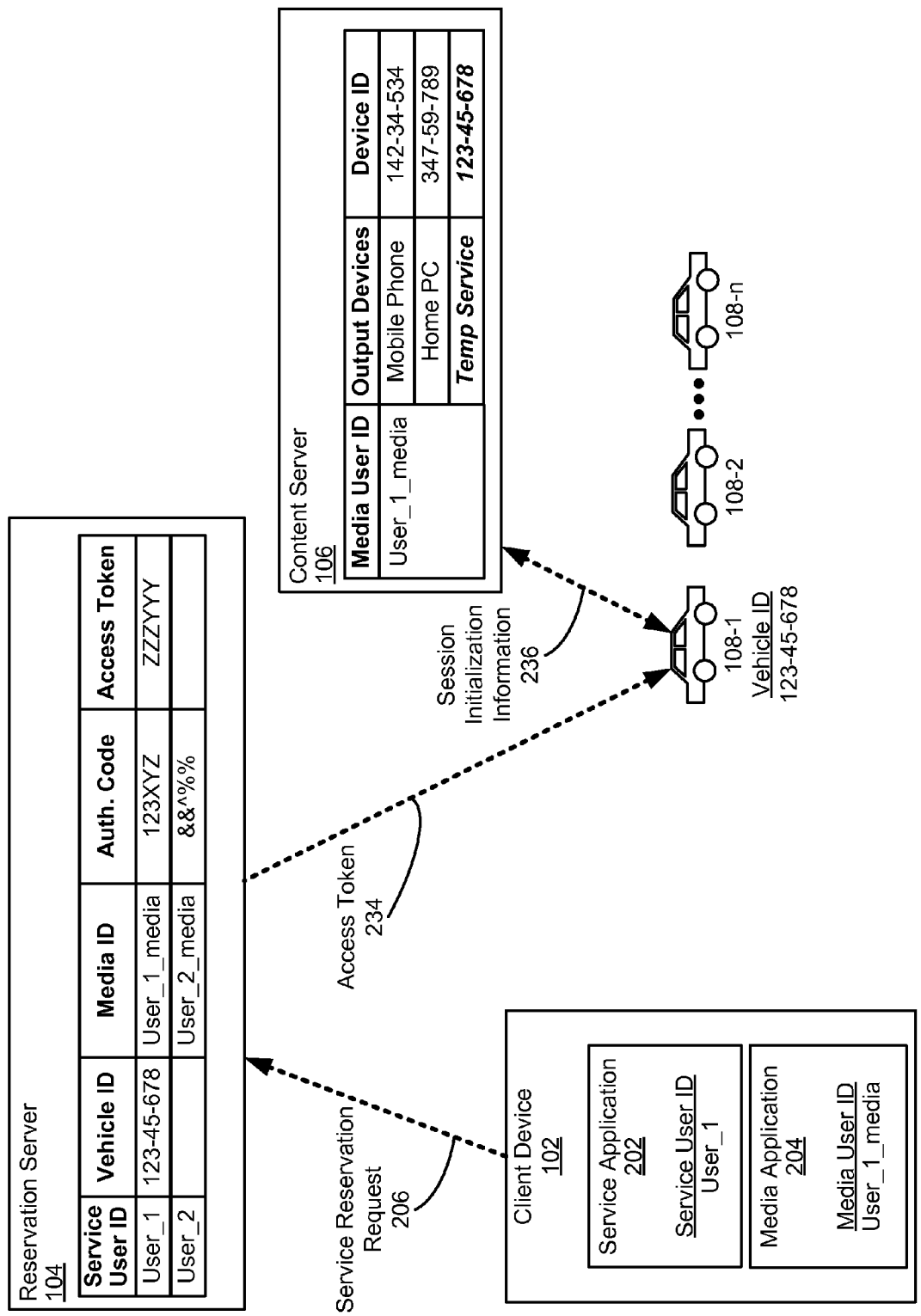

FIG. 2F is yet another block diagram of the service reservation environment 100, illustrating details of the components, data, and messages used by the service reservation environment 100 to initialize a session between a reservation target and the content server 106.

A user interacts with the client device 102 (e.g., the service application 202) to cause a service reservation request 206 to be sent to the reservation server 104. In some implementations, the service reservation request 206 includes the service user ID of the user's account with the reservation service provider (e.g., "User_1"). In response to receiving the service reservation request 206, the reservation server 104 identifies a reservation target (e.g., vehicle 108-1). In some implementations, identifying the reservation target includes publishing a reservation request to a plurality of reservation targets, and receiving an acceptance of the reservation request from a particular reservation target. The particular reservation target that accepted the reservation request is then identified as the reservation target.

Once the reservation target is identified (e.g., vehicle 108-1), the reservation server 104 sends the access token 234 to the reservation target (along with optional additional information, such as the service user ID and/or the media ID of the requesting user). In some implementations, the access token 234 is sent to and/or received by a media presentation device of the vehicle 108-1 and/or a device associated with an operator of the vehicle 108-1. (The reservation target may be a device that is associated with the operator and is distinct from the media presentation device, or may be the media presentation device itself.)

The reservation target then sends session initialization information 236 to the content server 106. In some implementations, the session initialization information 236 includes the access token 234. The content server 106 verifies that the access token 236 is valid, and, if so, it initializes a session between the reservation target (e.g., a media presentation system of the vehicle 108-1 or a device associated with an operator of the vehicle 108-1) and the content server 106. In some implementations, initialization of the session includes the content server 106 establishing the reservation target as a valid output device for the user. As shown in FIG. 2F, the Vehicle ID "123-45-678" is stored in association with the user's media account as a temporarily valid output device ID.

Figure 2G:
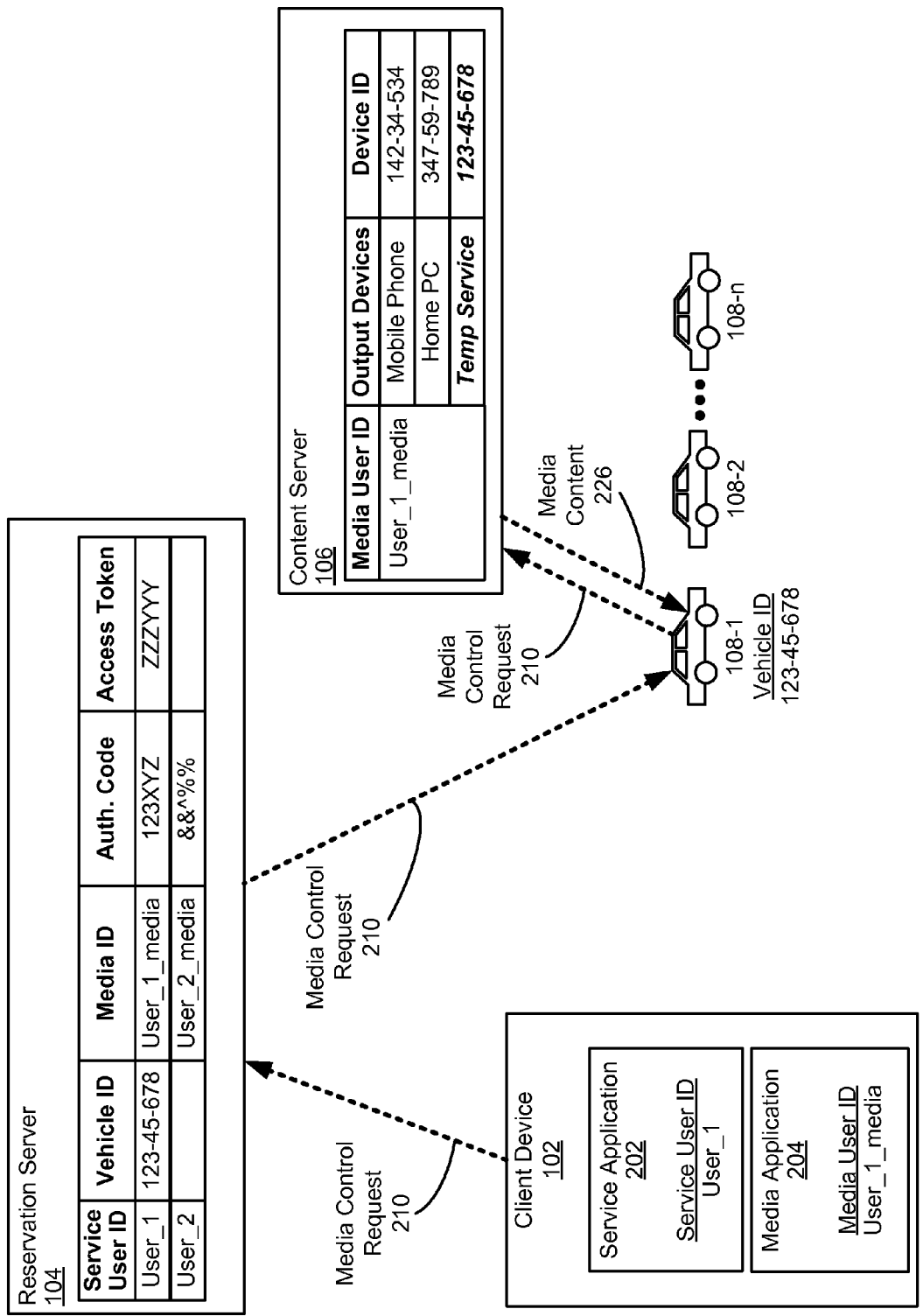

FIG. 2G is yet another block diagram of the service reservation environment 100, illustrating details of the components, data, and messages used by the service reservation environment 100 to request media presentation by a reservation target, in accordance with some implementations.

As noted herein, in some implementations, the service application 202 includes controls and/or user interfaces enabling a user to navigate, select for playback, and otherwise control or interact with media content. In response to a user's selection of such controls, the client device 202 sends a media control request 210 to the reservation server 104. The reservation server 104 forwards the media control request 210 to the reservation target associated with the user (e.g., vehicle 108-1), and the reservation target forwards the media control request 210 to a device associated with the operator of vehicle 108-1. Alternatively, the reservation server 104 forwards the media control request 210 to the device associated with the operator of vehicle 108-1 (e.g., the device is effectively the reservation target).

In some implementations, the reservation target is associated with an application that is primarily configured to facilitate communications and interactions with the reservation server 104 (e.g., service application 202). For example, an operator of vehicle 108-1 will have a smart phone with an application that allows the driver to accept reservation requests, etc. In some implementations, the application associated with the reservation target includes a media control module (e.g., an embedded software development kit ("eSDK") such as media control module 350, FIG. 3, a software development kit, one or more application programming interfaces, or any other appropriate programmatic element) that communicates with or operates on behalf of the content server 106. For example, when the reservation target receives the media control request 210 (FIG. 2G), the application will forward the media control request 210 to the media control module 350 (or a component thereof, such as media coordination module 324), and the media control module 350 communicates (or facilitates communication) with the content server 106 to execute the media control request 210 and/or receive media content 226 from the content server 106.

Figure 2H:
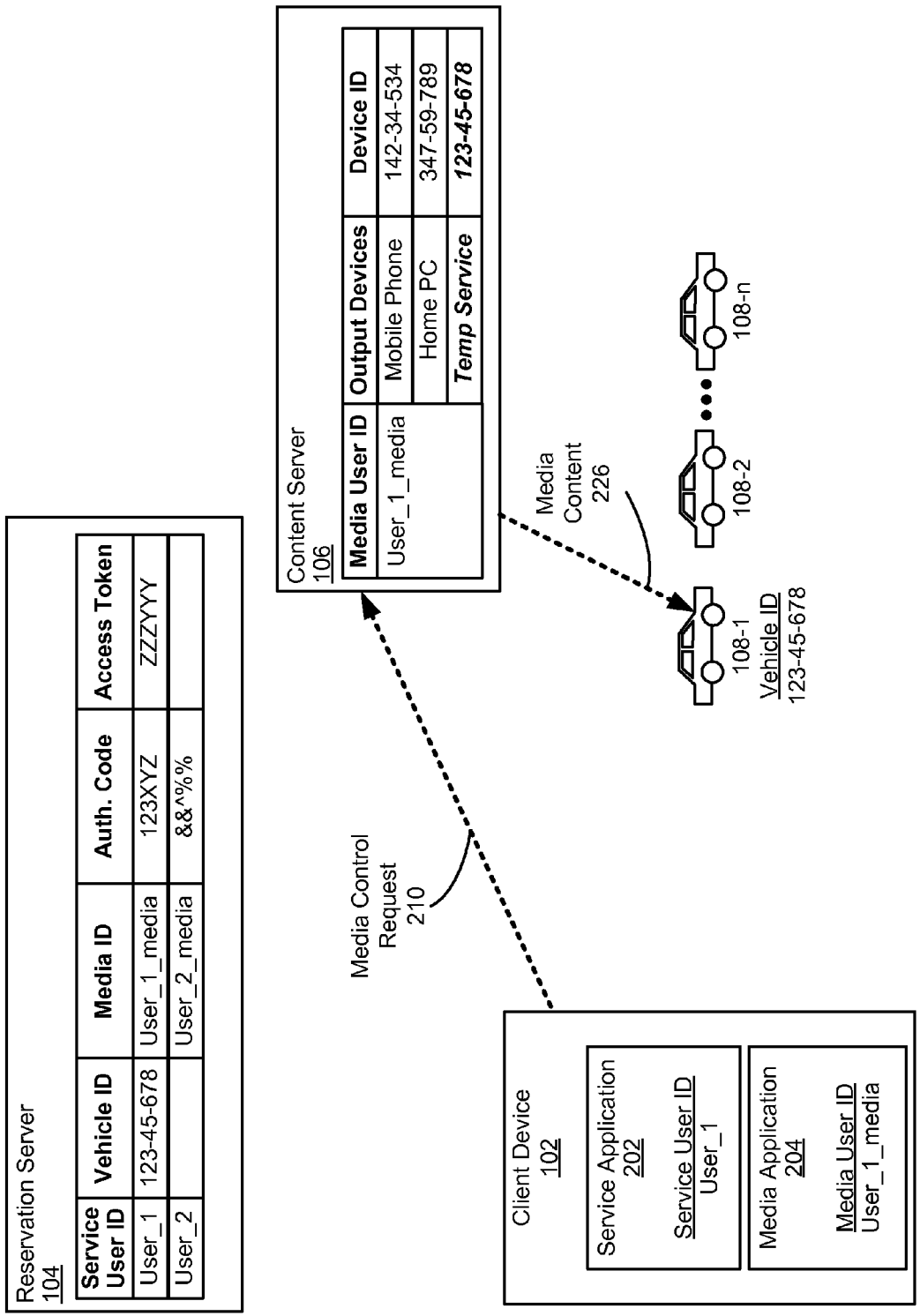

FIG. 2H is one more block diagram of the service reservation environment 100, illustrating details of the components, data, and messages used by the service reservation environment 100 to request media presentation by a reservation target, in accordance with some implementations.

In some implementations, instead of using the service application 202 to select media content items, a user of the client device 102, in some implementations, uses the media application 204 to select media content items. As pictured in FIG. 2H, after the user selects a media content item using media application 204, a media control request 210 is sent to content server 106, which then routes sends the media content item corresponding to the media control request 210 to the device associated with the operator of vehicle 108-1 (e.g., by sending the media content item (or audio data associated therewith) to the media coordination module 324 which then sends the media content item to the service application 202). The device associated with the operator of the vehicle 108-1 is then able to present the media content item at the media presentation system of the vehicle 108-1.

The device associated with the operator of the vehicle 108-1 may terminate the session (e.g., when the user's ride is over). For example, the media controller module 350 sends a message to the content server 106 terminating the session.

Additional details regarding the exchanges of information illustrated in FIGS. 2A-2H are provided below in reference to FIGS. 14A-14C.

Once again, FIGS. 2A-2H use a vehicle-for-hire service as a concrete example of a reservation service for which the systems and methods described herein are applied. However, it will be understood that the figures, devices, messages, and the related discussion thereof, apply by analogy to any reservable service and any reservation target, including hotel/ boarding rooms, cabanas, air travel, train travel, office rental, and the like. Moreover, in some implementations, the systems and methods described herein apply to other contexts, services, or industries, regardless of whether they use a "reservation" paradigm. For example, any entity that is capable of authorizing a media presentation device to access media content via a particular user's account can use the disclosed systems and methods, regardless of whether the authorization is related to or associated with a "reservation."

Figure 3:
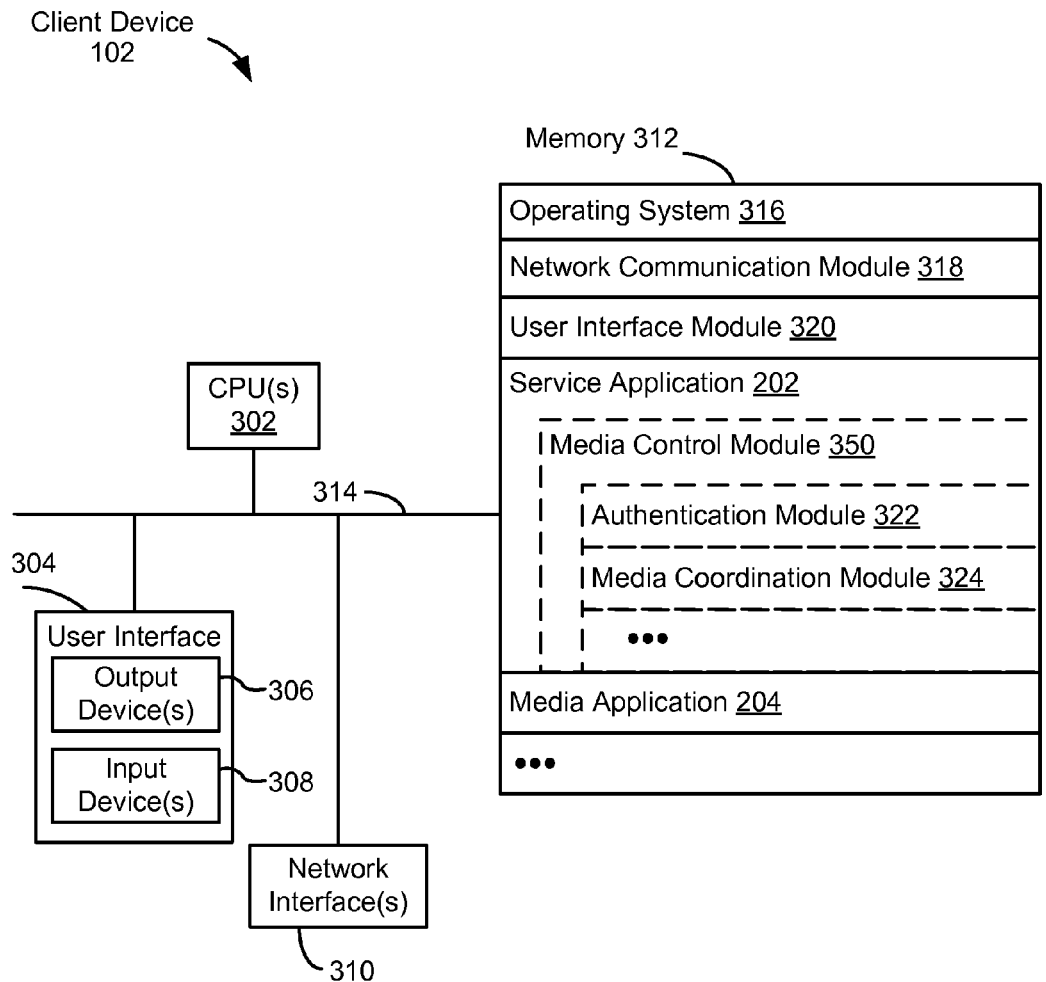
FIG. 3 is a block diagram illustrating a client device, in accordance with some implementations.

FIG. 3 is a block diagram illustrating a representative client device (e.g., the client device 102) in accordance with some implementations. The client device 102, typically, includes one or more processing units/cores (CPUs) 302, one or more network interfaces 310, memory 312, and one or more communication buses 314 for interconnecting these components. The client device 102 includes (or is configured to be connected to) a user interface 304. The user interface 304 includes one or more output devices 306, including user interface elements that enable the presentation of media content to a user, including via speakers or a display. The user interface 304 also includes one or more input devices 308, including user interface components that facilitate user input such as a keyboard, a mouse, a remote control, a voice-command input unit, a touch-sensitive display (sometimes also herein called a touch screen display), a touch-sensitive input pad, a gesture capturing camera, or other input buttons. In some implementations, the client device 102 is a wireless device, such as a mobile phone or a tablet computer. Furthermore, in some implementations, the client device 102 uses a microphone and voice recognition or a camera and gesture recognition to supplement or replace the keyboard.

Memory 312 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 312, optionally, includes one or more storage devices remotely located from one or more CPUs 302. Memory 312, or, alternatively, the non-volatile memory device(s) within memory 312, includes a non-transitory computer readable storage medium. In some implementations, memory 312, or the computer readable storage medium of memory 312, stores the following programs, modules, and data structures, or a subset or superset thereof:

- an operating system 316 that includes procedures for handling various basic system services and for performing hardware dependent tasks;
- a network communication module 318 for connecting the client device 102 to other computing devices (e.g., a media presentation system of a reservation target, the reservation server 104, and/or the content server 106) via the one or more communication network interfaces 310 (wired or wireless) connected to one or more networks 112 such as the Internet, other Wide Area Networks, Local Area Networks, Personal Area Networks, metropolitan area networks, VPNs, peer-to-peer, content delivery networks, ad-hoc connections, and so on;
- a user interface module 320 that receives commands and/or inputs from a user via the user interface 304 (e.g., from the input device(s) 308, which may include keyboard(s), touch screen(s), microphone(s), pointing device(s), eye tracking components, three-dimensional gesture tracking components, and the like), and provides user interface objects and other outputs for display on the user interface 304 (e.g., the output device(s) 306, which may include a computer display, a television screen, a touch-screen, etc.);
- a service application 202 (e.g., a web browser or any other appropriate application or component of an application) for communicating with a device associated with a provider of reservable services (e.g., the reservation server 104), for communicating with other applications, modules, and/or services on the client device 102 or another device (e.g., a media application, the content server 106), and, optionally, for providing controls and/or user interfaces enabling a user to request to reserve a service, and, optionally, navigate, select for playback, and otherwise control or interact with media content, whether the media content is stored locally or remotely, the service application 202 optionally including:
  - a media control module 350 for facilitating communications between the service application 202 and a content server associated with a media content provider, including validating authentication tokens received from the content server (e.g., access token 234, FIG. 2F) and receiving media content items from the content server (e.g., media content item 226, FIG. 2G), the media control module 350 optionally including:
    - an authentication module 322 for validating the authentication tokens, and
    - a media coordination module 324 for receiving the media content items; and
- a media application 204 (e.g., a media player, web browser, or any other appropriate application or component of an application) for receiving, processing, and presenting media content (e.g., media content streams, media content files, advertisements, webpages, videos, audio, games, etc.), for sending media content to another device for output (e.g., via BLUETOOTH/BTLE communication, or another appropriate communication technology or protocol), for communicating with other applications, modules, and/or services on the client device 102 or another device (e.g., the service application 202, the content server 106, etc.), and for providing controls and/or user interfaces enabling a user to navigate, select for playback, and otherwise control or interact with media content, whether the media content is stored locally or remotely.

Each of the above identified elements may be stored in one or more of the previously mentioned memory devices, and corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 312, optionally, stores a subset of the modules and data structures identified above. Furthermore, memory 312, optionally, stores additional modules and data structures not described above.

Figure 4:
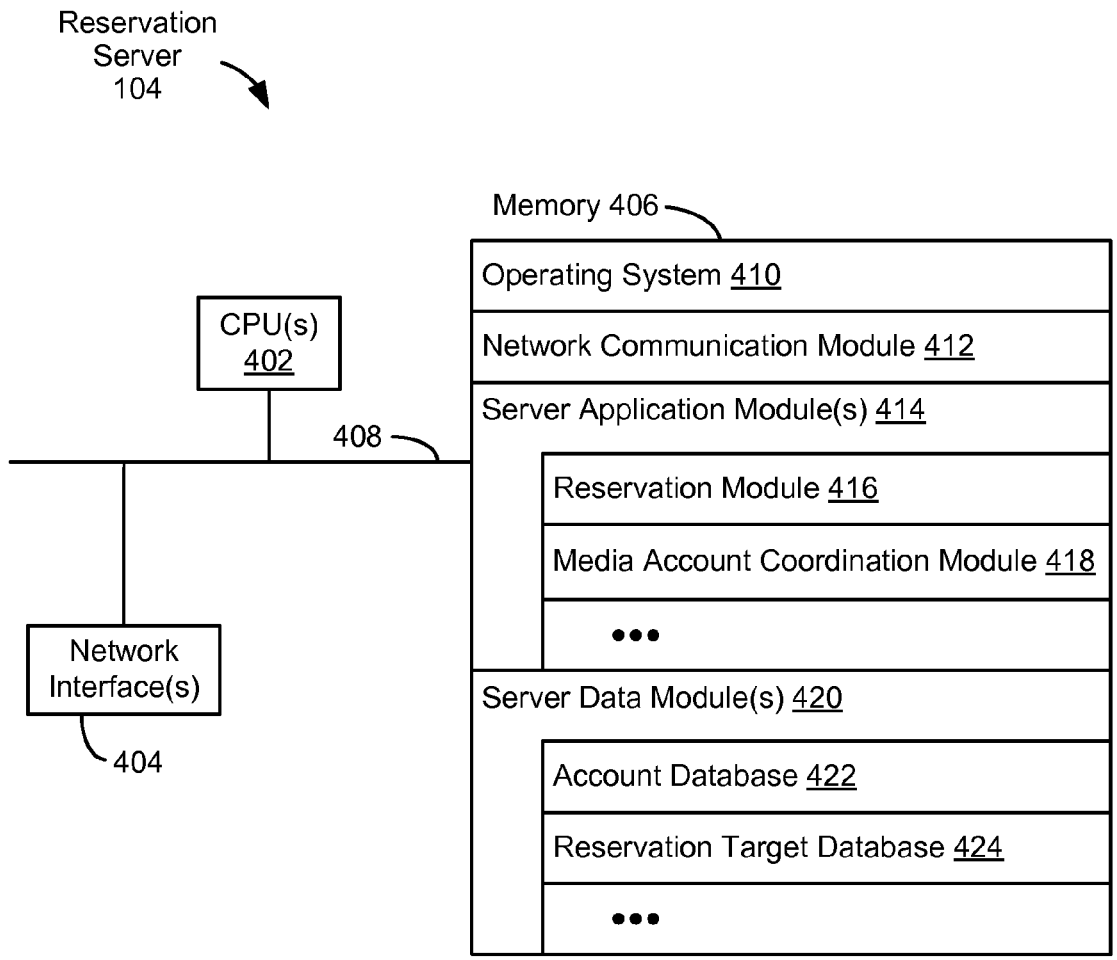
FIG. 4 is a block diagram illustrating a reservation server, in accordance with some implementations.

FIG. 4 is a block diagram illustrating a representative reservation server (e.g., reservation server 104) in accordance with some implementations. The reservation server 104, typically, includes one or more processing units/cores (CPUs) 402, one or more network interfaces 404, memory 406, and one or more communication buses 408 for interconnecting these components.

Memory 406 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 406, optionally, includes one or more storage devices remotely located from one or more CPUs 402. Memory 406, or, alternatively, the non-volatile memory device(s) within memory 406, includes a non-transitory computer readable storage medium. In some implementations, memory 406, or the computer readable storage medium of memory 406, stores the following programs, modules and data structures, or a subset or superset thereof:

- an operating system 410 that includes procedures for handling various basic system services and for performing hardware dependent tasks;
- a network communication module 412 that is used for connecting the reservation server 104 to other computing devices via one or more communication network interfaces 404 (wired or wireless) connected to one or more networks 112 such as the Internet, other Wide Area Networks, Local Area Networks, Personal Area Networks, metropolitan area networks, VPNs, peer-to-peer, content delivery networks, ad-hoc connections, and so on;
- one or more server application modules 414 for enabling the reservation server 104 to perform various functionalities, the server application modules 414 including, but not limited to, one or more of:
    - a reservation module 416 for receiving and processing reservation requests, including, in some implementations, receiving a reservation request from a user, identifying a reservation target, associating the identified reservation target with the user, and sending a message confirming the reservation to the user; and
    - a media account coordination module 418 for associating users' media accounts with the users' reservation service accounts, for associating reservation targets with users' media accounts, and for communicating with one or more other devices (e.g., the content server 106) to supply identifiers of reservation targets associated with reserved services, reservation time windows, and the like; and
- one or more server data modules 420 for storing data related to the reservation server 104, including but not limited to:
    - an account database 422 that stores account information for user accounts with the reservation service, such as user profiles, credentials (including user identifiers, passwords, email addresses, etc.), credentials or identifiers of media accounts (or other accounts) associated with users, and the like; and
    - a reservation target database 424 that stores identifiers of and information about reservation targets.

Each of the above identified elements may be stored in one or more of the previously mentioned memory devices, and corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 406, optionally, stores a subset or superset of the modules and data structures identified above. Furthermore, memory 406, optionally, stores additional modules and data structures not described above.

Although FIG. 4 shows the reservation server 104, FIG. 4 is intended more as a functional description of the various features that may be present in one or more servers than as a structural schematic of the implementations described herein. In practice, and as recognized by those of ordinary skill in the art, items shown separately could be combined and some items could be separated. For example, some items shown separately in FIG. 4 could be implemented on a single server and single items could be implemented by one or more servers. The actual number of servers used to implement the reservation server 104, and how features are allocated among them, will vary from one implementation to another and, optionally, depends in part on the amount of data traffic that the system must handle during peak usage periods as well as during average usage periods.

Figure 5:
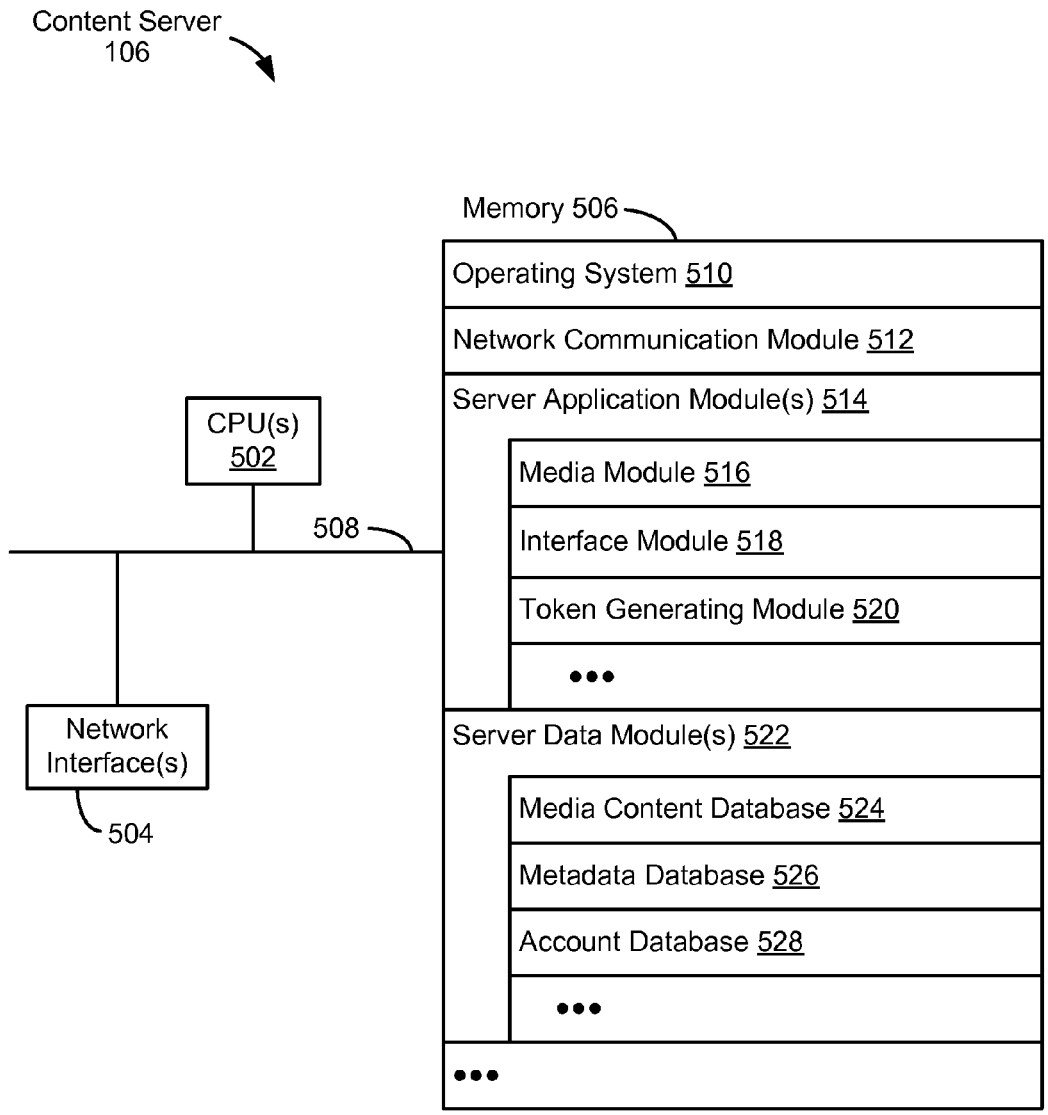
FIG. 5 is a block diagram illustrating a content server, in accordance with some implementations.

FIG. 5 is a block diagram illustrating a content server (e.g., the content server 106) in accordance with some implementations. The content server 106, typically, includes one or more processing units/cores (CPUs) 502, one or more network interfaces 504, memory 506, and one or more communication buses 508 for interconnecting these components.

Memory 506 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 506, optionally, includes one or more storage devices remotely located from one or more CPUs 502. Memory 506, or, alternatively, the non-volatile memory device(s) within memory 506, includes a non-transitory computer readable storage medium. In some implementations, memory 506, or the computer readable storage medium of memory 506, stores the following programs, modules and data structures, or a subset or superset thereof:

- an operating system 510 that includes procedures for handling various basic system services and for performing hardware dependent tasks;
- a network communication module 512 that is used for connecting the content server 106 to other computing devices via one or more communication network interfaces 504 (wired or wireless) connected to one or more networks 112 such as the Internet, other Wide Area Networks, Local Area Networks, Personal Area Networks, metropolitan area networks, VPNs, peer-to-peer, content delivery networks, ad-hoc connections, and so on;
- one or more server application modules 514 for enabling the content server 106 to perform various functionalities, the server application modules 514 including, but not limited to, one or more of:
    - a media module 516 for processing requests for media content and facilitating access to requested media content items by client devices (e.g., the client device 102, media presentation systems of reservation targets, etc.) including, optionally, streaming media content to such devices; and
    - an interface module 518 for:
        - sending (e.g., streaming) media content to and receiving information from a client device (e.g., the client device 102) remote from the content server 106; in various implementations, information received from the client device includes requests from client devices for media content (e.g., requests to download or stream media content to the client device or another device remote from the client device, requests to control said media content, etc.), and messages including information relating to service reservations (e.g., identifiers of reservation targets, account identifiers, etc.);
        - sending information to a reservation service (e.g., the reservation server 104), including but not limited to requests for information related to service reservations, requests for identifiers of reservation targets, information usable by the reservation server 104 to identify particular reservations and/or information relating thereto, and the like; and receiving information from a reservation service (e.g., the reservation server 104), including but not limited to reservation information (e.g., identifiers of reservation targets, reservation time windows, identifiers of users associated with the reservations, etc.);

an optional token generating module 520 for generating security tokens that facilitate connections between two or more respective devices associated with respective users, and sending the security tokens to the respective devices; and one or more server data module(s) 522 for handling the storage of and access to media content items and metadata relating to the media content items; in some implementations, the one or more media content module(s) 522 include:

a media content database 524 for storing media content items (e.g., audio files, video files, text files, etc.);

a metadata database 526 for storing metadata relating to the media content items; and an account database 528 that stores account information for user accounts with the media content provider, including user profiles, credentials (e.g., user identifiers, passwords, email addresses, etc.), credentials or identifiers of service accounts (or other accounts) associated with users, and the like.

Each of the above identified elements may be stored in one or more of the previously mentioned memory devices, and corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 506, optionally, stores a subset or superset of the modules and data structures identified above. Furthermore, memory 506, optionally, stores additional modules and data structures not described above.

Although FIG. 5 shows the content server 106, FIG. 5 is intended more as a functional description of the various features that may be present in one or more servers than as a structural schematic of the implementations described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the content server 106, and how features are allocated among them, will vary from one implementation to another and, optionally, depends in part on the amount of data traffic that the system must handle during peak usage periods as well as during average usage periods.

Figure 6:
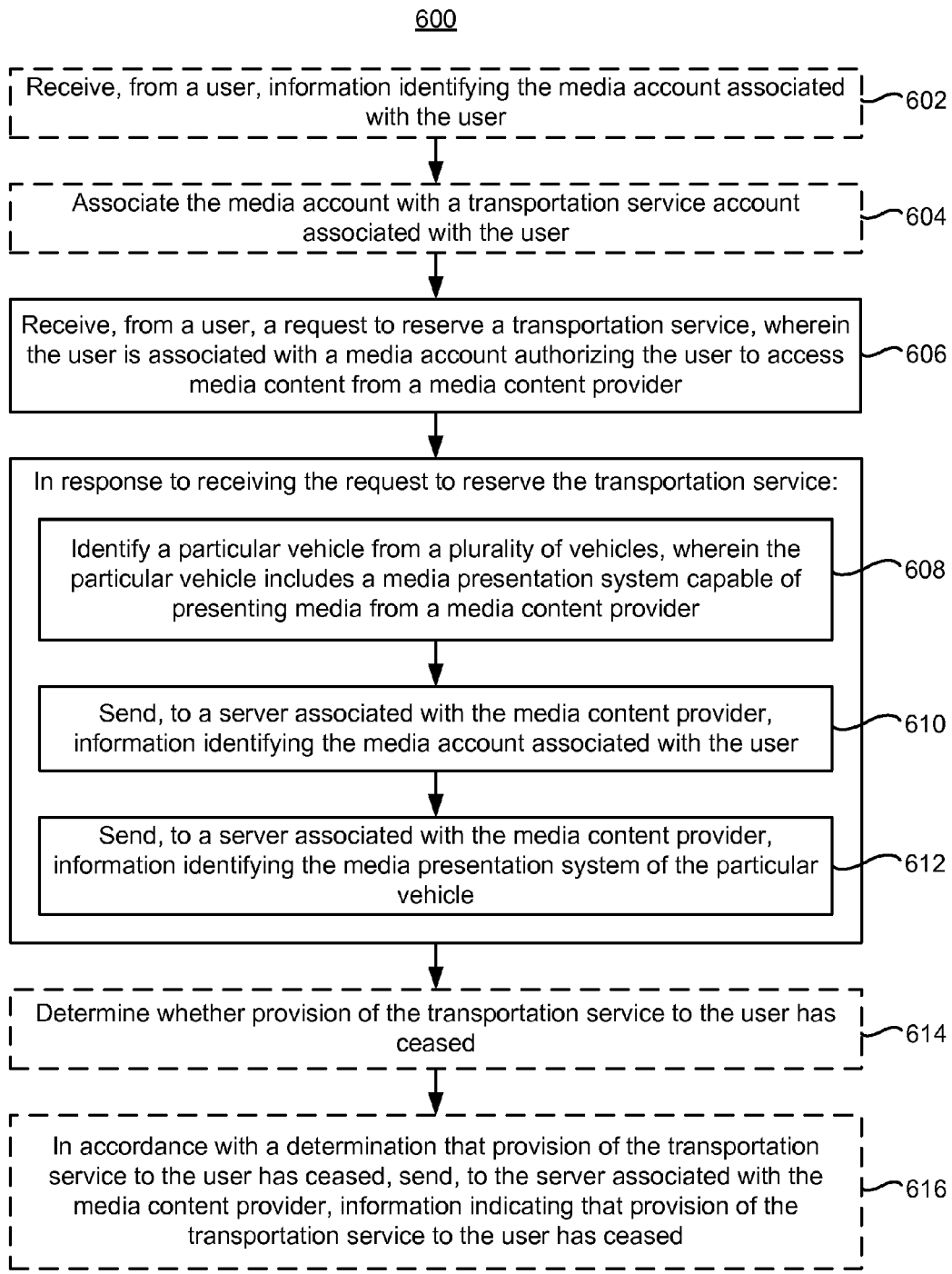
FIGS. 6-14C are flowcharts of methods for providing temporary access to media content, in accordance with some implementations.

Attention is directed to FIG. 6, which is a flowchart illustrating a method 600 for providing media presentation in a reservation target (e.g., a vehicle), in accordance with some implementations. In some implementations, the method 600 is performed at an electronic device having one or more processors and memory storing one or more programs for execution by the one or more processors. In some implementations, the device that performs the method 600 is the reservation server 104. While the following steps are described as being performed by the reservation server 104, it will be understood that any given step may be performed instead by any other appropriate device, server, system, or combination of such components (e.g., multiple computers or servers associated with a reservation service).

The reservation server (e.g., the reservation server 104) receives, from a user, a request to reserve a transportation service, wherein the user is associated with a media account authorizing the user to access media content from a media content provider (606). (As mentioned above, although method 600 is described as relating to a transportation service where the reservation targets are vehicles, the same description also applies to other reservable services. For example, in some implementations, instead of a request to reserve a transportation service, the reservation server receives a request to reserve a housing service (e.g., a hotel room, a vacation rental, etc.), air travel, a cabana, or the like. In such cases, the reservation target is any appropriate reservation target for such a service, such as a particular hotel room, a particular airline seat on a particular flight, a particular cabana, and/or media presentation system(s) associated therewith.)

In response to receiving the request to reserve the transportation service, the reservation server identifies a particular vehicle from a plurality of vehicles, wherein the particular vehicle includes a media presentation system capable of presenting media from a media content provider (608). In some implementations, the selection of the particular vehicle occurs at a user or client device (e.g., client device 102). In other words, the user selects the particular vehicle, and information identifying the selected vehicle is sent to the transportation service server. In other implementations, the reservation server 104 or an operator of the reservation server 104 selects the particular vehicle. In some cases, the user selects the particular vehicle, but the driver can decline the user's request.

In some implementations, the media presentation system of the particular vehicle includes a handheld electronic device with wireless communication capabilities (e.g., a smartphone, tablet computer, streaming media receiver, GPS device, and/or any other appropriate device).

In some implementations, the handheld electronic device is configured to be communicatively coupled to an audio system of the particular vehicle, via wired and/or wireless connection (e.g., using BLUETOOTH/BTLE, Wi-Fi, etc.).

In response to receiving the request to reserve the transportation service, the reservation server sends, to a server associated with the media content provider, information identifying the media account associated with the user (610). In some implementations, the information identifying the media account associated with the user is or includes a username, a password, a unique identifier, and/or any other information that identifies the media account associated with the user or with which information that identifies the user can be derived or retrieved.

In response to receiving the request to reserve the transportation service, the reservation server sends, to a server associated with the media content provider, information identifying the media presentation system of the particular vehicle (612). In some implementations, information identifying the media presentation system of the particular vehicle is or includes a vehicle identification number, a network address of the media presentation device, a unique identifier of the media presentation system (e.g., a media access control (MAC) address, or any of the various identifiers associated with wireless communication devices, including an international mobile station equipment identity number (IMEI), a mobile equipment identifier number (MEID), an international mobile subscriber identity number (IMSI), an electronic serial number (ESN), a mobile subscriber integrated services digital network-number (MSISDN), etc.), or any other appropriate information that identifies the media presentation system of the particular vehicle or from which information that identifies media presentation system of the particular vehicle can be derived or retrieved.

In some implementations, prior to receiving the request to reserve the transportation service, the reservation server receives, from the user, information identifying the media account associated with the user (602) and associates the media account with a transportation service account associated with the user (604), wherein the transportation service account associated with the user authorizes the user to access transportation services provided by a transportation service provider. For example, as shown in FIG. 2A, a reservation service user account identified as relating to "User_1" is associated or linked with the media account of "User_1_media." This association between accounts and/or user identifiers is maintained by the reservation server 104 for future reference or use.

In some implementations, instead of or in addition to the reservation server 104 associating the media account with the transportation service account of the user, the content server 106 associates the media account with the transportation service account of the user.

In some implementations, the reservation server determines whether provision of the transportation service to the user has ceased (614).

In some implementations, a determination that provision of the transportation service to the user has ceased (at 614) corresponds to receipt of an indication from an electronic device associated with the particular vehicle (e.g., a smartphone, GPS device, taxi meter, or any other appropriate device) that provision of the transportation service to the user has ceased. For example, in some implementations, a driver interacts with a metering application in order to signal that the user has been dropped off at the desired destination (which may be required of the driver by the transportation service provider to enable calculation of the fare due to the transportation service provider). In other cases, the determination is made automatically. For example, using any appropriate locating technique(s) (e.g., near field communications, GPS, etc.) one or more devices determine that the user has left the proximity of the vehicle, and an indication of this event is sent to the reservation server.

Alternatively or additionally, a determination that provision of the transportation service to the user has ceased corresponds to a determination that a payment receipt or a service completion message has been sent to the client device 102 (e.g., via email, text message, SMS, in-application messaging service, etc.). Such messages may be sent as a matter of course, as users may be solicited for feedback after each ride. Such solicitations effectively indicate that provision of the transportation service has ceased, as they are sent automatically after each transportation instance.

In accordance with a determination that provision of the transportation service to the user has ceased, the reservation server sends, to the server associated with the media content provider (e.g., the content server 106), information indicating that provision of the transportation service to the user has ceased (616). In response to receiving information indicating that provision of the transportation service has ceased, the server associated with the media content provider ceases sending/allowing media content to be sent to the media presentation system of the particular vehicle and/or disassociates the media presentation system of the particular vehicle from the media account associated with the user.

Figure 7A:
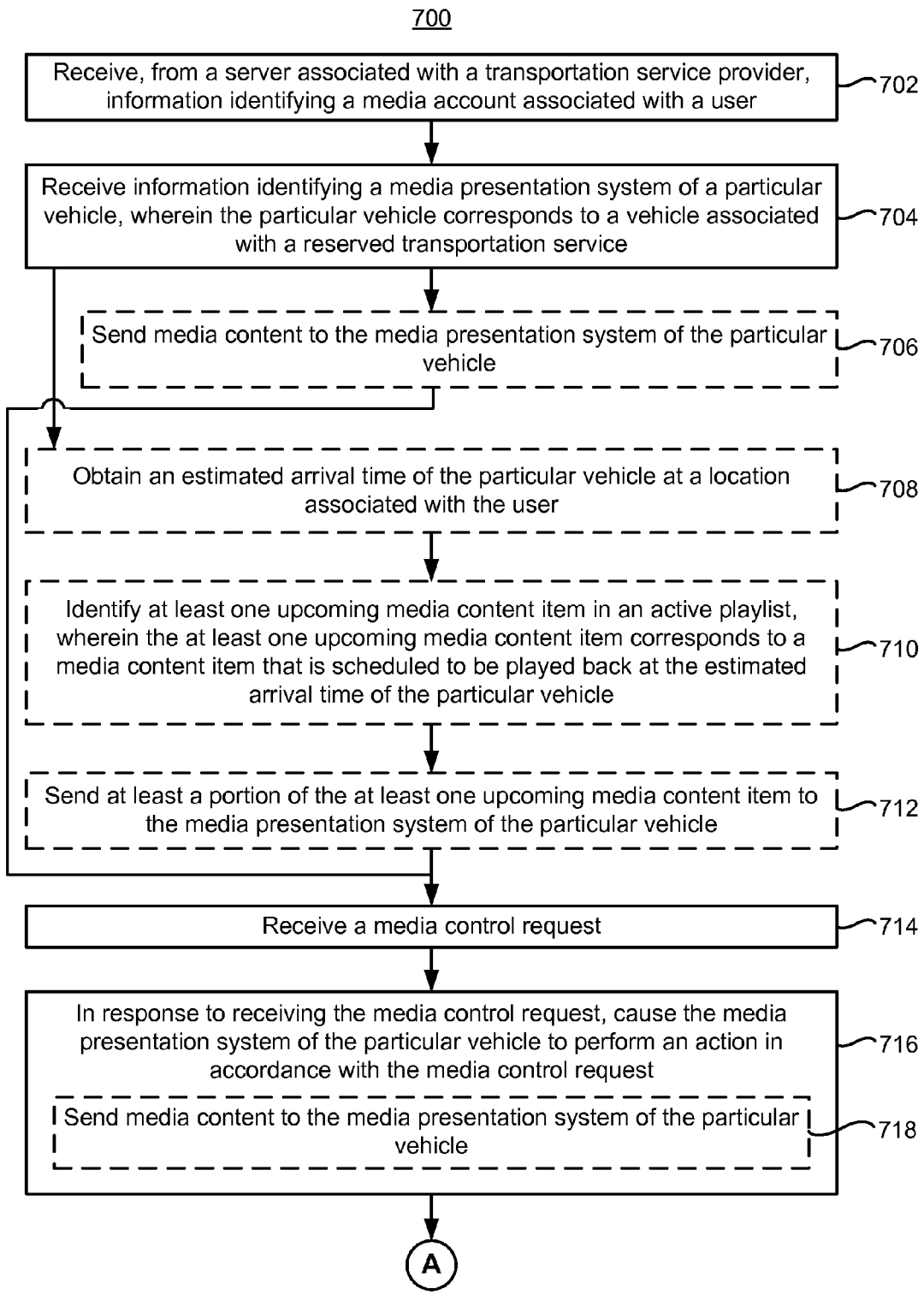
Figure 7B:
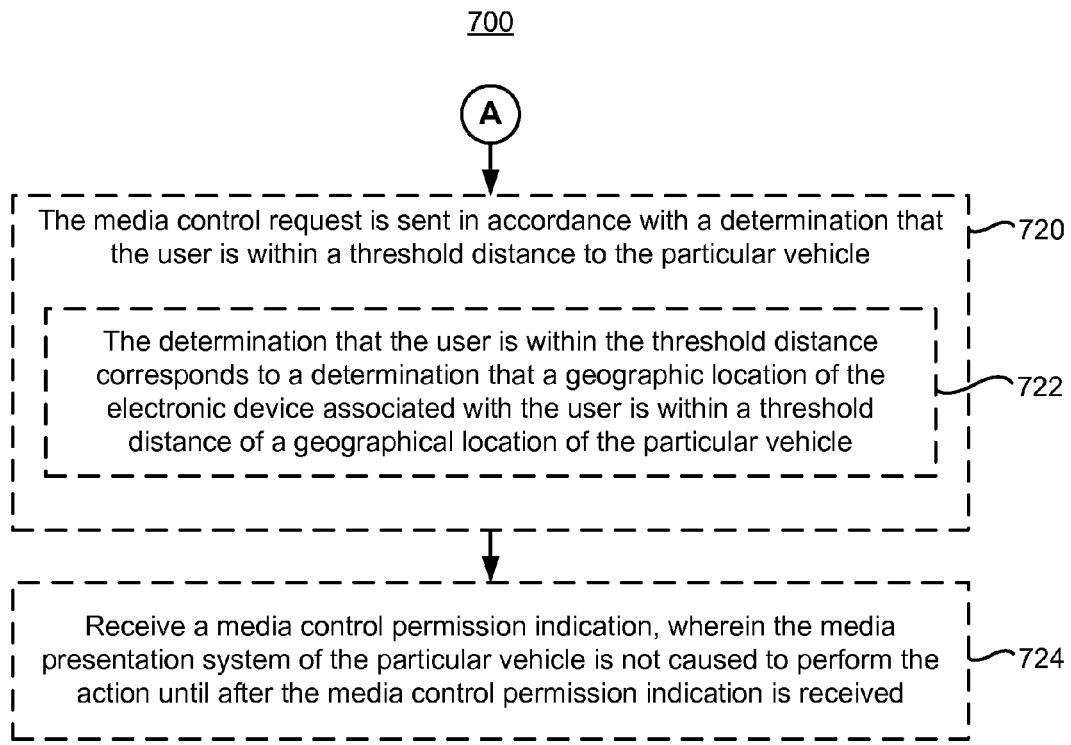

Attention is directed to FIGS. 7A-7B, which are flowcharts illustrating a method 700 for providing media presentation in a reservation target (e.g., a vehicle), in accordance with some implementations. In some implementations, the method 700 is performed at an electronic device having one or more processors and memory storing one or more programs for execution by the one or more processors. In some implementations, the electronic device that performs the method 700 is the content server 106. While the following steps are described as being performed by the content server 106, it will be understood that the steps may be performed by any other appropriate device, server, system, or combination of such components (e.g., multiple computers or servers associated with a media content provider). Also, while method 700 is described as relating to a transportation service where the reservation targets are vehicles, the same description also applies to other reservable services, as described above.

With respect to FIG. 7A, the content server (e.g., the content server 106) receives, from a server associated with a transportation service provider (e.g., the reservation server 104), information identifying a media account associated with a user (702). Types of information that identify the media account associated with the user are discussed above with respect to FIG. 6.

The content server receives information identifying a media presentation system of a particular vehicle (704), wherein the particular vehicle corresponds to a vehicle associated with a reserved transportation service. Types of information that are sent to the media presentation system of the particular vehicle are discussed above with respect to FIG. 6.

The content server receives a media control request (714). The media control request (e.g., the media control request 210) includes any appropriate data, messages, etc., and is capable of causing the content server to perform any appropriate action, such as initiating or terminating a media content stream, navigating between media content items, seeking within media content items, initiating playback of a playlist, and the like. The media control request is sent by any appropriate device, including, for example, the client device 102, the reservation server 104, the media presentation system of a reservation target, etc.

In response to receiving the media control request, the content server causes the media presentation system of the particular vehicle to perform an action in accordance with the media control request (716).

In some implementations, causing the media presentation system of the particular vehicle to perform the action includes sending an appropriate command to the media presentation system of the particular vehicle (e.g., a command to stop, skip, pause, fast-forward, rewind, etc.).

In some implementations, causing the media presentation system of the particular vehicle to perform the action includes sending media content to the media presentation system of the particular vehicle (718). For example, in response to receiving a media control request that requests media content (e.g., media content 212, FIGS. 2A-2D) to be played back at the media presentation system of a vehicle, the content server 106 sends media content to the media presentation system, and, optionally, commands the media presentation system to begin playing back the media content. As noted above, the media content is any appropriate media content, including but not limited to audio (e.g., music, audio-books, podcasts, voice recordings, etc.), video (e.g., movies, television shows, broadcast/cable television channels, etc.), and images (e.g., photographs, cartoons, etc.). In some implementations, the media content is at least a portion of a media content (e.g., at least a portion of an audio file).

In some cases, instead of sending media content to the media presentation system, the content server 106 causes another device or server to send the media content. Alternatively or additionally, if the media content is already stored, cached, and/or preloaded on the media presentation system, the content server 106 sends a command to the media presentation system to initiate presentation of the stored, cached, and/or preloaded content.

With reference to FIG. 7B, in some implementations, the media control request is sent to the content server in accordance with a determination that the user is within a threshold distance to the particular vehicle (720).

In some implementations, the determination that the user is within the threshold distance corresponds to a determination that a geographic location of the electronic device associated with the user is within a threshold distance of a geographical location of the particular vehicle (722). In some implementations, the threshold distance is 5, 10, 25, or 50 feet, or any other appropriate distance.

In some implementations, the threshold distance is based at least in part on the position error of one (or both) of the electronic device associated with the user and the particular vehicle. For example, the user is determined to be within the threshold distance if the distance between the particular vehicle and the electronic device associated with the user is less than or equal to (or substantially equal to) the sum of the position errors. As a specific example, if the position error of the particular vehicle is 10 feet, and the position error of the electronic device associated with the user is 40 feet, then the user is within the threshold distance if the distance between the vehicle and the electronic device associated with the user is determined to be equal to or less than 50 feet.

In some implementations, the determination (722) is made by the electronic device associated with the user, a positioning device associated with the particular vehicle, the server associated with the media content provider, a server associated with the transportation service provider, or any combination of these devices. Where the determination is made by a device (or combination of devices) separate from the content server 106, the device(s) that made the determination send one or more messages to the content server 106 indicating that the user is within the threshold distance.

In some implementations, the determination that the user is within the threshold distance corresponds to a determination that the electronic device associated with the user (e.g., the client device 102) is travelling at or above a threshold speed. In particular, the speed of the electronic device associated with a user (e.g., a smartphone) can indicate proximity to a vehicle (i.e., whether the user is within the threshold distance) because if the electronic device associated with the user is travelling at or above a threshold speed (e.g., 25 miles per hour), it is most likely because the user is in the vehicle. Thus, once the user's device is determined to be travelling above a certain speed that is indicative of a vehicle (e.g., 20, 25, 30, or 35 miles per hour, or any other appropriate speed), the user's device sends one or more messages to the content server 106 indicating that the user is within the threshold distance of the vehicle. In some implementations, the threshold speed is an average speed at which the electronic device is travelling, so that a vehicle idling at a traffic light or in traffic will not disrupt the media playback. In other words, once the threshold speed is reached, dropping below that speed will not cause the media playback to stop.

In some implementations, the content server receives a media-control-permission indication (724), wherein the media presentation system of the particular vehicle is not caused to perform the action until after the media-control-permission indication is received. Thus, as described above, a driver or passenger of a vehicle can control when or whether a passenger can control the media presentation system of the vehicle. Specifically, the server associated with the media content provider (e.g., the content server 106) will not send media content to the media presentation system of the vehicle until and unless the driver or passenger of the vehicle causes the media-control-permission indication to be sent to the content server 106. Alternatively, the media content provider (e.g., the content server 106) sends media content to the media presentation system of the vehicle, but the media presentation system will not playback the media content until the driver or a passenger permits it to do so.

In some implementations, the media presentation system of the vehicle 108-1 begins playback of the media content a predetermined amount of time after the user enters the vehicle (so as to allow a period of time for the user to communicate a destination to the driver without disrupting playback), and/or the volume of the media presentation system gradually increases upon the user entering the vehicle.

In some implementations, the media-control-permission indication corresponds to a selection, by a driver or passenger of the particular vehicle, of an affordance displayed on an electronic device associated with the particular vehicle.

In some implementations, the media-control-permission indication corresponds to an indication, by a driver or passenger of the particular vehicle, that the driver has picked up the user. For example, a driver may be required by a vehicle-for-hire service to indicate when a user is picked up in order to determine when to start billing for the use of the service. This same indication may be used to indicate that the user is permitted to have control of the media presentation system of the vehicle.

In some implementations, the electronic device associated with the particular vehicle is a smartphone assigned to (or otherwise associated with) the driver and/or the particular vehicle. In other implementations, the electronic device associated with the particular vehicle is a navigation system, radio, information and entertainment ("infotainment") system, or other device associated with the vehicle, where such electronic device is connected to one or more communication networks for communicating with (or otherwise sending communications toward) the server associated with the media content provider, and/or other devices.

With respect to FIG. 7A, in some implementations, in response to receiving the information identifying the media presentation system of the particular vehicle, and prior to receiving the media control request from the electronic device, the content server sends (preloads) media content to the media presentation system of the particular vehicle (706). Thus, media content (e.g., media content 212) is cached and/or preloaded on the media presentation system of the vehicle prior to any request to present the content. This reduces latency between the time when a request to begin presenting media content is ultimately issued and when the media presentation actually begins, thus providing a good user experience.

In some implementations, sending (706) the media content to the media presentation system of the particular vehicle includes sending at least a portion of one or more upcoming media content items in an active playlist (e.g., one or more upcoming songs in a playlist that the user is currently listening to on a mobile phone, for example). An active playlist is a playlist that is currently being played by the user (e.g., on the client device 102).

In some implementations, the content server obtains an estimated arrival time of the particular vehicle at a location associated with the user (708). For example, as noted above, the estimated arrival time of a vehicle may be determined based on the pick-up location (i.e., an address or geographic coordinates at which the user is to be picked up), the vehicle's location (i.e., the geographic location of the vehicle at a particular time), and the predicted or planned travel route between the pick-up location and the vehicle's location (in addition to any other factors, such as traffic, road construction, etc.). Any device or combination of devices can be used to determine the estimated arrival time, such as a smartphone associated with a user (e.g., the client device 102), a smartphone associated with the particular vehicle, a server associated with the service provider (e.g., the reservation server 104), and/or a server associated with the content provider (e.g., the content server 106).

In some implementations, the content server identifies at least one upcoming media content item in an active playlist (710), wherein the at least one upcoming media content item corresponds to a media content item that is scheduled to be played back at the estimated arrival time of the particular vehicle. An active playlist is a playlist that is currently being played by the user (e.g., on the client device 102).

In some implementations, the content server sends (preloads) at least a portion of the at least one upcoming media content item to the media presentation system of the particular vehicle (712).

In some implementations, the portion of the at least one upcoming media content item includes: a first portion of the at least one media upcoming content item that is scheduled to be played back prior to the estimated arrival time, and a second portion of the at least one upcoming media content item that is scheduled to be played back after the estimated arrival time. Thus, the media presentation system of the vehicle caches and/or preloads content that is scheduled to be played back both before and after the estimated arrival time, thus allowing for slight deviations in the actual arrival time while still ensuring that appropriate media content is cached and/or preloaded.

In some implementations, the estimated arrival time of the vehicle is updated as the vehicle approaches the user, and the content that is cached and/or preloaded on the media presentation system of the vehicle is adjusted in accordance with the updated estimated arrival time. Thus, if a vehicle is delayed resulting in a later estimated arrival time, content that is scheduled to be played back at the later estimated arrival time is sent to the media presentation system of the particular vehicle.

Figure 8A:
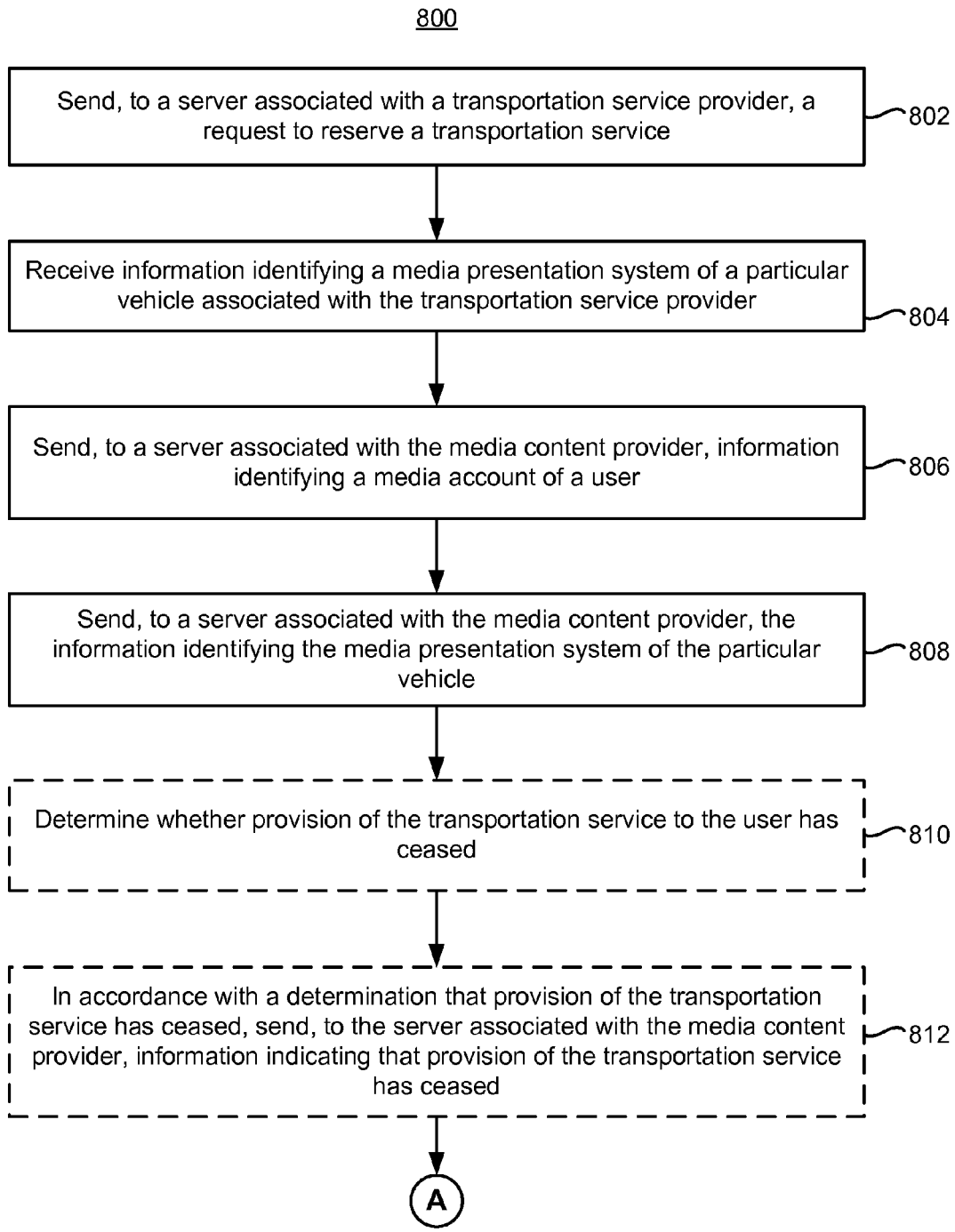
Figure 8B:
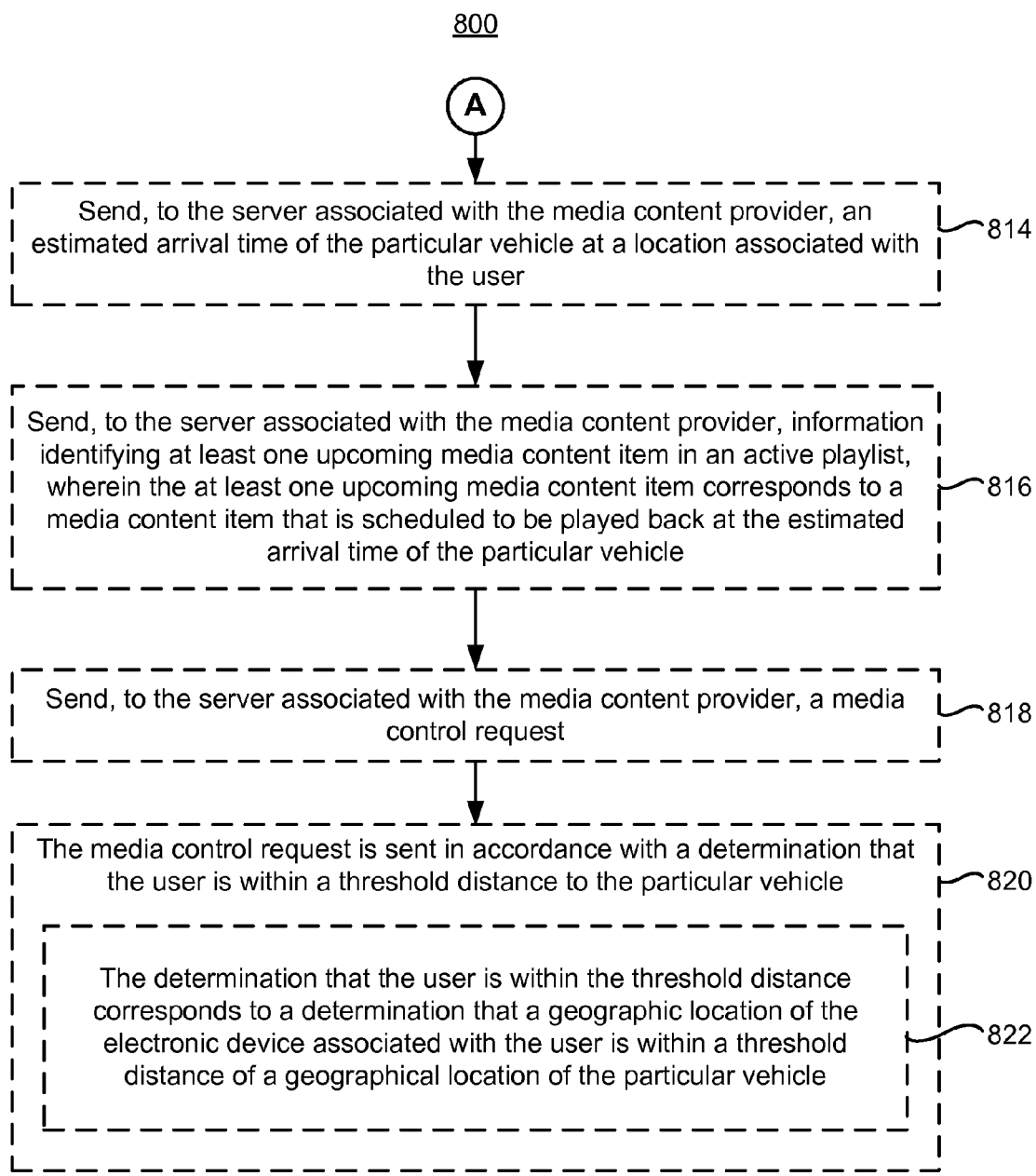

Attention is directed to FIGS. 8A-8B, which are a flowchart illustrating a method 800 for providing media presentation in a reservation target (e.g., a vehicle), in accordance with some implementations. In some implementations, the method 800 is performed at an electronic device having one or more processors and memory storing one or more programs for execution by the one or more processors. In some implementations, the device that performs the method 800 is the client device 102, which may be, for example, a smartphone, computer, tablet, or the like. While the following steps are described as being performed by the client device 102, it will be understood that the steps may be performed by any other appropriate device, server, system, or combination of such components. Also, while method 800 is described as relating to a transportation service where the reservation targets are vehicles, the same description also applies to other reservable services, as described above.

With respect to FIG. 8A, the client device (e.g., the client device 102) sends, to a server associated with a transportation service provider (e.g., the reservation server 104), a request (e.g., a service reservation request 206) to reserve a transportation service (802).

The client device receives (e.g., from a server associated with a transportation service provider, such as the reservation server 104) information identifying a media presentation system of a particular vehicle associated with the transportation service provider, wherein the particular vehicle corresponds to a vehicle associated with a reserved transportation service (804). Examples of information identifying the media presentation system of the particular vehicle (e.g., vehicle ID message 214) are provided in the discussion of FIGS. 6 and 7A, above.

The client device sends, to a server associated with the media content provider, information identifying a media account of a user (806). In some implementations, the information identifying the media account associated with the user is or includes a username, a password, a unique identifier, and/or any other information that identifies the media account associated with the user or with which information that identifies the user can be derived or retrieved.

Furthermore, the client device sends, to a server associated with the media content provider, the information identifying the media presentation system of the particular vehicle (808).

In some implementations, the client device determines whether provision of the transportation service to the user has ceased (810). In accordance with a determination that provision of the transportation service has ceased, the client device sends, to the server associated with the media content provider (e.g., the content server 106), information indicating that provision of the transportation service has ceased (812). Examples of actions performed by a server in response to receipt of information indicating that provision of the transportation service has ceased are discussed above with respect to FIG. 6.

With reference to FIG. 8B, in some implementations, the client device sends, to the server associated with the media content provider (e.g., the content server 106), a media control request (818). Media control requests are discussed above with respect to FIG. 7A.

In some implementations, the media control request is sent to the content server in accordance with a determination that the user is within a threshold distance to the particular vehicle (820). Furthermore, in some implementations, the determination that the user is within the threshold distance corresponds to a determination that a geographic location of the electronic device associated with the user is within a threshold distance (e.g., 5, 10, or 15 feet) of a geographical location of the particular vehicle (822). Techniques and devices for determining that the user is within a threshold distance, as well as actions performed in response to the determinations, are discussed above with respect to FIG. 7B.

In some implementations, prior to sending the media control request, the client device sends, to the server associated with the media content provider, an estimated arrival time of the particular vehicle at a location associated with the user (814). Furthermore, in some implementations, the client device sends, to the server associated with the media content provider, information identifying at least one upcoming media content item in an active playlist (816), wherein the at least one upcoming media content item corresponds to a media content item that is scheduled to be played back at the estimated arrival time of the particular vehicle.

In some implementations, upon receiving, from the client device, information identifying at least one upcoming media content item in an active playlist, the server associated with the media content provider (e.g., content server 106) sends at least a portion of the at least one upcoming media content item to the media presentation system of the particular vehicle, as described above with respect to FIG. 7A.

Figure 9A:
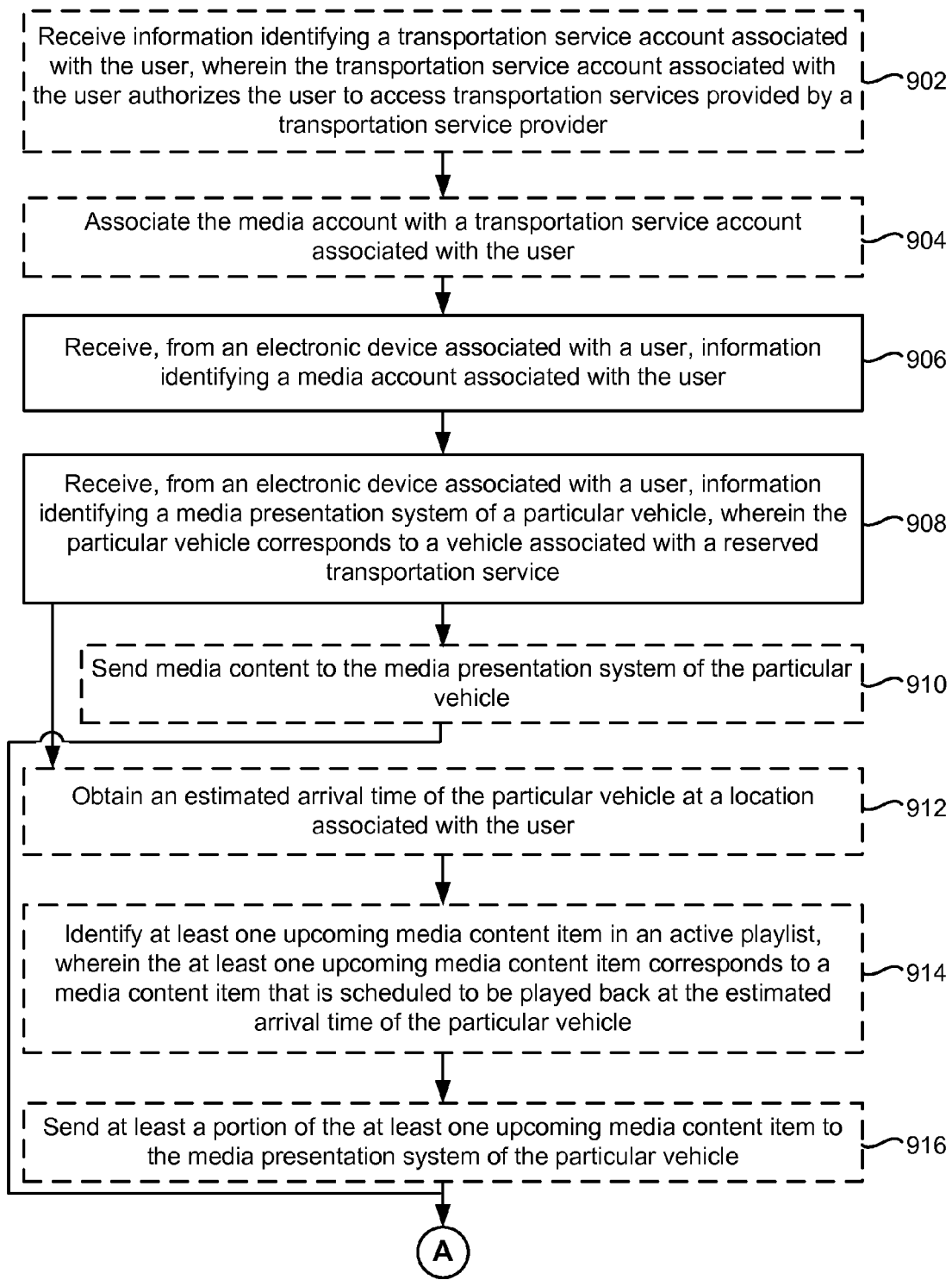
Figure 9B:
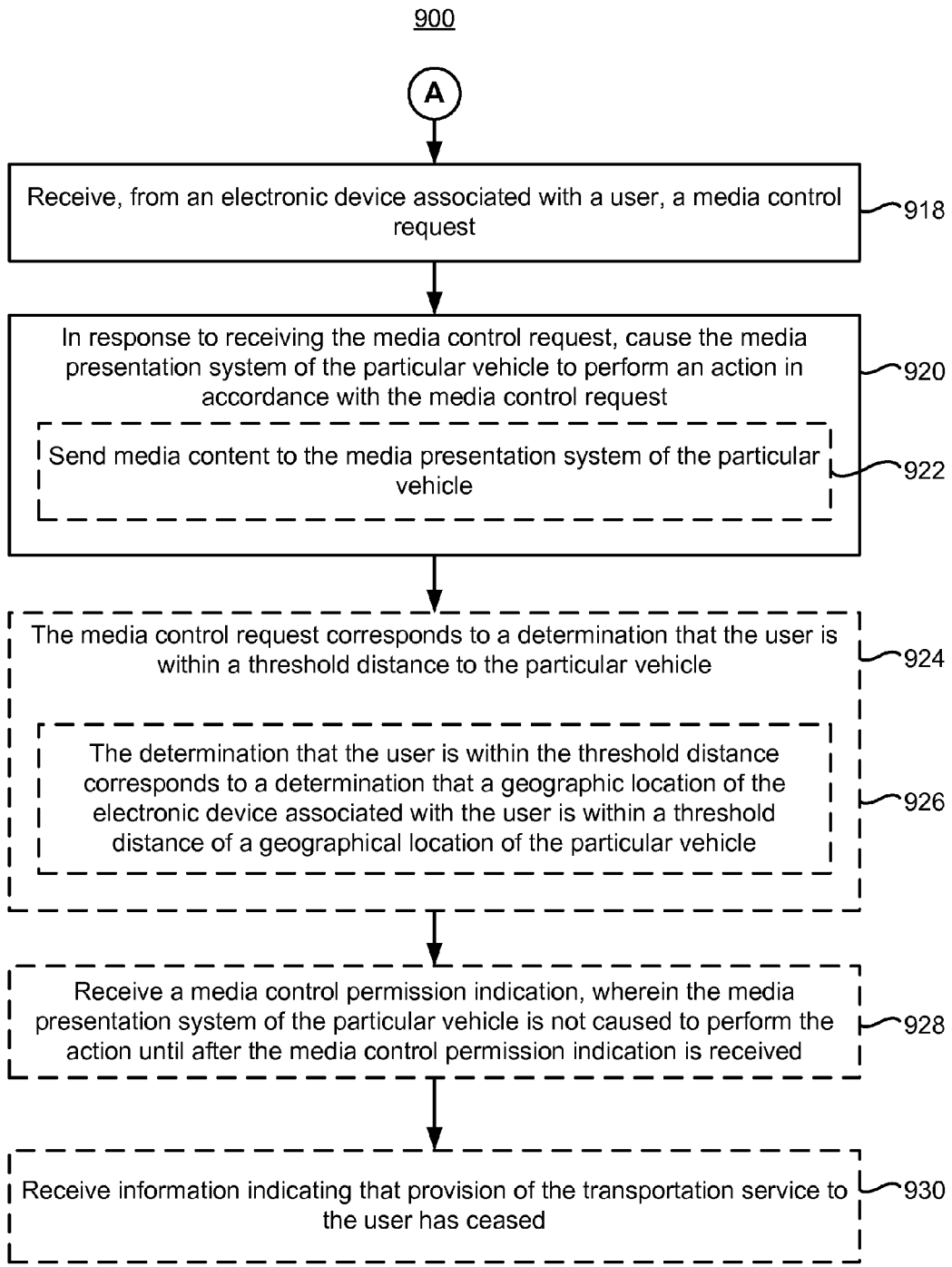

Attention is directed to FIGS. 9A-9B, which are flowcharts illustrating a method 900 for providing media presentation in a reservation target (e.g., a vehicle), in accordance with some implementations. In some implementations, the method 900 is performed at an electronic device having one or more processors and memory storing one or more programs for execution by the one or more processors. In some implementations, the electronic device that performs the method 900 is the content server 106. While the following steps are described as being performed by the content server 106, it will be understood that the steps may be performed by any other appropriate device, server, system, or combination of such components (e.g., multiple computers or servers associated with a media content provider). Also, while method 900 is described as relating to a transportation service where the reservation targets are vehicles, the same description also applies to other reservable services, as described above.

With respect to FIG. 9A, the content server (e.g., the content server 106) receives, from an electronic device associated with a user (e.g., the client device 102), information identifying a media account associated with the user (906). Examples of information identifying the media account associated with the user are provided above with respect to FIG. 8A.

The content server receives, from an electronic device associated with a user, information identifying a media presentation system of a particular vehicle, wherein the particular vehicle corresponds to a vehicle associated with a reserved transportation service (908). Examples of information identifying the media presentation system of the particular vehicle (e.g., vehicle ID message 214) are provided in the discussion of FIGS. 6 and 7A, above.

With reference to FIG. 9B, the content server receives, from an electronic device associated with a user, a media control request (918). Media control requests are discussed in greater detail above with respect to FIGS. 6 and 7A.

In response to receiving the media control request, the content server causes the media presentation system of the particular vehicle to perform an action in accordance with the media control request (920). In some implementations, causing the media presentation system of the particular vehicle to perform the action includes sending media content to the media presentation system of the particular vehicle (922). For example, in response to receiving a media control request that requests media content to be played back at the media presentation system of a vehicle, the content server 106 sends media content to the media presentation system, and, optionally, commands the media presentation system to begin playing back the media content.

In some cases, instead of sending media content to the media presentation system, the content server 106 causes another device or server to send the media content. Alternatively or additionally, if the media content is already stored, cached, and/or preloaded on the media presentation system, the content server 106 sends a command to the media presentation system to initiate presentation of the stored, cached, and/or preloaded content.

With respect to FIG. 9A, in some implementations, the content server receives (e.g., from the client device 102, the reservation server 104, etc.) information identifying a transportation service account associated with the user, wherein the transportation service account associated with the user authorizes the user to access transportation services provided by a transportation service provider (902). Information identifying a transportation service account associated with the user includes a transportation service account identifier of the user, which is or includes a username, a password, a unique identifier, and/or any other information that identifies the transportation service account associated with the user or from which information that identifies the user can be derived or retrieved.

Furthermore, in some implementations, the content server associates the media account with a transportation service account associated with the user (904). In some implementations, the receipt of information at (902) and the association of the media account at (904) occur prior to the content server receiving information identifying a media account associated with the user at (906).

In some implementations, in response to receiving the information identifying the media presentation system of the particular vehicle, and prior to receiving the media control request from the electronic device, the content server sends (preloads) media content to the media presentation system of the particular vehicle (910). Thus, as described above with respect to FIG. 7A, media content is cached and/or preloaded on the media presentation system of the vehicle.

In some implementations, sending the media content to the media presentation system of the particular vehicle includes sending at least a portion of one or more upcoming media content items in an active playlist, as described above with respect to FIG. 7A.

In some implementations, the content server obtains an estimated arrival time of the particular vehicle at a location associated with the user (912). The content server identifies at least one upcoming media content item in an active playlist (914), wherein the at least one upcoming media content item corresponds to a media content item that is scheduled to be played back at the estimated arrival time of the particular vehicle. The content server sends (preloads) at least a portion of the at least one upcoming media content item to the media presentation system of the particular vehicle (916). Additional details and discussion of preloading content is provided above with respect to FIG. 7A.

In some implementations, the media control request corresponds to a determination that the user is within a threshold distance to the particular vehicle (924).

In some implementations, the determination that the user is within the threshold distance corresponds to a determination that a geographic location of the electronic device associated with the user is within a threshold distance (e.g., 5 feet) of a geographical location of the particular vehicle (926). Techniques and devices for determining that the user is within a threshold distance, as well as actions performed in response to the determinations, are discussed above with respect to FIG. 7B.

In some implementations, the content server receives a media-control-permission indication (928), wherein the media presentation system of the particular vehicle is not caused to perform the action until after the media-control-permission indication is received. Thus, as described above, a driver of a vehicle can control when or whether a passenger can control the media presentation system of the vehicle. Specifically, the server associated with the media content provider (e.g., the content server 106) will not send media content to the media presentation system of the vehicle until and unless the driver of the vehicle causes the media-control-permission indication to be sent to the content server 106. The media-control-permission indication is described above with respect to FIG. 7B.

With reference to FIG. 9B, in some implementations, the content server receives information indicating that provision of the transportation service to the user has ceased (930). Techniques and devices for determining that provision of the transportation service has ceased, as well as actions performed in response to the determinations, are discussed above with respect to FIG. 6.

Figure 10A:
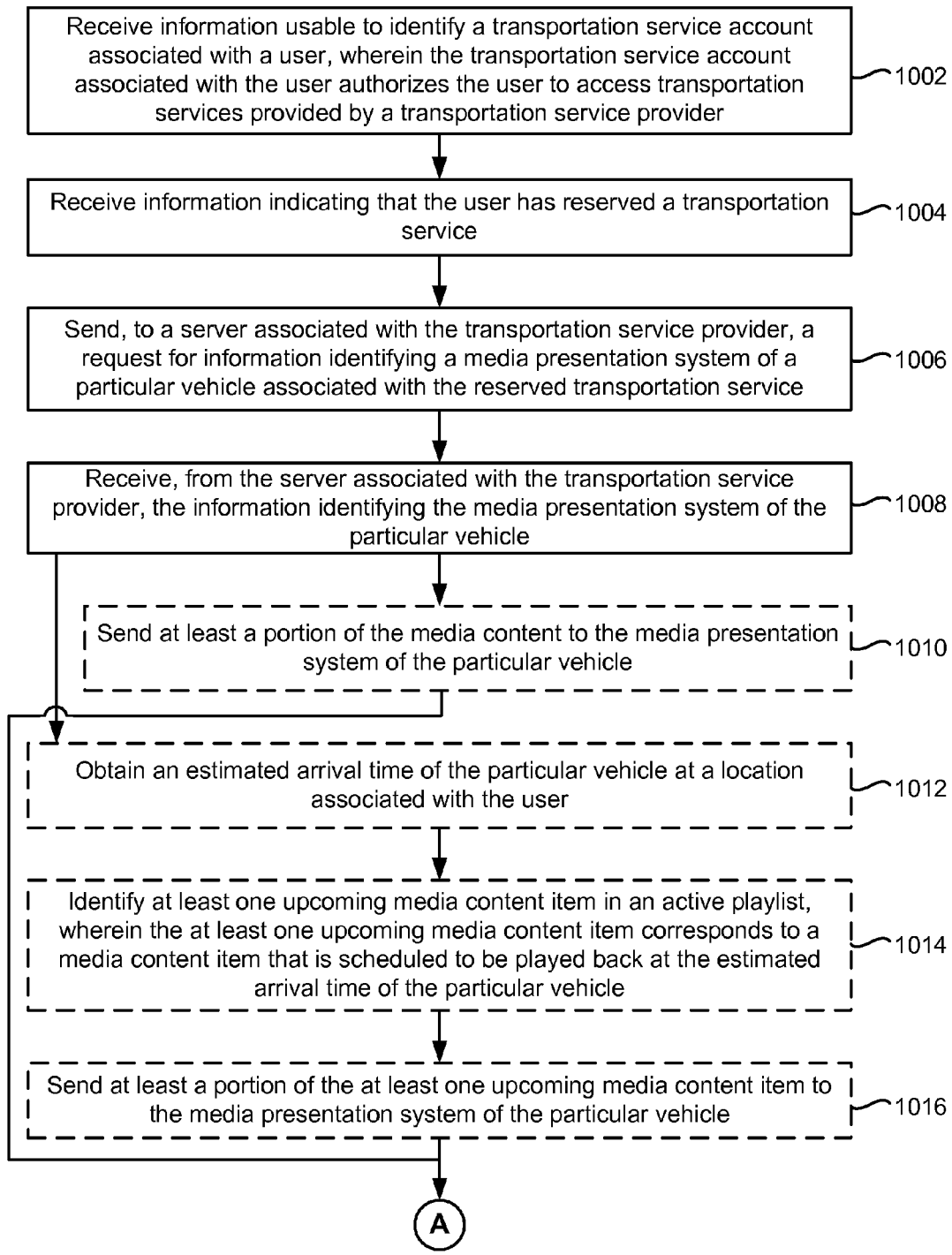
Figure 10B:
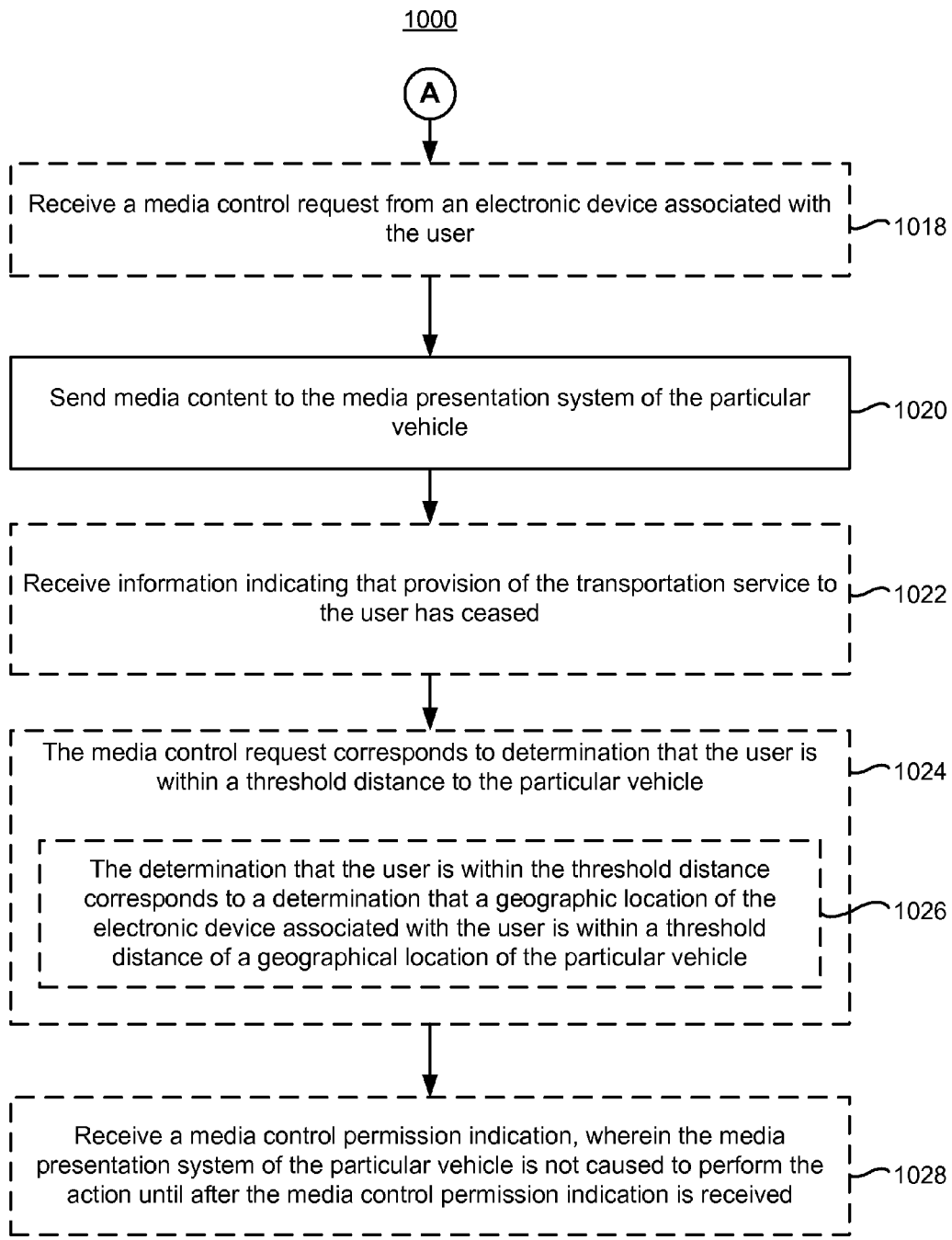

Attention is directed to FIGS. 10A-10B, which are flowcharts illustrating a method 1000 for providing media presentation in a reservation target (e.g., a vehicle), in accordance with some implementations. In some implementations, the method 1000 is performed at an electronic device having one or more processors and memory storing one or more programs for execution by the one or more processors. In some implementations, the electronic device that performs the method 1000 is the content server 106. While the following steps are described as being performed by the content server 106, it will be understood that the steps may be performed by any other appropriate device, server, system, or combination of such components (e.g., multiple computers or servers associated with a media content provider). Also, while method 1000 is described as relating to a transportation service where the reservation targets are vehicles, the same description also applies to other reservable services, as described above.

With respect to FIG. 10A, the content server (e.g., the content server 106) receives (e.g., from the client device 102 associated with the user, which can be a smartphone, computer, or a like device) information usable to identify a transportation service account associated with a user (e.g., a username, a password, etc.), wherein the transportation service account associated with the user authorizes the user to access transportation services provided by a transportation service provider (1002).

The content server receives information indicating that the user has reserved a transportation service (1004). In some implementations, information indicating that the user has reserved a transportation service includes, for example, a confirmation message (e.g., reservation confirmation message 215) or other message (e.g., service ID/media user ID message 216). In some cases, such messages also include the information usable to identify a transportation service account, as described above.

The content server sends, to a server associated with the transportation service provider (e.g., reservation server 104), a request for information identifying a media presentation system of a particular vehicle associated with the reserved transportation service (1006). In some implementations, the request for information (at 1006) includes the information usable to identify a transportation service account, as described above. The request for information, for example, is vehicle ID request 218, which includes information (e.g., service user ID: User_1) that is usable by the reservation server 104 to identify a reservation target (e.g., vehicle 108-1, vehicle ID "123-45-678") associated with a reservation by the user.

The content server receives, from the server associated with the transportation service provider, the information identifying the media presentation system of the particular vehicle (1008). Examples of information identifying the media presentation system of the particular vehicle (e.g., vehicle ID message 214) are provided in the discussion of FIGS. 6 and 7A, above. For example, in response to receiving from the content server 106 a vehicle ID request 218, the reservation server 104 looks up the vehicle ID that is associated with the user, and sends to the content server 106 a vehicle ID message 220 that includes the vehicle ID (e.g., vehicle ID "123-45-678") and/or the information identifying the media presentation system of the particular vehicle, described above.

With reference to FIG. 10B, the content server sends media content to the media presentation system of the particular vehicle (1020).

In some implementations, the content server receives a media control request (e.g., the media control request 210) from an electronic device (e.g., client device 102) associated with the user (1018), and sends media content to the media presentation system of the particular vehicle in response to receiving the media control request from the electronic device associated with the user. Optionally, in response to receiving a media control request that requests media content to be played back at the media presentation system of a vehicle, the content server 106 sends media content to the media presentation system, and, optionally, commands the media presentation system to begin playing back the media content. Media control requests are discussed above with respect to FIG. 7A.

In some implementations, the content server receives information indicating that provision of the transportation service to the user has ceased (1022). Techniques and devices for determining that provision of the transportation service has ceased, as well as actions performed in response to the determinations, are discussed above with respect to FIG. 6.

In some implementations, the media control request (e.g., the media control request 210) corresponds to a determination that the user is within a threshold distance to the particular vehicle (1024). In some implementations, the determination that the user is within the threshold distance corresponds to a determination that a geographic location of the electronic device associated with the user is within a threshold distance (e.g., 5 feet) of a geographical location of the particular vehicle (1026). Techniques and devices for determining that the user is within a threshold distance, as well as actions performed in response to the determinations, are discussed above with respect to FIG. 7B.

In some implementations, the content server receives a media-control-permission indication (1028), wherein the media presentation system of the particular vehicle is not caused to perform the action until after the media-control-permission indication is received. Thus, as described above, a driver of a vehicle can control when or whether a passenger can control the media presentation system of the vehicle. Specifically, the server associated with the media content provider (e.g., the content server 106) will not send media content to the media presentation system of the vehicle until and unless the driver of the vehicle causes the media-control-permission indication to be sent to the content server 106. The media-control-permission indication is described above with respect to FIG. 7B.

With respect to FIG. 10A, in some implementations, in response to receiving the information identifying the media presentation system of the particular vehicle, and prior to receiving the media control request (e.g., the media control request 210) from the electronic device associated with the user, the content server sends (preloads) at least a portion of the media content to the media presentation system of the particular vehicle (1010). Thus, as described above with respect to FIG. 7A, media content is cached and/or preloaded on the media presentation system of the vehicle.

In some implementations, sending at least a portion of the media content to the media presentation system of the particular vehicle includes sending at least a portion of one or more upcoming media content items in an active playlist, as described above with respect to FIG. 7A.

In some implementations, the content server obtains an estimated arrival time of the particular vehicle at a location associated with the user (1012). The content server identifies at least one upcoming media content item in an active playlist (1014), wherein the at least one upcoming media content item corresponds to a media content item that is scheduled to be played back at the estimated arrival time of the particular vehicle. The content server sends (preloads) at least a portion of the at least one upcoming media content item to the media presentation system of the particular vehicle (1016). Additional details and discussion of preloading content is provided above with respect to FIG. 7A.

Figure 11A:
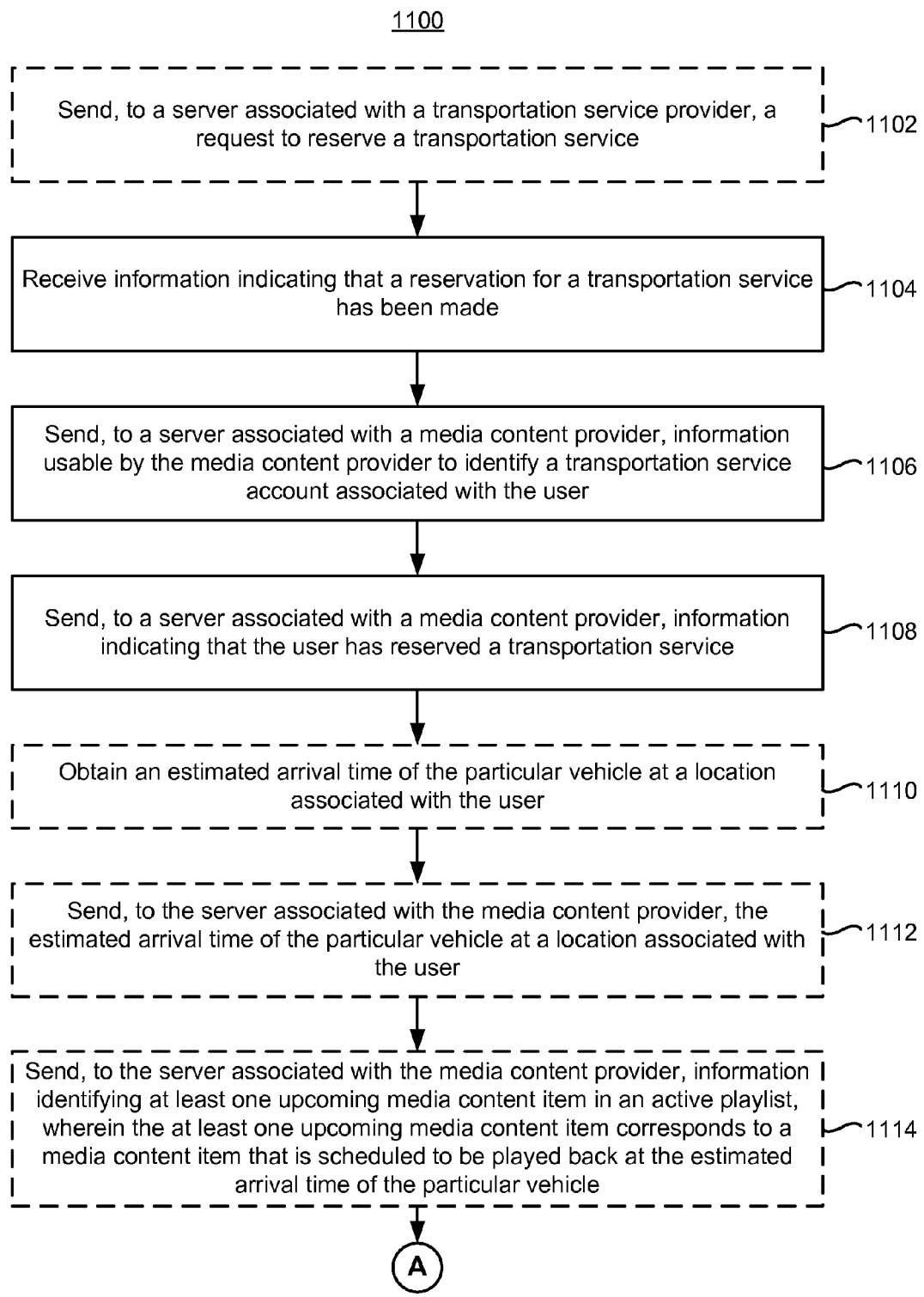
Figure 11B:
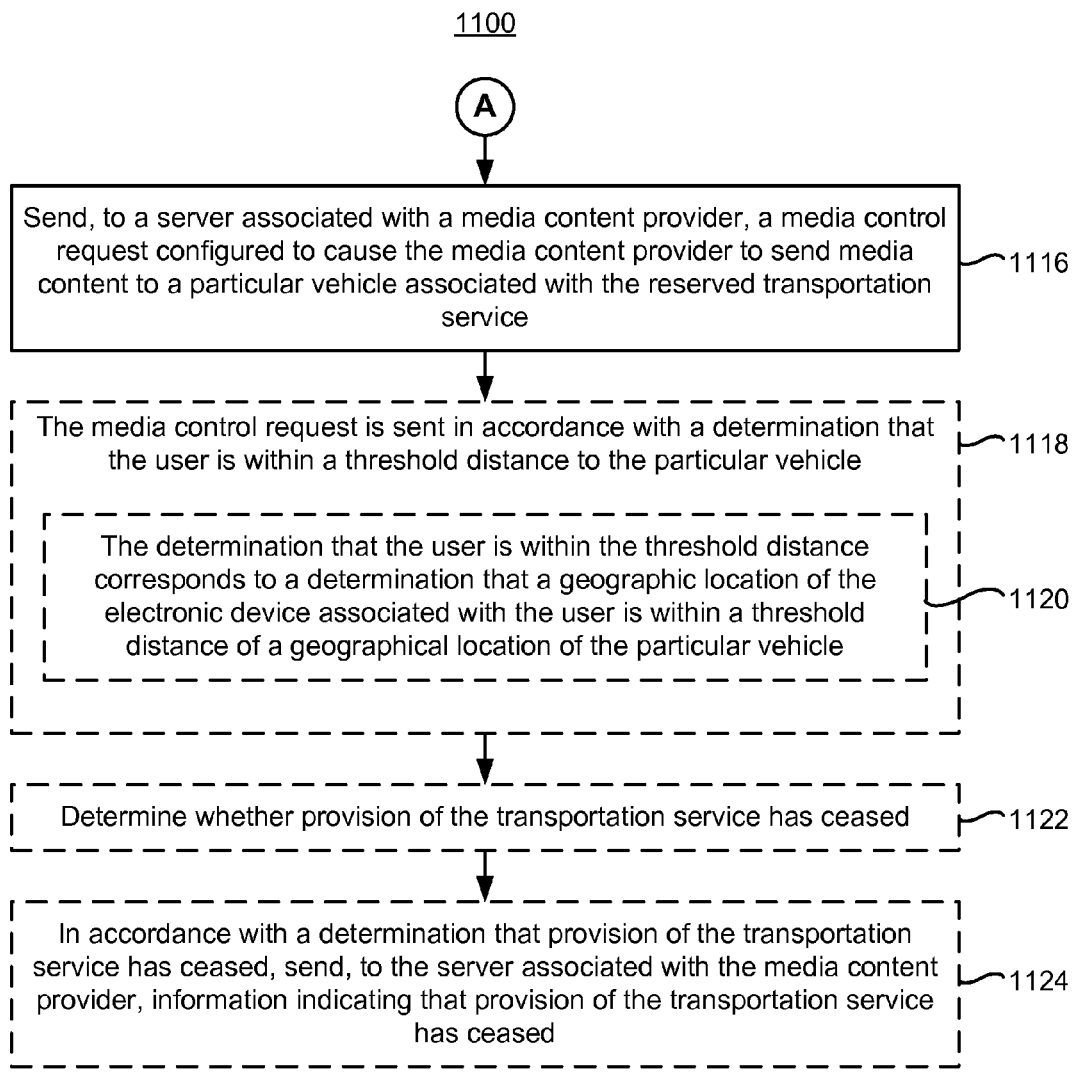

Attention is directed to FIGS. 11A-11B, which are flowcharts illustrating a method 1100 for providing media presentation in a reservation target (e.g., a vehicle), in accordance with some implementations. In some implementations, the method 1100 is performed at an electronic device having one or more processors and memory storing one or more programs for execution by the one or more processors. In some implementations, the device that performs the method 1100 is the client device 102, which may be, for example, a smartphone, computer, tablet, or the like. While the following steps are described as being performed by the client device 102, it will be understood that the steps may be performed by any other appropriate device, server, system, or combination of such components (e.g., multiple computers or servers associated with a user having an account with a media content provider and/or a service provider).

With respect to FIG. 11A, the client device (e.g., the client device 102) receives (e.g., from the reservation server 104) information indicating that a reservation for a transportation service has been made (1104). While method 1100 is described as relating to a transportation service where the reservation targets are vehicles, the same description also applies to other reservable services, as described above. In some implementations, information indicating that a reservation for a transportation service has been made includes, for example, a confirmation message (e.g., reservation confirmation message 215) or other message (e.g., service ID/media user ID message 216).

The client device sends, to a server associated with a media content provider (e.g., the content server 106), information usable by the media content provider to identify a transportation service account associated with the user (1106). Examples of information usable to identify a transportation service account associated with a user includes a transportation service account identifier of the user, which is or includes a username, a password, a unique identifier, and/or any other information that identifies the transportation service account associated with the user or with which information that identifies the user can be derived or retrieved.

The client device sends, to a server associated with a media content provider, information indicating that the user has reserved a transportation service (1108), as described above.

With reference to FIG. 11B, the client device sends, to a server associated with a media content provider, a media control request (e.g., the media control request 210) configured to cause the media content provider to send media content to a particular vehicle associated with the reserved transportation service (1116). For example, in response to receiving a media control request that requests media content to be played back at the media presentation system of a vehicle, the content server 106 sends media content to the media presentation system, and, optionally, commands the media presentation system to begin playing back the media content. Media control requests are discussed above with respect to FIG. 7A.

In some implementations, the client device determines whether provision of the transportation service to the user has ceased (1122). In accordance with a determination that provision of the transportation service has ceased, the client device sends, to the server associated with the media content provider (e.g., the content server 106), information indicating that provision of the transportation service has ceased (1124). Techniques and devices for determining that provision of the transportation service has ceased, as well as actions performed in response to the determinations, are discussed above with respect to FIG. 6.

In some implementations, the media control request (e.g., the media control request 210) is sent to the content server in accordance with a determination that the user is within a threshold distance to the particular vehicle (1118). In some implementations, the determination that the user is within the threshold distance corresponds to a determination that a geographic location of the electronic device associated with the user is within a threshold distance (e.g., 5 feet) of a geographical location of the particular vehicle (1120). Techniques and devices for determining that the user is within a threshold distance, as well as actions performed in response to the determinations, are discussed above with respect to FIG. 7B.

With reference to FIG. 11A, in some implementations, prior to receiving information indicating that a reservation for a transportation service has been made (at 1104), the client device sends, to a server associated with a transportation service provider (e.g., the reservation server 104), a request to reserve a transportation service (1102).

In some implementations, prior to sending the media control request (e.g., the media control request 210), the client device obtains (e.g., from the reservation server 104) an estimated arrival time of the particular vehicle at a location associated with the user (1110), and sends, to the server associated with the media content provider (e.g., the content server 106), the estimated arrival time of the particular vehicle at a location associated with the user (1112). The client device sends, to the server associated with the media content provider, information identifying at least one upcoming media content item in an active playlist (1114), wherein the at least one upcoming media content item corresponds to a media content item that is scheduled to be played back at the estimated arrival time of the particular vehicle. Upon receiving, from the client device, information identifying at least one upcoming media content item in an active playlist, the server associated with the media content provider (e.g., content server 106) sends at least a portion of the at least one upcoming media content item to the media presentation system of the particular vehicle. Additional details and discussion of preloading content is provided above with respect to FIG. 7A.

Figure 12A:
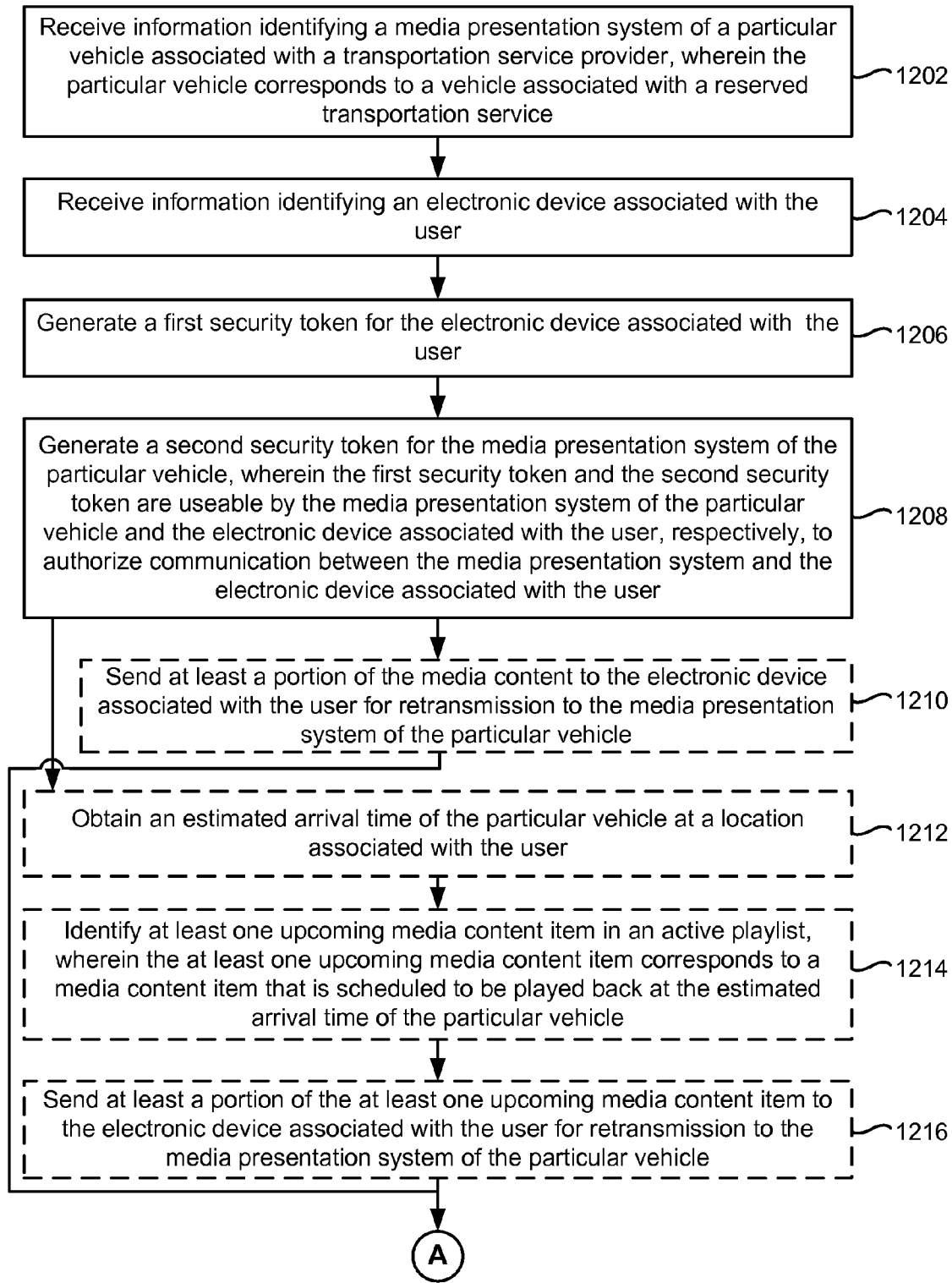
Figure 12B:
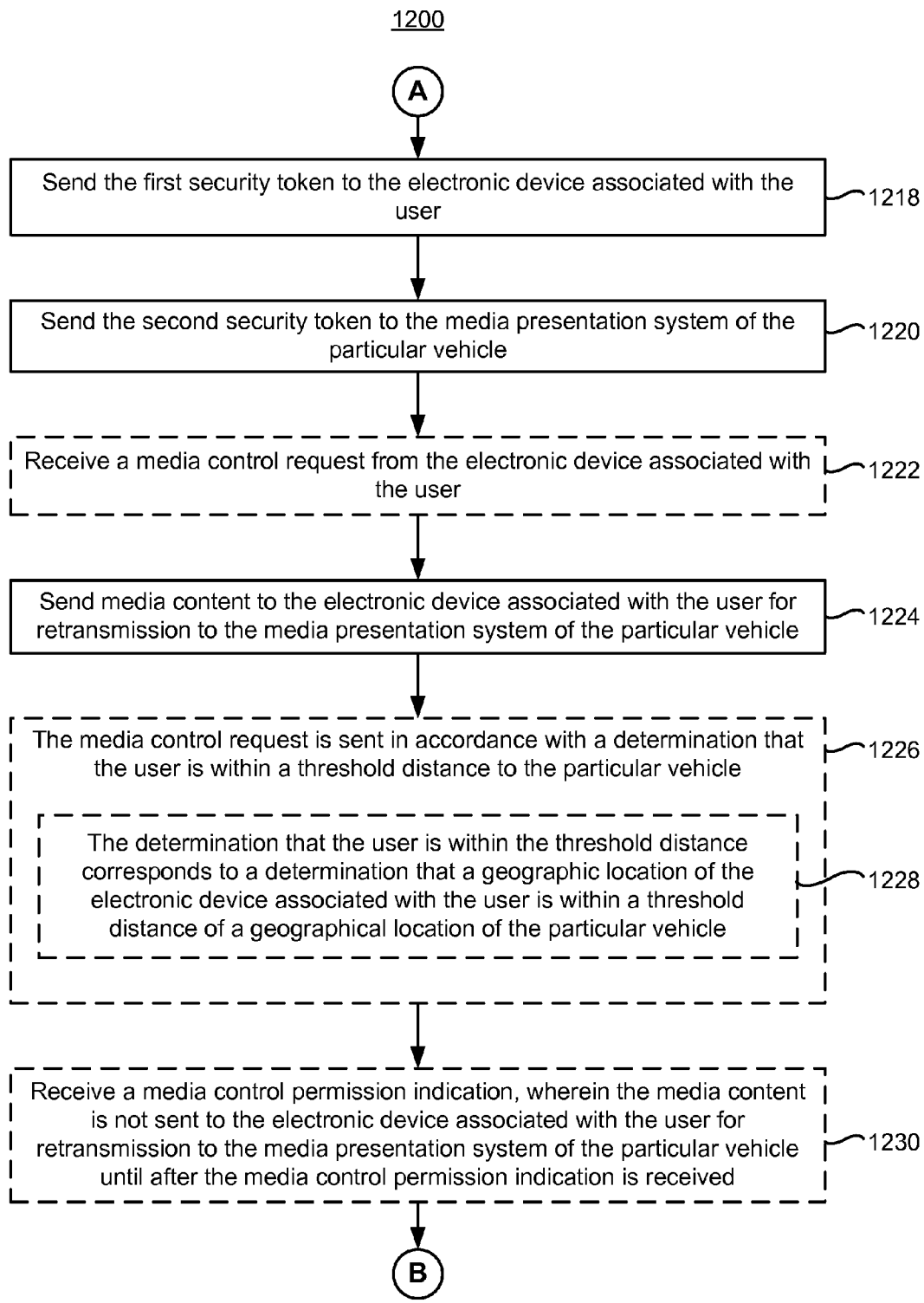
Figure 12C:
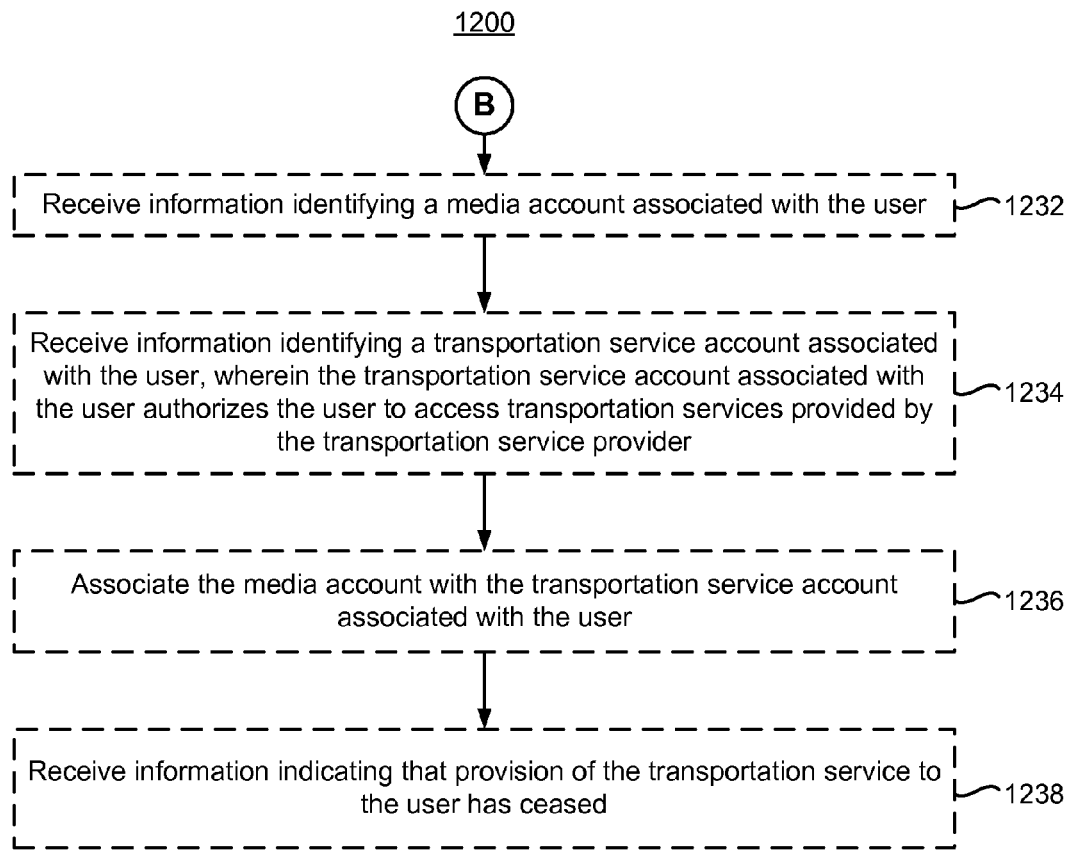

Attention is directed to FIGS. 12A-12C, which are flowcharts illustrating a method 1200 for providing media presentation in a reservation target (e.g., a vehicle), in accordance with some implementations. In some implementations, the method 1200 is performed at an electronic device having one or more processors and memory storing one or more programs for execution by the one or more processors. In some implementations, the electronic device that performs the method 1200 is the content server 106. While the following steps are described as being performed by the content server 106, it will be understood that the steps may be performed by any other appropriate device, server, system, or combination of such components (e.g., multiple computers or servers associated with a media content provider). Also, while method 1200 is described as relating to a transportation service where the reservation targets are vehicles, the same description also applies to other reservable services, as described above.

With respect to FIG. 12A, the content server (e.g., the content server 106) receives information identifying a media presentation system of a particular vehicle associated with a transportation service provider (e.g., device ID and/or vehicle ID, which is described in greater detail with respect to FIG. 7A), wherein the particular vehicle corresponds to a vehicle associated with a reserved transportation service (1202). For example, in some implementations, the content server 106 receives, from the reservation server 104, a media user ID/vehicle ID message 208 identifying the vehicle (e.g., vehicle 108-1) to which the user has been assigned.

Furthermore, the content server receives information identifying an electronic device associated with the user (1204). In some implementations, information identifying the electronic device associated with the user (e.g., client device 102) is or includes a electronic device identification number, a network address of the electronic device, a unique identifier of the electronic device (e.g., a media access control (MAC) address, or any of the various identifiers associated with wireless communication devices, including an international mobile station equipment identity number (IMEI), a mobile equipment identifier number (MEID), an international mobile subscriber identity number (IMSI), an electronic serial number (ESN), a mobile subscriber integrated services digital network-number (MSISDN), etc.), or any other appropriate information that identifies the electronic device associated with the user or with which information that identifies the electronic device can be derived or retrieved.

The content server generates a first security token (e.g., client security token 222) for the electronic device associated with the user (1206), and generates a second security token (e.g., vehicle security token 224) for the media presentation system of the particular vehicle, wherein the first security token and the second security token are useable by the media presentation system of the particular vehicle and the electronic device associated with the user, respectively, to authorize communication between the media presentation system and the electronic device associated with the user (1208). The generation and use of security tokens, in accordance with some implementations, is described above respect to FIG. 2D.

With reference to FIG. 12B, the content server sends the first security token to the electronic device associated with the user (1218), and the content server sends the second security token to the media presentation system of the particular vehicle (1220). For example, the content server sends the client security token 222 to the client device 102, and sends the vehicle security token 224 to the media presentation system of the vehicle 108-1.

In some cases, the security tokens are not generated and/or sent (e.g., by the reservations server 104 or the content server 106) unless the client device first sends the information identifying a media account and/or information identifying a transportation service account associated with the user, as described below with respect to (1232)-(1236).

The content server sends media content to the electronic device associated with the user for retransmission to the media presentation system of the particular vehicle (1224). In some implementations, the media content (e.g., media content 226) is stored, cached, and/or preloaded on the electronic device (e.g., stored in a local cache, or other location in a storage medium of the client device 102). In some cases, the content server configures the media content to be playable and/or executable for a predetermined duration of time, before becoming disabled, deleted, or otherwise inoperable (e.g., the content server sends additional instructions to the client device 102 to delete the media content after a predetermined duration).

With reference to FIG. 12B, in some implementations, prior to sending the media content to the electronic device associated with the user, the content server receives a media control request (e.g., the media control request 210) from the electronic device associated with the user (1222), and sends the media content at (1224) in response to receiving the media control request. Media control requests are discussed in greater detail above with respect to FIGS. 6 and 7A.

In some implementations, the media control request is sent in accordance with a determination that the user is within a threshold distance to the particular vehicle (1226). Furthermore, in some implementations, the determination that the user is within the threshold distance corresponds to a determination that a geographic location of the electronic device associated with the user is within a threshold distance (e.g., 5 feet) of a geographical location of the particular vehicle (1228). Techniques and devices for determining that the user is within a threshold distance, as well as actions performed in response to the determinations, are discussed above with respect to FIG. 7B.

With reference to FIG. 12A, in some implementations, in response to receiving the information identifying the media presentation system of the particular vehicle, and prior to receiving the media control request from the electronic device associated with the user, the content server sends (preloads) at least a portion of the media content to the electronic device associated with the user for retransmission to the media presentation system of the particular vehicle (1210). Thus, as described above with respect to FIG. 7A, media content is cached and/or preloaded on the media presentation system of the vehicle.

In some implementations, sending at least the portion of the media content to the electronic device associated with the user for retransmission to the media presentation system of the particular vehicle includes the content server sending at least a portion of one or more upcoming media content items in an active playlist.

In some implementations, the content server obtains an estimated arrival time of the particular vehicle at a location associated with the user (1212), and identifies at least one upcoming media content item in an active playlist, wherein the at least one upcoming media content item corresponds to a media content item that is scheduled to be played back at the estimated arrival time of the particular vehicle (1214). The content server sends (preloads) at least a portion of the at least one upcoming media content item to the electronic device associated with the user for retransmission to the media presentation system of the particular vehicle (1216). Additional details and discussion of preloading content is provided above with respect to FIG. 7A.

With reference to FIG. 12B, in some implementations, the content server receives a media-control-permission indication, wherein the media content is not sent to the electronic device associated with the user for retransmission to the media presentation system of the particular vehicle until after the media-control-permission indication is received (1230). In other implementations, the media content is sent to (e.g., stored on) the electronic device associated with the user, but the electronic device does not retransmit the media content to the media presentation system of the particular vehicle until after the media-control-permission indication is received. The media-control-permission indication is described above with respect to FIG. 7B.

With respect to FIG. 12C, in some implementations, the content server receives (e.g., from the reservation server 104, or the content server 106) information identifying a media account associated with the user (1232). Examples of information identifying the media account associated with the user are provided above with respect to FIG. 8A.

In some implementations, the content server receives information identifying a transportation service account associated with the user, wherein the transportation service account associated with the user authorizes the user to access transportation services provided by the transportation service provider (1234). The content server then associates the media account with the transportation service account associated with the user (1236).

In some implementations, (1232)-(1236) are performed prior to (1202).

In some implementations, the content server receives information indicating that provision of the transportation service to the user has ceased (1238). Techniques and devices for determining that provision of the transportation service has ceased, as well as actions performed in response to the determinations, are discussed above with respect to FIG. 6.

Figure 13A:
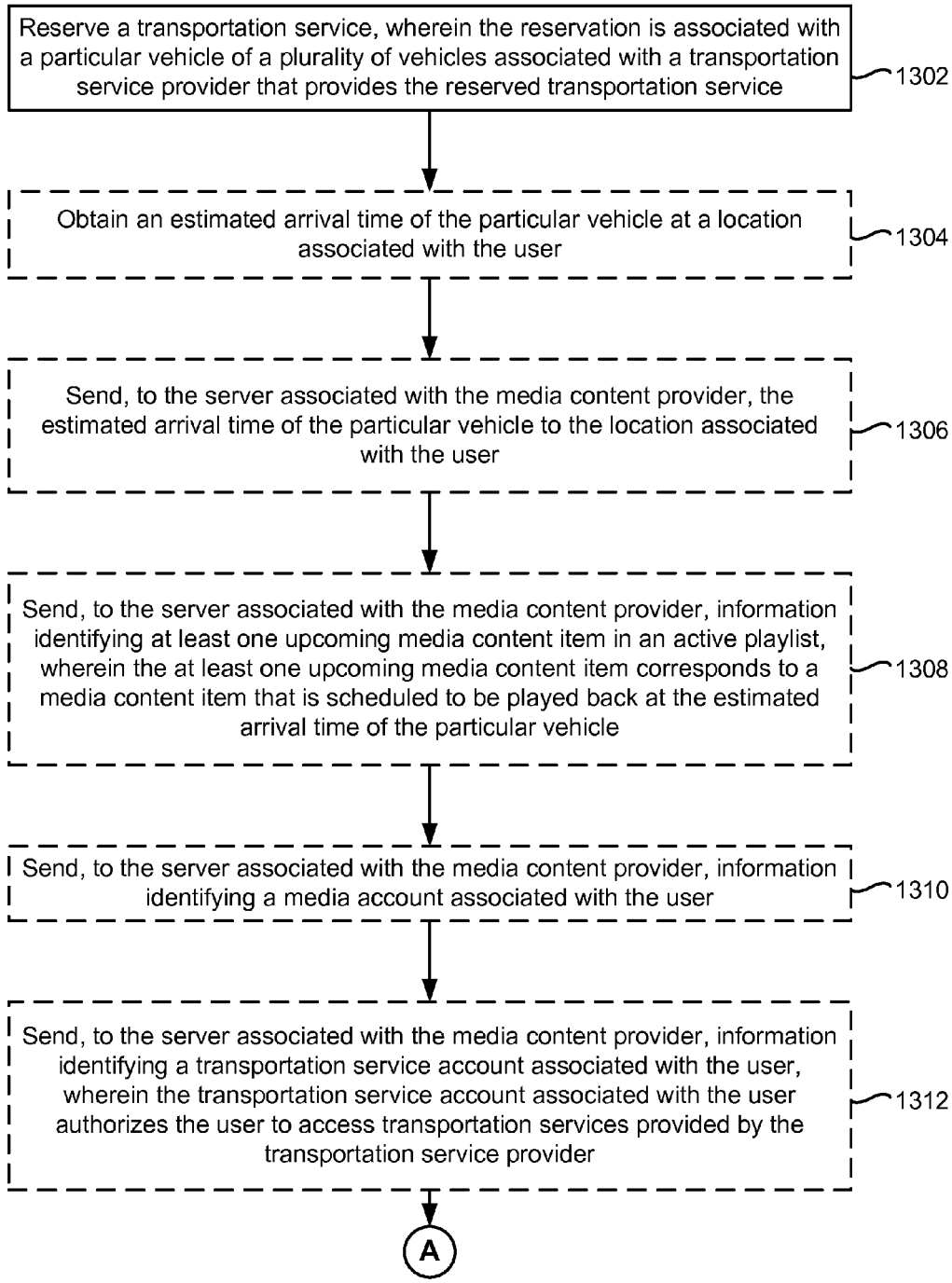
Figure 13B:
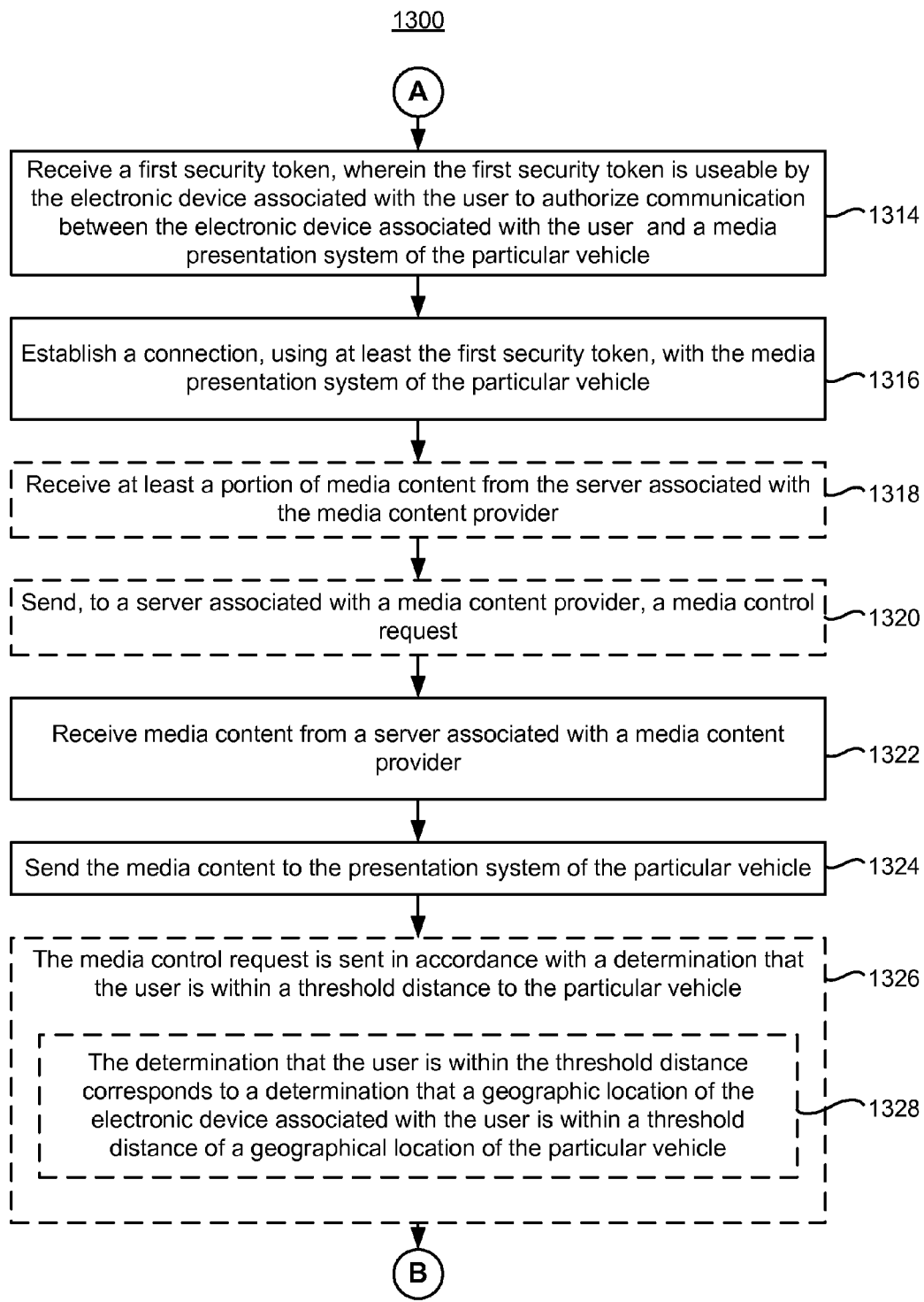
Figure 13C:
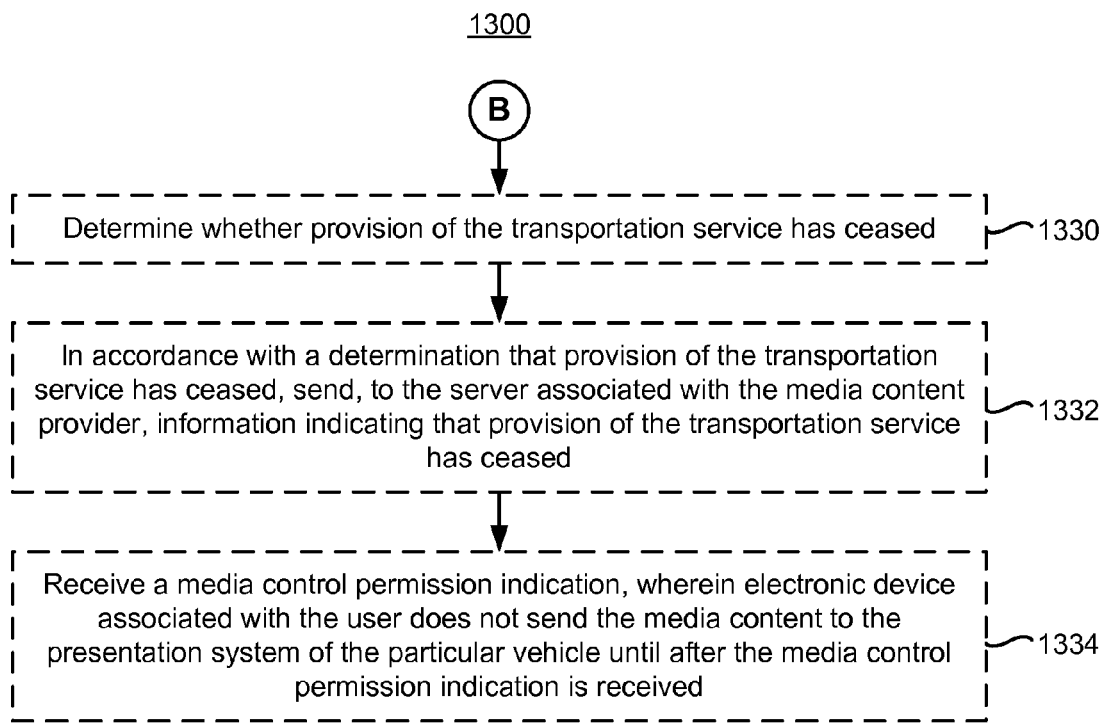

Attention is directed to FIGS. 13A-13C, which are flowcharts illustrating a method 1300 for providing media presentation in a reservation target (e.g., a vehicle), in accordance with some implementations. In some implementations, the method 800 is performed at an electronic device having one or more processors and memory storing one or more programs for execution by the one or more processors. In some implementations, the device that performs the method 1300 is the client device 102, which may be, for example, a smartphone, computer, tablet, or the like. While the following steps are described as being performed by the client device 102, it will be understood that the steps may be performed by any other appropriate device, server, system, or combination of such components. Also, while method 1300 is described as relating to a transportation service where the reservation targets are vehicles, the same description also applies to other reservable services, as described above.

With respect to FIG. 13A, the client device (e.g., the client device 102) requests reservation of a transportation service, wherein the reservation is associated with a particular vehicle of a plurality of vehicles associated with a transportation service provider that provides the reserved transportation service (1302). Requests to reserve a transportation service and the processing of such requests are described above with respect to FIG. 6.

In some implementations, the client device sends, to the server associated with the media content provider (e.g., the content server 106), information identifying a media account associated with the user (1310). Examples of information identifying the media account associated with the user are provided above with respect to FIG. 8A.

In some implementations, the client device sends, to the server associated with the media content provider, information identifying a transportation service account associated with the user, wherein the transportation service account associated with the user authorizes the user to access transportation services provided by the transportation service provider (1312). Examples of information identifying a transportation service account associated with the user are provided above with respect to FIG. 9A.

In some implementations, the content server associates the media account with the transportation service account associated with the user.

With reference to FIG. 13B, the client device receives a first security token, wherein the first security token is useable by the electronic device associated with the user to authorize communication between the electronic device associated with the user and a media presentation system of the particular vehicle (1314). The generation and use of security tokens, in accordance with some implementations, is described above with respect to FIG. 2D.

In some implementations, the first security token is received from a server associated with the transportation service provider (e.g., the reservation server 104), while in other implementations, the first security token is received from the server associated with the media content provider (e.g., the content server 106). In some cases, the first security token is not generated and/or sent (e.g., by the reservations server 104 or the content server 106) unless the client device first sends at (1310) and (1312) the information identifying a media account and/or the information identifying a transportation service account associated with the user.

The client device establishes a connection, using at least the first security token, with the media presentation system of the particular vehicle (1316). For example, as described above with respect to FIG. 2D, the connection that is established between the client device 102 and the media presentation system of the vehicle 108-1 uses on a wireless communication technology (e.g., BLUETOOTH, Wi-Fi, etc.).

The client device receives media content from a server associated with a media content provider (1322). As described above, in some implementations, the media content (e.g., media content 226) is stored, cached, and/or preloaded on the electronic device (e.g., stored in a local cache or other location in a storage medium of the client device 102).

The client device sends the media content to the presentation system of the particular vehicle (1324). Thus, for example, the client device 102 sends locally cached media content 226 (e.g., music) to the media presentation system of the vehicle 108-1, via a wireless communication technology such as BLUETOOTH.

In some implementations, the client device sends, to the server associated with the media content provider, a media control request (1320). Media control requests are discussed in greater detail above with respect to FIGS. 6 and 7A.

In some implementations, receiving the media content (e.g., media content 226) is in response to the client device sending (and the content server receiving) the media control request (e.g., the media control request 210). While the example provided in FIG. 13B illustrates that the media control request is sent after establishing a connection at (1316), in some implementations, the media control request is sent after receiving media content at (1322) and/or sending the media content at (1324). Alternatively, the media control request is sent after sending the information identifying the media account associated with the user and the information identifying the media presentation system of the particular vehicle at (1310) and (1312). As another alternative, the media control request is sent concurrently with sending the information at (1310) and (1312).

In some implementations, the media control request is sent in accordance with a determination that the user is within a threshold distance to the particular vehicle (1326). Furthermore, in some implementations, the determination that the user is within the threshold distance corresponds to a determination that a geographic location of the electronic device associated with the user is within a threshold distance (e.g., 5 feet) of a geographical location of the particular vehicle (1328). Techniques and devices for determining that the user is within a threshold distance, as well as actions performed in response to the determinations, are discussed above with respect to FIG. 7B.

In some implementations, after establishing the connection with the media presentation system of the particular vehicle, and prior to sending the media control request, the client device receives at least a portion of the media content from the server associated with the media content provider (1318).

Thus, as described above with respect to FIG. 7A, media content is cached and/or preloaded on the media presentation system of the vehicle.

In some implementations, receiving at least the portion of the media content from the server associated with a media content provider includes receiving at least a portion of one or more upcoming media content items in an active playlist, as described above with respect to FIG. 7A.

With reference to FIG. 13A, in some implementations, prior to establishing the connection with the media presentation system of the particular vehicle (1316), and prior to sending the media control request (1324), the client device obtains an estimated arrival time of the particular vehicle at a location associated with the user (1304). The client device sends, to the server associated with the media content provider (e.g., content server 106), the estimated arrival time of the particular vehicle to the location associated with the user (1306), and information identifying at least one upcoming media content item in an active playlist, wherein the at least one upcoming media content item corresponds to a media content item that is scheduled to be played back at the estimated arrival time of the particular vehicle (1308). Additional details and discussion of preloading content is provided above with respect to FIG. 7A.

With reference to FIG. 13C, in some implementations, the client device determines whether provision of the transportation service has ceased (1330). In accordance with a determination that provision of the transportation service has ceased, the client device sends, to the server associated with the media content provider (e.g., the content server 106), information indicating that provision of the transportation service has ceased (1332). Techniques and devices for determining that provision of the transportation service has ceased, as well as actions performed in response to the determinations, are discussed above with respect to FIG. 6.

In some implementations, the content server receives a media-control-permission indication, wherein the media content is not sent to the electronic device associated with the user for retransmission to the media presentation system of the particular vehicle until after the media-control-permission indication is received (1334). In other implementations, the media content is sent to (e.g., stored on) the electronic device associated with the user, but the electronic device does not retransmit the media content to the media presentation system of the particular vehicle until after the media-control-permission indication is received. The media-control-permission indication is described above with respect to FIG. 7B.

Figure 14A:
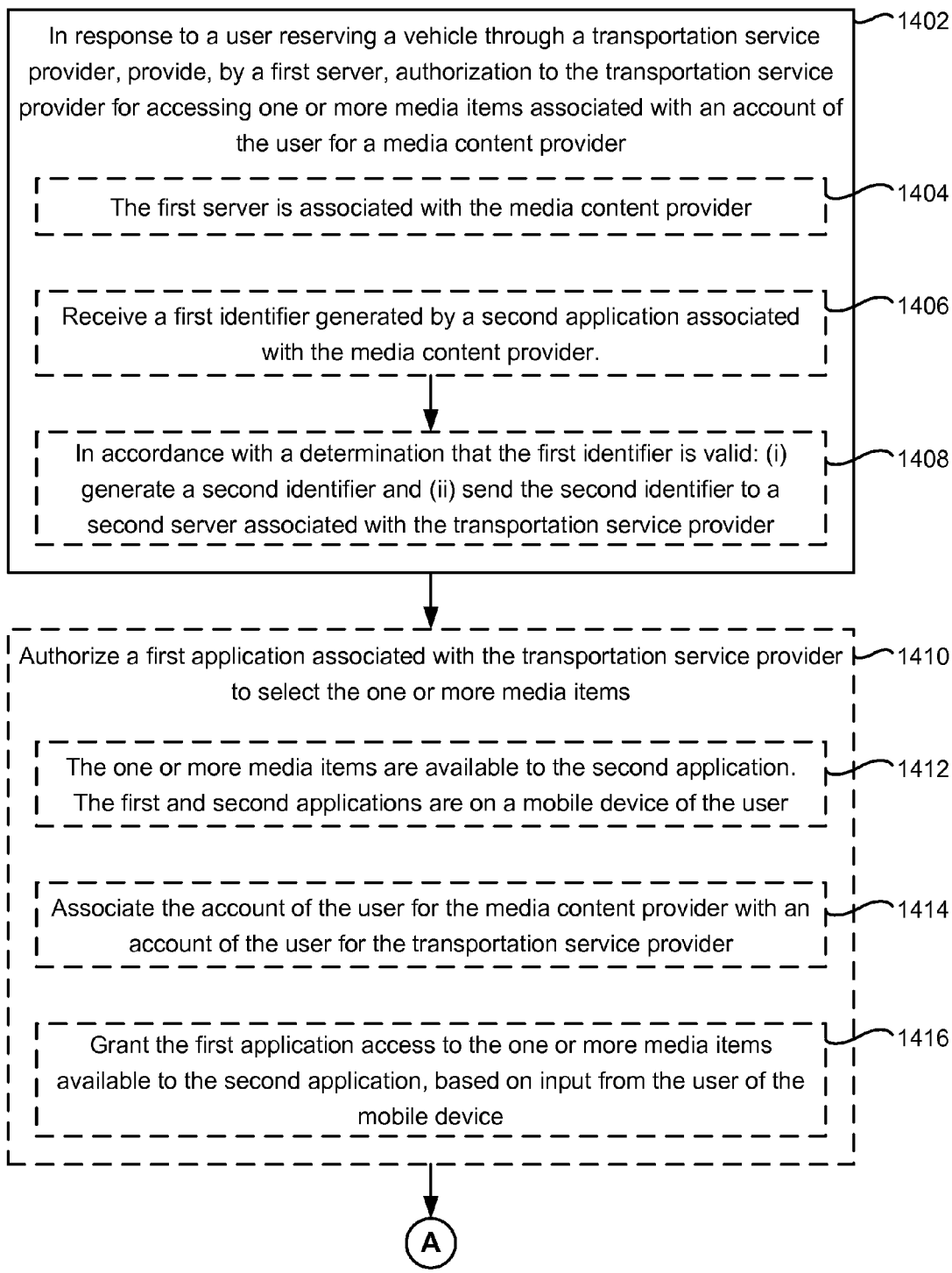
Figure 14B:
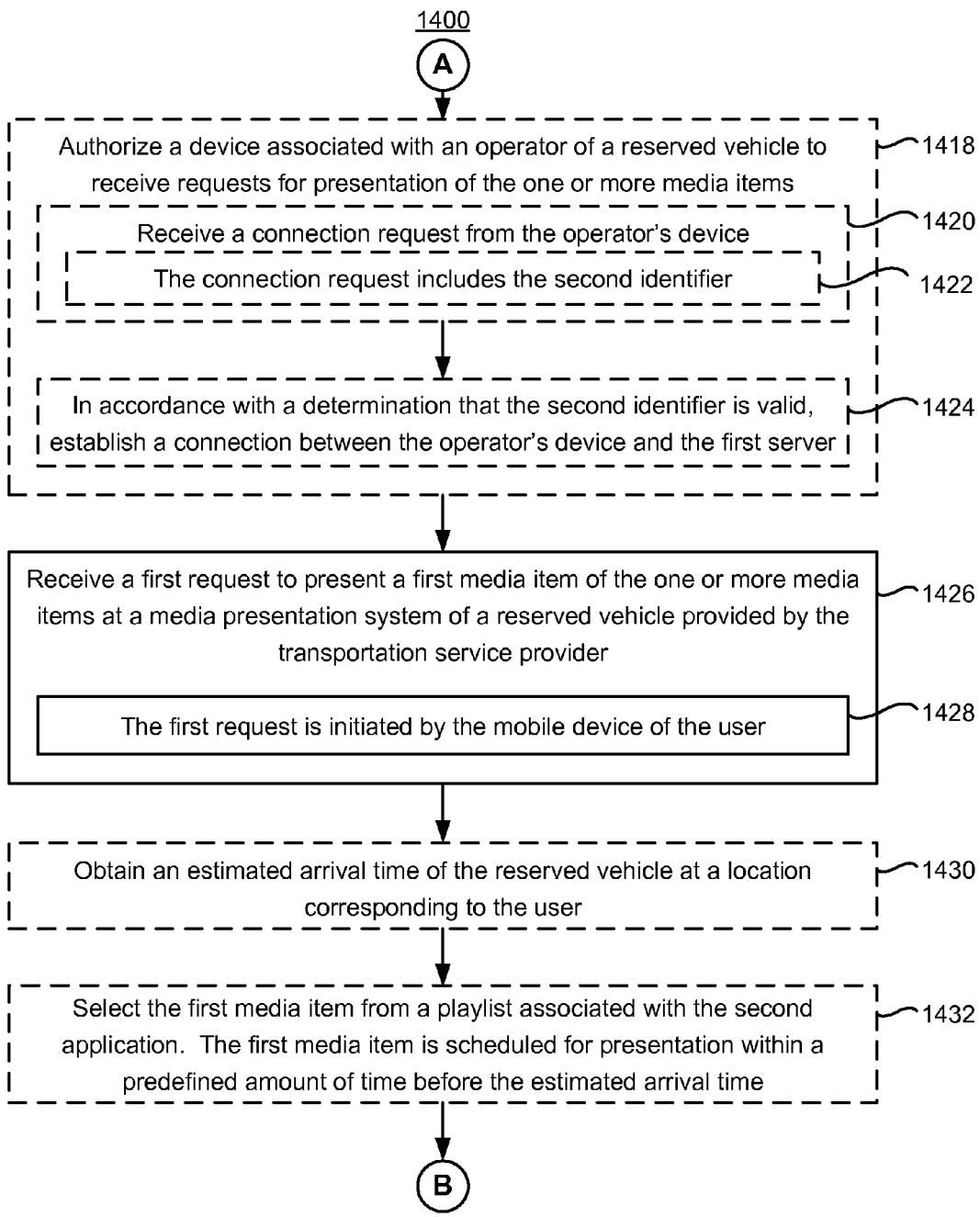
Figure 14C:
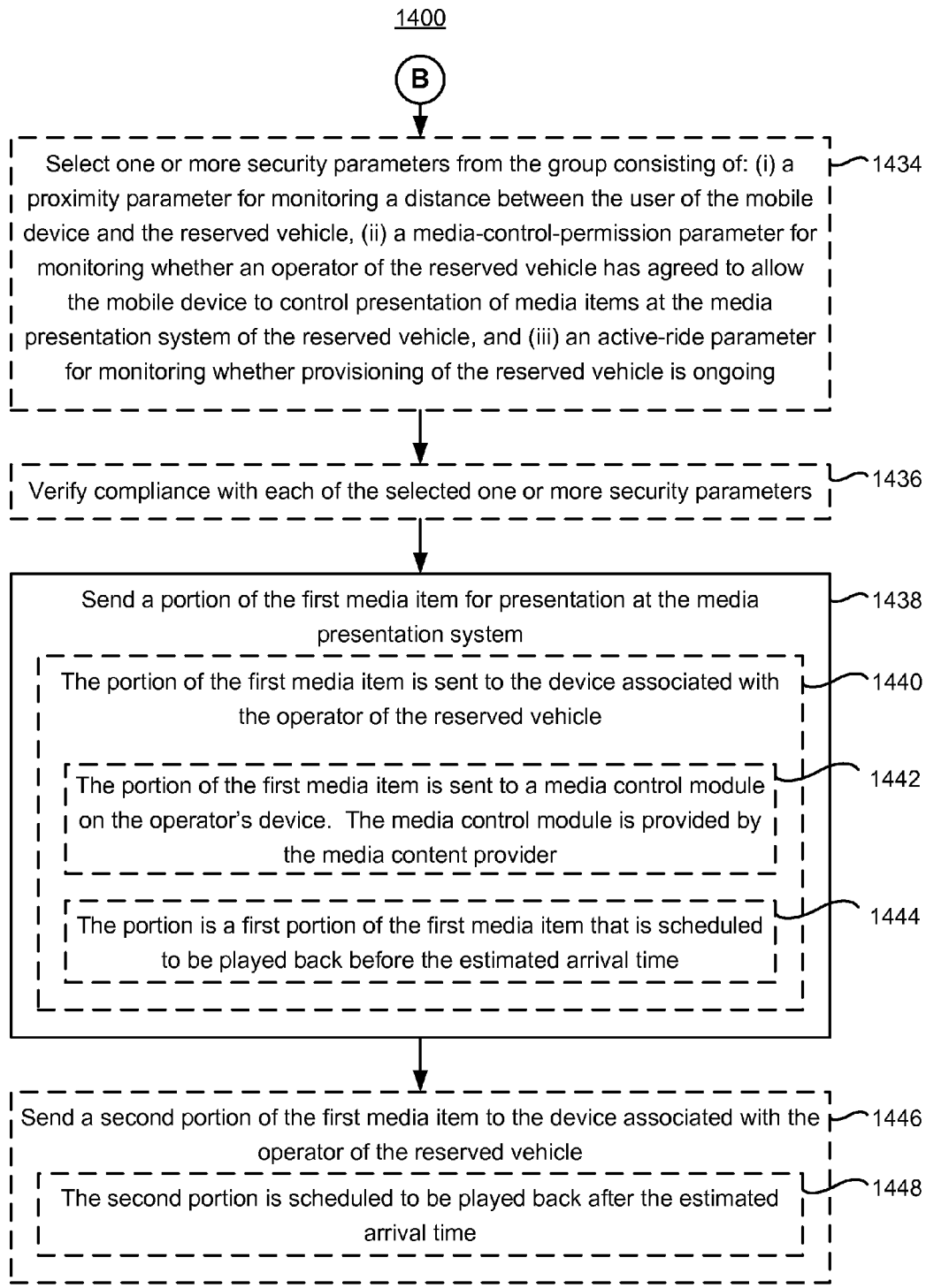

Attention is now directed to FIGS. 14A-14C. FIGS. 14A-14C are flow diagrams illustrating a method 1400 of providing temporary access to media content, in accordance with some implementations.

The method 1400, in accordance with some implementations, is performed at a first server (e.g., content server 106). FIGS. 14A-14C correspond to instructions stored in a computer memory or other computer-readable storage medium (e.g., memory 506 of the content server 106, FIG. 5).

Referring now to FIG. 14A, the first server (e.g., a server associated (1404) with a media content provider, such as content server 106) provides (1402) authorization to a transportation service provider for accessing one or more media items associated with an account of a user for the media content provider. In some implementations, the authorization is provided in response to the user reserving (or after the user reserves) a vehicle through the transportation service provider (e.g., after sending the service reservation request 206 of FIGS. 2A-2D).

In some implementations, the first server receives (1406) a first identifier (e.g., authorization code 232, FIG. 2E) generated by a second application (e.g., service application 202) that is associated with the media content provider. The second application is distinct from a first application (e.g., service application 202), which is associated with the transportation service provider (or other service provider). For example, as pictured in FIG. 2E, the service application 202 sends the authorization request 230 to media application 204 and the media application generates the authorization code 232 in response to the authorization request 230. The authorization code 232 is then sent (e.g., by service application 202) to the reservation server 204, which sends a communication to the content server 106 (i.e., the first server) that includes the authorization code 232.

In accordance with a determination that the first identifier (e.g., authorization code 232) is valid (1408), the first server (e.g., content server 106): (i) generates a second identifier (e.g., access token 234) and (ii) sends the second identifier to a second server (e.g., the reservation server 104) associated with the transportation service provider. For example, the reservation server 104 stores the second identifier in an account that is associated with the user. In some implementations, the second identifier is generated after the first server determines that the first identifier is valid (or that the first identifier and a shared secret are both valid).

In some implementations, the first server authorizes (1410) the first application to select the one or more media items. In some implementations, the one or more media items are available (1412) to the second application and the first and second applications are both on (i.e., installed on) a mobile device of the user (e.g., client device 102 includes the service application 202 and the media application 204).

In some implementations, the first server associates (1414) the account of the user for the media content provider with an account of the user for the transportation service provider. For example, as pictured in FIGS. 2A-2D and 2F-2H, the account of the user for the media content provider is associated with the account of the user for the transportation service provider by adding a record to a data structure stored on content server 106 (or a data structure that is coupled with content server 106 through a network). In this example, the record associated with a media user ID of "User_1_media" is updated to contain a record for a reserved vehicle that was requested by the user (i.e., "User_1"). The data structure now contains a record for an output device labeled "Temp Service" with a device ID of "123-45-678". In some implementations, as pictured in FIGS. 2A and 2D-2H, a data structure available to the transportation service provider (e.g., a data structure that is stored on reservation server 104) associates the account of the user for the transportation service provider with the account of the user for the media content provider (e.g., the account for service user ID "User_1" is updated to store the media user ID for the user's media content provider account, "User_1_media"). In some implementations, as pictured in FIGS. 2B and 2C, the user's account for the media content provider is updated but the user's transportation service provider account is not updated. Associating accounts is discussed in more detail above in reference to FIGS. 2A-2D.

In some implementations, the first server grants (1416) the first application access to the one or more media items available to the second application, based on input from the user of the mobile device. For example, a dialog is displayed on the client device 102 requesting approval for the first application to access the one or more media items (e.g., the dialog is displayed by the media application 204). In some implementations, after the user grants (e.g., in response to the user granting) the requested approval (e.g., clicking an approve button, accepting privacy terms, accepting terms of use, etc.), the operation 1414 is then performed. In some implementations, the dialog allows the user to select a subset of the one or more media items to make available to the first application, instead of granting access to all of the one or more media items.

In some implementations, the first server authorizes (1418) a device associated with an operator of a reserved vehicle (e.g., a second client device 102, such as the operator's mobile phone, or a device that is integrated into the reserved vehicle, such as an entertainment system) to receive requests (e.g., media content 212, 226, FIGS. 2A-2D, 2G-2H) for presentation of the one or more media items. In some implementations, before authorizing the operator's device to receive requests for presentation of the one or more media items (e.g., before the operation 1418), the first server receives (1420) a connection request from the operator's device and the connection request includes the second identifier (1422). In some implementations, the second identifier was sent to the operator's device by the reservation server 104. In accordance with a determination (e.g., by media control module 350 or a component thereof, such as authentication module 322) that the second identifier is valid (1424), the first server establishes a connection between the operator's device and the first server.

For example, the reservation server 104 retrieves the access token from the user's account for the transportation service provider and sends it to the operator's device, as shown in FIG. 2F. The service application 202 on the operator's device receives the access token and provides the access token to a media control module 350 (FIG. 3). In accordance with a determination (e.g., by media control module 350 or a component thereof, such as authentication module 322) that the access token is valid, the content server 106 establishes a connection between the operator's device and the content server 106 (e.g., via exchange of session initialization information 236, FIG. 2F).

In some implementations, the first server receives (1426) a first request (e.g., the media control request 210, FIGS. 2A-2C and 2G-2H) to present a first media item of the one or more media items at a media presentation system of the reserved vehicle provided by the transportation service provider. In some implementations, the first request is initiated (1428) by a mobile device of the user (e.g., the user selects the first media item included in the first request by selecting media content affordances displayed in either the service application 202 or the media application 204 on the client device 102).

In some implementations, the first server obtains (1430) an estimated arrival time of the reserved vehicle at a location corresponding to the user. In some implementations, the first server selects (1432) the first media item from a playlist associated with the second application (e.g., in response to the first request). In some implementations, the first media item is scheduled (1432) for presentation within a predefined amount of time before the estimated arrival time. In some implementations, selecting the first media item from the playlist is performed in response to a gesture at the mobile device of the user (e.g., the user hovers over an affordance associated with the first media item for a predefined period of time). Examples of details regarding the operations 1430 and 1432 are discussed above in reference to FIG. 13A.

In some implementations, the first server selects (1434) one or more security parameters from the group consisting of: (i) a proximity parameter for monitoring a distance between the user of the mobile device and the reserved vehicle (e.g., as discussed above for operations 720-722 and 1226-1228, FIGS. 7B and 12B), (ii) a media-control-permission parameter for monitoring whether an operator of the reserved vehicle has agreed to allow the mobile device to control presentation of media items at the media presentation system of the reserved vehicle (e.g., as discussed above for operations 724, 1230, and 1334, FIGS. 7B, 12B and 13C), and (iii) an active-ride parameter for monitoring whether provisioning of the reserved vehicle is ongoing (e.g., as discussed above for operations 614-616 and 1332, FIGS. 6 and 13C).

The first server verifies (1436) compliance with each of the selected one or more security parameters. In some implementations, the one or more security parameters include the proximity parameter and the first server verifies that a distance between the user of the mobile device and the reserved vehicle satisfies (e.g., is less than, or less than or equal to) a maximum distance or determines that the mobile device of the user is in the reserved vehicle (e.g., which includes determining that a speed of the mobile device of the user satisfies a threshold speed). Examples of details regarding the proximity parameter are provided above in reference to FIG. 7B.

In some implementations, the one or more security parameters include the media-control-permission parameter and the first server obtains agreement from an operator of the reserved vehicle that the mobile device is allowed to control presentation of media items at the media presentation system of the reserved vehicle. For example, the operator selects an affordance displayed on the operator's device (e.g., an "I agree to grant permission" button in the service application 202 installed on the operator's device).

In some implementations, the one or more security parameters include the media-control-permission parameter and the first server receives an indication, from an operator of the reserved vehicle, that the operator has picked up the user.

In some implementations, the one or more security parameters include the active-ride parameter and the first server verifies that provisioning of the reserved vehicle to the user is ongoing. In some implementations, the active-ride parameter is no longer in compliance when an operator of the reserved vehicle indicates that provisioning of the reserved vehicle to the user has ceased.

In some implementations, the first server sends (1438) a portion of the first media item for presentation at the media presentation system (e.g., media content 212, 226 pictured in FIGS. 2A-2D and 2G-2H). The first server sends the portion of the first media item, for example, in response to the first request of operation 1426 and/or in accordance with the authorization of operations 1402, 1410, and/or 1418. In some implementations, the portion of the first media item is sent (1440) to the device associated with the operator of the reserved vehicle. For example, the portion of the first media item is sent (1442) to a media control module on the operator's device (e.g., media control module 350 or a component thereof such as media coordination module 324, FIG. 3). The media control module is provided by the media content provider (e.g., the media control provider makes an eSDK available to the service application 202). In some implementations, the first application associated with the transportation service provider (e.g., service application 202) is installed on the operator's device and the media control module is a component of the first application (e.g., as pictured in FIG. 3). In some implementations, the portion is a first portion of the first media item that is scheduled (1444) to be played back before the estimated arrival time.

In some implementations, the portion sent in operation 1438 is a first portion and the first server sends (1446) a second portion of the first media item to the device associated with the operator of the reserved vehicle. For example, the second portion is scheduled (1448) to be played back after the estimated arrival time. Examples of details regarding the selection of the first and second portions of the first media item are provided above in reference to, for example, operations 710 and 816 of FIGS. 7A and 8B, respectively.

It should be understood that the particular order in which the operations in FIGS. 6-14C have been described is merely exemplary and is not intended to indicate that the described order is the only order in which the operations could be performed. One of ordinary skill in the art would recognize various ways to reorder the operations described herein. For brevity, these details are not repeated here.

Plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the implementation(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the implementation(s).

It will also be understood that, although the terms "first," "second," are, in some circumstances, used herein to describe various elements, these elements should not be limited by these terms. These terms are only used to distinguish one element from another. For example, a first server could be termed a second server, and, similarly, a second server could be termed a first server, which changing the meaning of the description, so long as all occurrences of the "first server" are renamed consistently and all occurrences of the second server are renamed consistently. The first server and the second server are both servers, but they are not the same server.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context. Furthermore, unless otherwise stated, "in response to" does not limit the following action to being performed only in response to that condition, nor does it exclude other conditions as prerequisites to the stated action.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method of controlling media presentation in a vehicle, performed at a first server with a processor and memory storing instructions for execution by the processor, the method comprising:
   providing authorization to a transportation service provider for accessing one or more media items associated with an account of a user for a media content provider, in response to the user reserving a vehicle through the transportation service provider via a first application that is executing on a mobile device of the user, wherein the first application is associated with the transportation service provider;
   receiving a first request to present a first media item of the one or more media items at a media presentation system of a reserved vehicle provided by the transportation service provider, the first request being initiated via a second application that is executing on the mobile device of the user, wherein:
      the second application is associated with the media content provider; and
      the first media item is selected from a playlist associated with the second application based on a determination that the first media item is scheduled by the media content provider to be playing at an estimated arrival time of the reserved vehicle at a pick-up location for the user;
   sending a first portion of the first media item for presentation at the media presentation system, in accordance with the authorization;
   receiving an indication that the estimated arrival time for the reserved vehicle at the pick-up location for the user has been updated; and
   in response to receiving the indication, sending a second portion of the first media item for presentation at the media presentation system, wherein the second portion is different from the first portion and is scheduled by the media content provider to be playing at the updated estimated arrival time of the reserved vehicle at the pick-up location for the user.

2. The method of claim 1, wherein the first server is associated with the media content provider.

3. The method of claim 1, further comprising:
authorizing the first application associated with the transportation service provider to select the one or more media items, the one or more media items being available to the second application associated with the media content provider.

4. The method of claim 3, further comprising authorizing a device associated with an operator of the reserved vehicle to receive requests for presentation of the one or more media items,
wherein sending the first portion of the first media item for presentation at the media presentation system includes sending the first portion of the first media item to the device associated with the operator of the reserved vehicle.

5. The method of claim 4, wherein sending the first portion of the first media item to the device associated with the operator of the reserved vehicle includes sending the first portion of the first media item to a media control module on the device associated with the operator of the reserved vehicle, and wherein the media control module is provided by the media content provider.

6. The method of claim 4, wherein sending the first portion of the first media item includes sending the first portion of the first media item to the device associated with the operator of the reserved vehicle.

7. The method of claim 6, wherein:
the first portion of the first media item is scheduled to be played back before the estimated arrival time and a third portion of the first media item is scheduled to be played back after the estimated arrival time; and
the method further comprises sending the third portion of the first media item to the device associated with the operator of the reserved vehicle.

8. The method of claim 3, wherein authorizing the first application associated with the transportation service provider to select the one or more media items includes associating the account of the user for the media content provider with an account of the user for the transportation service provider.

9. The method of claim 3, wherein authorizing the first application associated with the transportation service provider to select the one or more media items includes granting the first application access to the one or more media items available to the second application, based on input from the user of the mobile device.

10. The method of claim 1, wherein the first server is associated with the media content provider, the method comprising:
receiving a first identifier generated by the second application associated with the media content provider and distinct from the first application associated with the transportation service provider; and
in accordance with a determination that the first identifier is valid:
generating a second identifier; and
sending the second identifier to a second server associated with the transportation service provider.

11. The method of claim 10, further comprising:
authorizing a device associated with an operator of the reserved vehicle to receive requests for presentation of the one or more media items, wherein authorizing the device associated with the operator of the reserved vehicle to receive the requests for presentation of the one or more media items includes:
receiving a connection request from the device associated with the operator of the reserved vehicle, wherein the connection request includes the second identifier; and
in accordance with a determination that the second identifier is valid, establishing a connection between the device associated with the operator of the reserved vehicle and the first server;
wherein sending the first portion of the first media item for presentation at the media presentation system includes sending the first portion of the first media item to the device associated with the operator of the reserved vehicle.

12. The method of claim 1, further comprising:
selecting one or more security parameters from the group consisting of a proximity parameter for monitoring a distance between the user of the mobile device and the reserved vehicle, a media-control-permission parameter for monitoring whether an operator of the reserved vehicle has agreed to allow the mobile device to control presentation of media items at the media presentation system of the reserved vehicle, and an active-ride parameter for monitoring whether provisioning of the reserved vehicle is ongoing; and
before sending the first portion of the first media item for presentation at the media presentation system, verifying compliance with each of the selected one or more security parameters.

13. The method of claim 12, wherein:
the one or more security parameters comprise the proximity parameter; and
verifying compliance with the proximity parameter comprises verifying that a distance between the user of the mobile device and the reserved vehicle satisfies a maximum distance.

14. The method of claim 12, wherein:
the one or more security parameters comprise the proximity parameter; and
verifying compliance with the proximity parameter comprises determining that the mobile device of the user is in the reserved vehicle.

15. The method of claim 14, wherein determining that the mobile device of the user is in the reserved vehicle comprises determining that a speed of the mobile device of the user satisfies a threshold speed.

16. The method of claim 12, wherein:
the one or more security parameters comprise the media-control-permission parameter; and
verifying compliance with the media-control-permission parameter comprises obtaining agreement from an operator of the reserved vehicle that the mobile device is allowed to control presentation of media items at the media presentation system of the reserved vehicle.

17. The method of claim 1, further comprising receiving a media-control-permission indication initiated by the user or an operator of the reserved vehicle;
wherein sending the first portion of the first media item is performed after the media-control-permission indication is received.

18. The method of claim 1, further comprising:
determining whether provisioning of the reserved vehicle to the user is ongoing; and
in accordance with a determination that provisioning of the reserved vehicle to the user is no longer ongoing, ceasing to accept new requests to present media items of the one or more media items at the media presentation system.

19. A server, comprising:
one or more processors; and
memory storing one or more programs, which when executed by the one or more processors cause the server to:
  provide authorization to a transportation service provider for accessing one or more media items associated with an account of a user for a media content provider, in response to the user reserving a vehicle through the transportation service provider via a first application that is executing on a mobile device of the user, wherein the first application is associated with the transportation service provider;
  receive a first request to present a first media item of the one or more media items at a media presentation system of a reserved vehicle provided by the transportation service provider, the first request being initiated via a second application that is executing on the mobile device of the user, wherein:
    the second application is associated with the media content provider; and
    the first media item is selected from a playlist associated with the second application based on a determination that the first media item is scheduled by the media content provider to be playing at an estimated arrival time of the reserved vehicle at a pick-up location for the user;
  send a first portion of the first media item for presentation at the media presentation system, in accordance with the authorization;
  receive an indication that the estimated arrival time for the reserved vehicle at the pick-up location for the user has been updated; and
  in response to receiving the indication, send a second portion of the first media item for presentation at the media presentation system, wherein the second portion is different from the first portion and is scheduled by the media content provider to be playing at the updated estimated arrival time of the reserved vehicle at the pick-up location for the user.

20. A non-transitory computer-readable storage medium storing one or more programs configured for execution by one or more programs of a server, the one or more programs comprising instructions for:
  providing authorization to a transportation service provider for accessing one or more media items associated with an account of a user for a media content provider, in response to the user reserving a vehicle through the transportation service provider via a first application that is executing on a mobile device of the user, wherein the first application is associated with the transportation service provider;
  receiving a first request to present a first media item of the one or more media items at a media presentation system of a reserved vehicle provided by the transportation service provider, the first request being initiated via a second application that is executing on the mobile device of the user, wherein:
    the second application is associated with the media content provider; and
    the first media item is selected from a playlist associated with the second application based on a determination that the first media item is scheduled by the media content provider to be playing at an estimated arrival time of the reserved vehicle at a pick-up location for the user;
  sending a first portion of the first media item for presentation at the media presentation system, in accordance with the authorization;
  receiving an indication that the estimated arrival time for the reserved vehicle at the pick-up location for the user has been updated; and
  in response to receiving the indication, sending a second portion of the first media item for presentation at the media presentation system, wherein the second portion is different from the first portion and is scheduled by the media content provider to be playing at the updated estimated arrival time of the reserved vehicle at the pick-up location for the user.

* * * * *